United States Patent [19]

Ishida et al.

[11] Patent Number: 5,666,439
[45] Date of Patent: Sep. 9, 1997

[54] OUTLINE DISCRIMINATION AND PROCESSING

[75] Inventors: Yoshihiro Ishida, Kawasaki; Akihiro Yoshitani, Yokohama, both of Japan

[73] Assignee: Canon Kabushiki Kaisha, Tokyo, Japan

[21] Appl. No.: 249,170

[22] Filed: May 25, 1994

[30] Foreign Application Priority Data

May 27, 1993 [JP] Japan .................................. 5-126320

[51] Int. Cl.$^6$ .................................................. G06K 9/00
[52] U.S. Cl. .................................................. 382/190; 382/266
[58] Field of Search .................................. 382/256, 266, 382/264, 260, 168, 164, 173, 181, 190, 192, 194, 195, 197, 199, 201, 203, 209, 216, 217, 218, 221, 224, 253, 254, 270, 302, 307, 308; 358/515, 400, 443, 449, 465, 467

[56] References Cited

U.S. PATENT DOCUMENTS

| | | | |
|---|---|---|---|
| 5,023,918 | 6/1991 | Lipscomb | 382/260 |
| 5,050,222 | 9/1991 | Lee | 382/21 |
| 5,093,870 | 3/1992 | Watanabe | 382/47 |
| 5,197,108 | 3/1993 | Watanabe | 382/264 |
| 5,327,260 | 7/1994 | Shimomae et al. | 382/264 |

FOREIGN PATENT DOCUMENTS

| | | | |
|---|---|---|---|
| 4157578 | 5/1992 | Japan | G06F 15/70 |
| 5-108823 | 4/1993 | Japan | G06F 15/70 |
| 5174140 | 7/1993 | Japan | G06F 15/66 |
| 6-12490 | 1/1994 | Japan | G06F 15/70 |

OTHER PUBLICATIONS

Patent Abstracts of Japan, vol. 15, No. 499 (Kokai 3–215893) (Sep. 20, 1991), Appl. No. JP3215893, Inventor: Isamu, Title="Outline Character Correction System", p. 1.

*Primary Examiner*—Leo Boudreau
*Assistant Examiner*—Bijan Tadayon
*Attorney, Agent, or Firm*—Fitzpatrick, Cella, Harper & Scinto

[57] ABSTRACT

An image processing method and apparatus extracts outline vectors from a binary image, by defining outline points at positions between white pixel area and black pixel area, closer to the black pixel area, to extract vectors representing the black pixel area smaller than the white pixel area. Outline vector patterns are defined in advance in consideration of the length and the direction of an object vector and the lengths and relative directions of preceding and subsequent vectors. Upon smoothing of the image, outline point after the smoothing are determined in accordance with an outline vector pattern that corresponds to the states of an object vector and its preceding and subsequent vectors in an outline.

22 Claims, 77 Drawing Sheets

DELETED

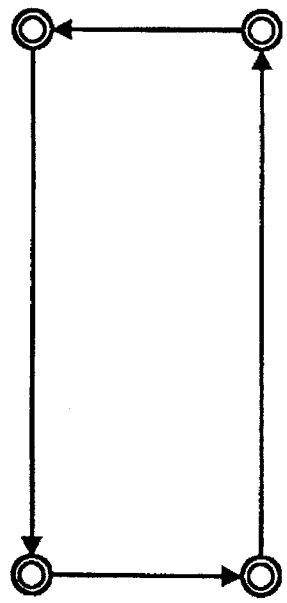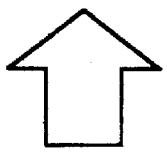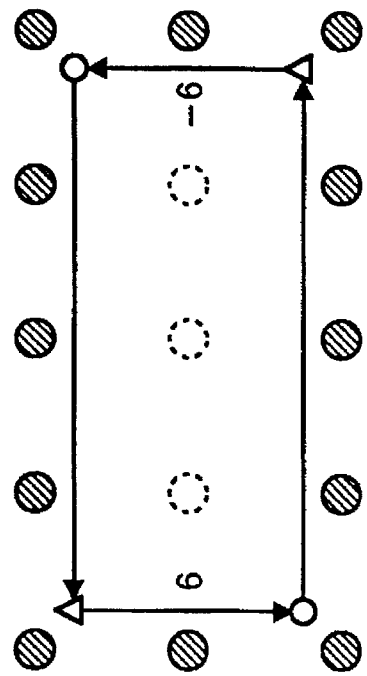
FIG.18

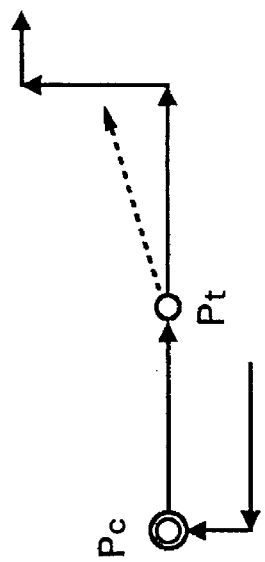
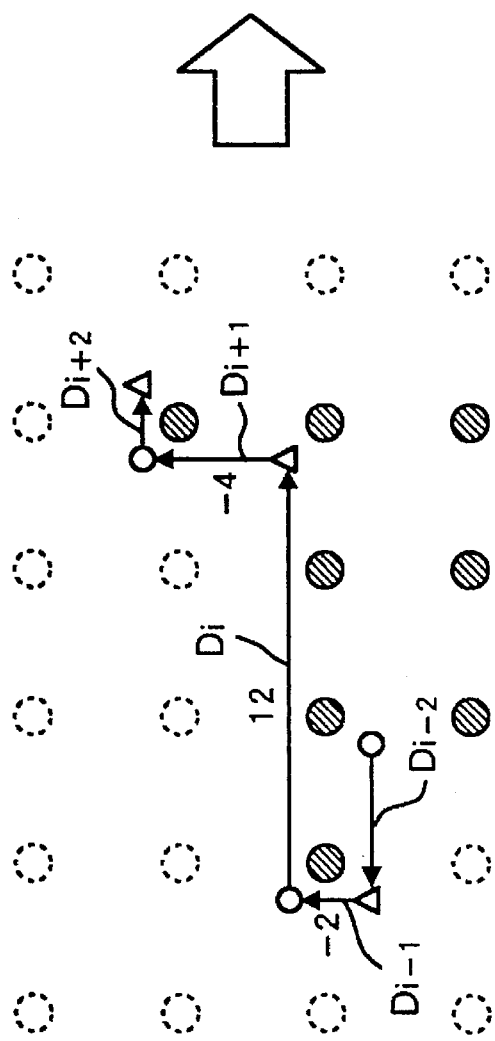
FIG.20

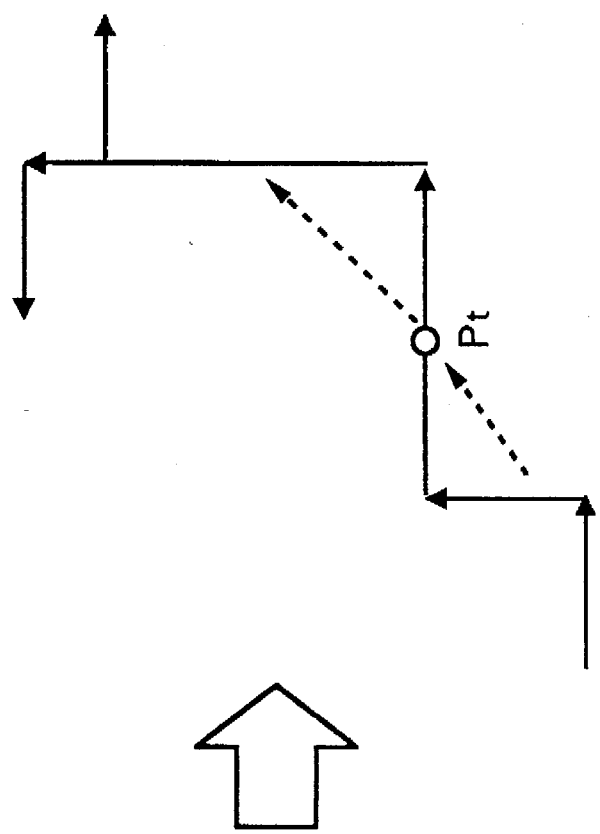
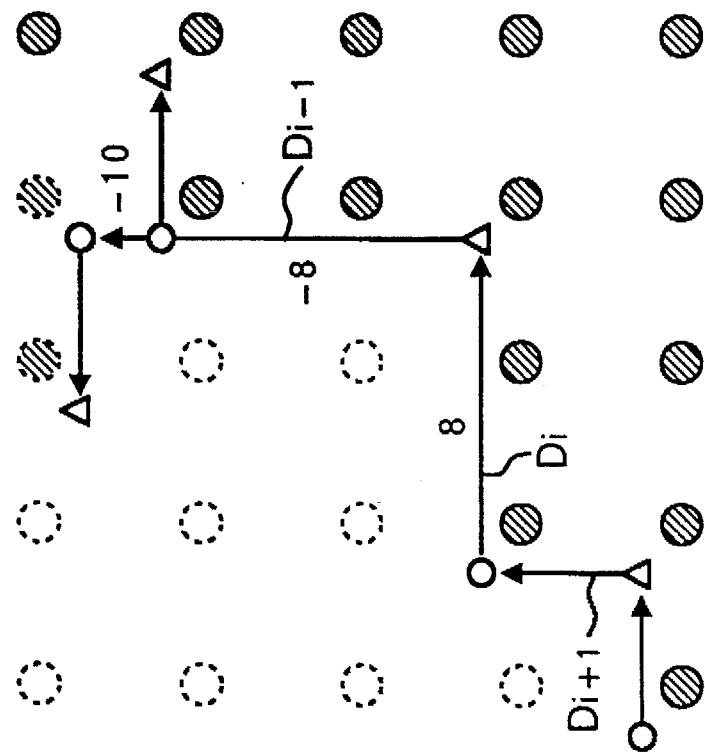
FIG.43

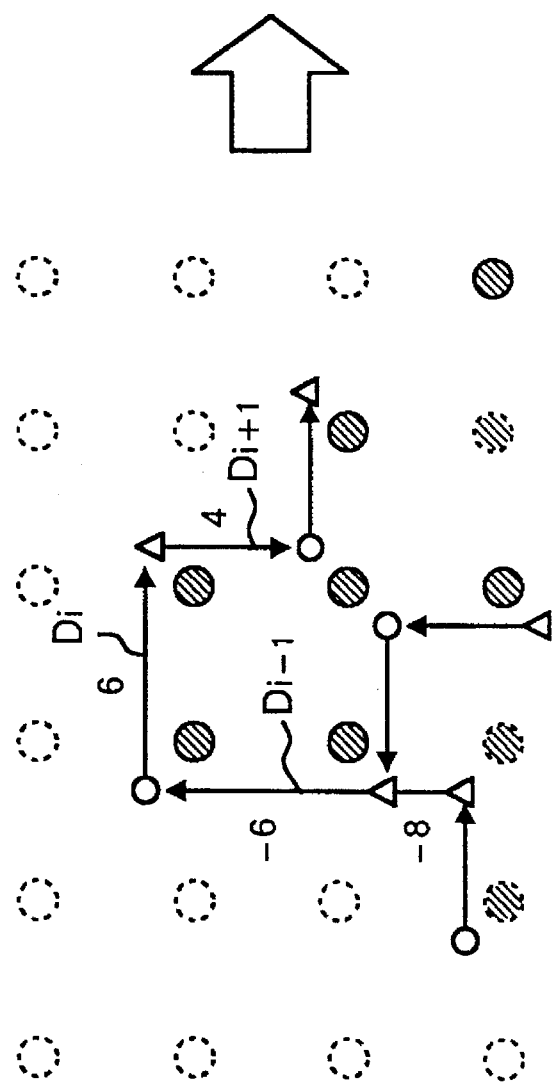
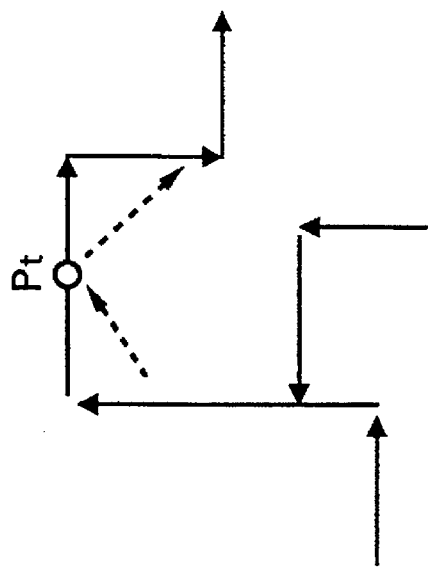
FIG.48

FIG.53

| |
|---|
| VECTOR DATA HAVING FIRST POINT AS START POINT AND SECOND POIN AS END POINT |
| VECTOR DATA HAVING SECOND POINT AS START POINT AND THIRD POINT AS END POINT |
| VECTOR DATA HAVING THIRD POINT AS START POINT AND FOURTH POINT AS END POINT |
| ⋮ |
| VECTOR DATA HAVING i-TH POINT AS START POINT AND (i+1)-TH POINT AS END POINT |
| ⋮ |
| VECTOR DATA HAVING (n−1)-TH POINT AS START POINT AND n-TH POINT AS END POINT |
| VECTOR DATA HAVING n-TH POINT AS START POINT AND FIRST POINT AS END POINT |

FIG.77

| Label | Value | Description |
|---|---|---|
| NUMBER OF LOOPS | N | |
| NUMBER OF POINTS | $L_1$ | NUMBER OF POINTS IN FIRST LOOP |
| | $L_2$ | NUMBER OF POINTS IN SECOND LOOP |
| | ⋮ | ⋮ |
| | $L_{i-1}$ | NUMBER OF POINTS IN $i-1$-TH LOOP |
| | $L_i$ | NUMBER OF POINTS IN $i$-TH LOOP |
| | $L_{i+1}$ | NUMBER OF POINTS IN $i+1$-TH LOOP |
| | ⋮ | ⋮ |
| | $L_{N-1}$ | NUMBER OF POINTS IN $N-1$-TH LOOP |
| | $L_N$ | NUMBER OF POINTS IN $N$-TH LOOP |

OUTLINE COORDINATE TABLE

POINT COORDINATES IN FIRST LOOP:
- $x_{11}$, $y_{11}$ — FIRST COORDINATES
- $x_{12}$, $y_{12}$ — SECOND COORDINATES
- ⋮
- $x_{1j-1}$, $y_{1j-1}$ — $j-1$-TH COORDINATES
- $x_{1j}$, $y_{1j}$ — $j$-TH COORDINATES
- $x_{1j+1}$, $y_{1j+1}$ — $j+1$-TH COORDINATES
- ⋮
- $x_{1L_1-1}$, $y_{1L_1-1}$ — $L_1-1$-TH COORDINATES
- $x_{1L_1}$, $y_{1L_1}$ — $L_1$-TH COORDINATES

POINT COORDINATES IN SECOND LOOP:
- $x_{21}$, $y_{21}$ — FIRST COORDINATES
- ⋮
- $x_{2L_2}$, $y_{2L_2}$ — $L_2$-TH COORDINATES

POINT COORDINATES IN $N$-TH LOOP:
- $x_{N1}$, $y_{N1}$ — $N$-TH COORDINATES
- ⋮
- $x_{NL_N}$, $y_{NL_N}$ — $L_N$-TH COORDINATES

OUTLINE DISCRIMINATION AND PROCESSING

BACKGROUND OF THE INVENTION

Present invention relates to an image processing method and apparatus for obtaining high-quality enlarged/reduced image using outline information of a binary image and, more particularly, to smoothing and enlarging/reducing of an outline vector extracted out of the binary image.

[RELATED ART]

Conventional image processing method comprises: a detection step of taking out an object pixel in a raster-scanning order and detecting pixel arrangement vectors in a horizontal direction and a vertical direction based on state of the object pixel and its peripheral pixels; a discrimination step of discriminating a connection state of the pixel arrangement vectors; and an extraction step of extracting outline of image data.

According to this method, an object pixel is taken out in a raster-scanning order, and a horizontal pixel arrangement vector and a vertical pixel arrangement vector are detected based on the state of the object pixel and the peripheral pixels. The connection state between these vectors is discriminated, and outline of image data is extracted based on the discriminated connecting state. This method extracts all the outlines of an image during only one raster-scanning. As an image memory for storing the whole image data is not required, the memory capacity can be reduced. Further, the extraction is performed not at the center of a pixel, but at the outline of the pixel, thus outline edge data having a useful width even with respect to a narrow line such as an one-pixel width line can be obtained. Moreover, this method extracts not only outline of a connected pixel area in which at least one of four pixels (heightward, leftward, upward and downward pixels of the object pixel) are connected with each other (hereinafter referred to as "4-connected component"), including the object pixel but outline of a connected pixel area in which at least one of eight pixels (neighboring pixels of the object pixel) are connected with each other (hereinafter referred to as "8-connected component").

As to extracting outlines of an 8-connected component, respectively defining two outline points set between two black pixels connected in a slant direction, at each extraction with one of these pixels as an object pixel, has been proposed as a rule for outline extraction of an 8-connected component. This rule enables respective extracting units to operation independent of the state of the other peripheral pixels.

On the other hand, an image processing apparatus which uses binary image outline information to obtain a high-quality enlarged/reduced image has been proposed. This apparatus extracts outline vectors from a binary image, performs smooth enlarging/reducing processing upon the outline vectors at a desired enlarging/reducing ratio while maintaining the state of the extracted outline vector representation, and regenerates a binary image from the smoothly-enlarged/reduced outline vectors. Thus the apparatus obtains a high-quality digital binary image. In this apparatus, the outline extraction method comprises: a detection step of taking out an object pixel in a raster-scanning order and detecting pixel arrangement vectors in a horizontal direction and a vertical direction based on the state of the object pixel and its peripheral pixels; a discrimination step of discriminating a connection state of the pixel arrangement vectors; and an extraction step of extracting outline of image data.

However, when an image is enlarged using the outline vector extracted by the above method, with a low-magnification ratio, i.e., from the same image size to a doubled image size, the width at a narrow line portion of an output image tends to be fat. This is because the above method defines an outline point at the central position between a white pixel and a black pixel to extract an outline vector, on the other hand, the image regenerator processes the pixel indicated by an outline coordinate value of the obtained smooth-enlarged image as a black pixel. Accordingly, upon enlarging at a low-magnification ratio, if pixels on an outline defined as surrounding pixels of an original image are treated as black pixels, the resulting black pixel area becomes non-negligibly larger than the white pixel area.

For this reason, when outline vectors are extracted from a binary image, to extract the black pixel area smaller than the white pixel area, defining an outline point between a black pixel and a white pixel at a position closer to the black pixel has been proposed. This extraction method prevents fat-pixels in an image resulting from enlarging processing at a low-magnification ratio, even if pixels on the outline are processed as black pixels. Further, an image expanding method as image enlarging/reducing processing as well as an outline extracting method has been proposed.

However, the extracted outline vectors, which had the same pixel widths in an input image, may have different outline vector lengths. For example, extraction at a pixel-width convexity of a black pixel area or a pixel-width concavity of a black pixel area results in different width outline loops. In this case, the length and direction of a side vector may be adjusted to attain a preferable processing result.

FIGS. 12 and 13 respectively show a one-dot notch within a black pixel area (pixel convexity) and a white pixel area (pixel concavity). The vector length representing the notches are different. FIG. 14 shows black two-dot notch (pixel convexity). The vector length representing the notch is the same as that in FIG. 13. In FIG. 13, the object vector 115 has a preceding vector 118 and a subsequent vector 116 in an opposite direction to the vector 118, both having one-pixel length. Similarly, in FIG. 14, the object vector 120 has a preceding vector 123 and a subsequent vector 121 in a reversed direction to the vector 123, both having one-pixel length. Further, in FIGS. 13 and 14, vector 119 prior to the vector 118 and vector 124 prior to the vector 123 have length longer than three pixel length, and these vectors are in the same direction as the object vector. However, to obtain a high-quality final image, upon smoothing, the notch in FIG. 13 may be preferably deleted, while the notch in FIG. 14 may be kept.

SUMMARY OF THE INVENTION

The present invention has been made in consideration of the above situation, and has as its object to provide an image processing method, using an image enlarging/reducing processing, to avoid fattening of an image enlarged at a low magnification ratio and to obtaining higher image quality.

According to the present invention, the method relates to a smoothing of a binary image smoothing & enlarging/reducing. In this processing, the smoothing and enlarging/reducing processing is performed on outline vectors of a smaller black pixel area, compared with a white pixel area, basically extracted in accordance with the above-mentioned binary image outline point extraction. In regeneration of a binary image, pixels on an outline are processed as black pixels, and pixels within an area surrounded by the outline are also processed as black pixels.

According to the present invention, outline vectors are extracted from a binary image so that a black pixel area is smaller than a white pixel area, and the smoothing & enlarging/reducing is performed in vector format (coordinate calculation). A binary image is regenerated with pixels on an outline as black pixels and pixels within an area surrounded by the outline also as black pixels.

More specifically, in the method according to the present invention, patterns of an object outline vector and its adjacent vectors are classified in advance, in consideration of the object outline vector length and relative lengths and directions of the adjacent vectors with respect to the object outline vector. Smoothed patterns for these respective patterns are defined in advance. Upon smoothing, an outline vector after a first smoothing is determined, in accordance with one of the classified patterns that corresponds to an object outline vector currently being processed. That is, the method introduces rules for determining the deleting, maintaining or smoothing of one-dot width pixel convexity/concavity. In case of deletion, the one-dot minute structure is deleted as a noise, and in case of smoothing, the one-dot notch is made a point on a smoothed outline. Thus a higher-quality enlarged/reduced image can be obtained.

In this enlarged/reduced image, a black pixel area having the same number of pixels as those in a white pixel area is not larger than the white pixel area. Further, as the smoothing is defined in accordance with the pattern of outline vector, a necessary pattern to be maintained and a pattern to be deleted are appropriately defined.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 11 to 51 are explanatory views of first smoothing rules;

FIG. 53 illustrates a edge data format used in the first smoothing;

FIG. 77 is a flowchart showing outline data format after a second smoothing.

DETAILED DESCRIPTION OF THE PREFERRED EMBODIMENT

Preferred embodiment of the present invention will be described in detail in accordance with the accompanying drawings.

Figure 1:
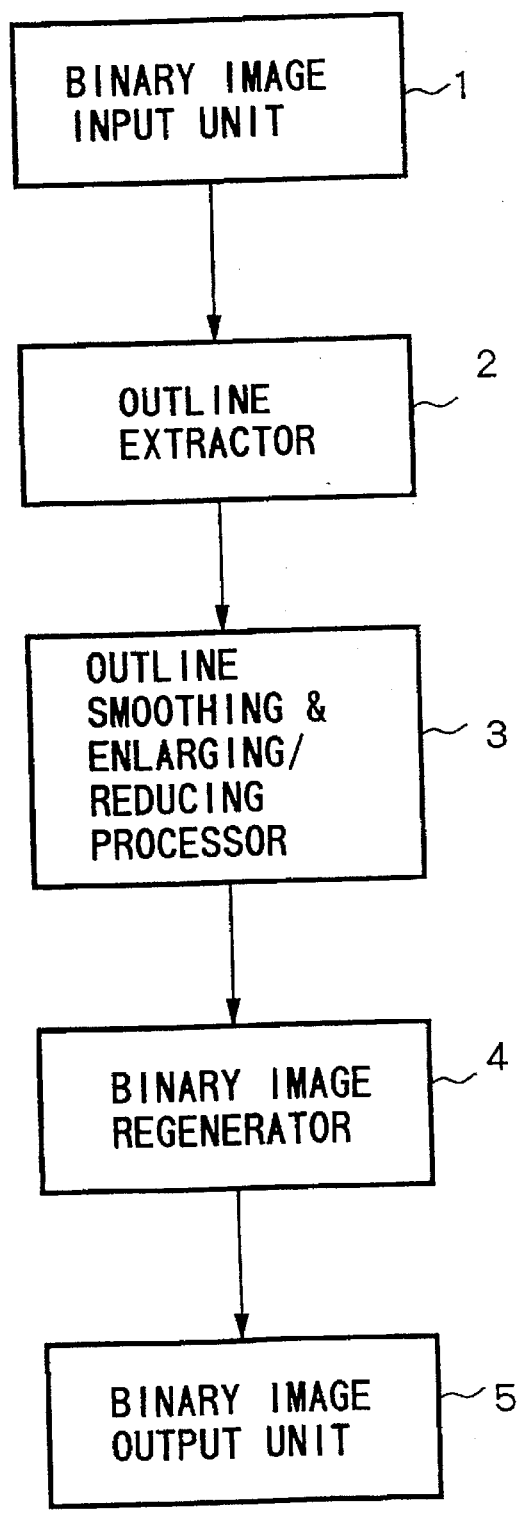
FIG. 1 is a block diagram showing the configuration of a binary image processing apparatus embodying the present invention.

FIG. 1 shows the configuration of the binary image processing apparatus according to the present invention. In FIG. 1, a binary image input unit 1 inputs a digital binary image to be enlarged/reduced, and outputs a raster-scanning type binary image. An outline extractor 2 extracts coarse-outline vectors from the binary image. An outline smoothing & enlarging/reducing processor 3 (hereinafter referred to as "outline processor 3") performs smoothing and enlarging/reducing on the coarse-outline vectors in a edge data format. A binary image regenerator 4 regenerates raster-scanning type binary image data represented by the outline edge data. A binary image output unit 5 displays the raster-scanning type binary image data, takes a hard copy, or outputs the binary image data onto a communication path.

The binary image input unit 1 comprises, e.g. a well-known raster-scanning type binary image output device that reads an image by an image reader, binarizes the read image and outputs image data in the form of raster-scanning. Upon extracting an outline vector from a binary image, the outline extractor 2 defines an outline point between a white pixel and a black pixel at a position closer to the black pixel, so as to extract a black pixel area smaller than a white pixel area having the same number of pixels as those of the black pixel area.

<Binary Image Input>

Figure 2:
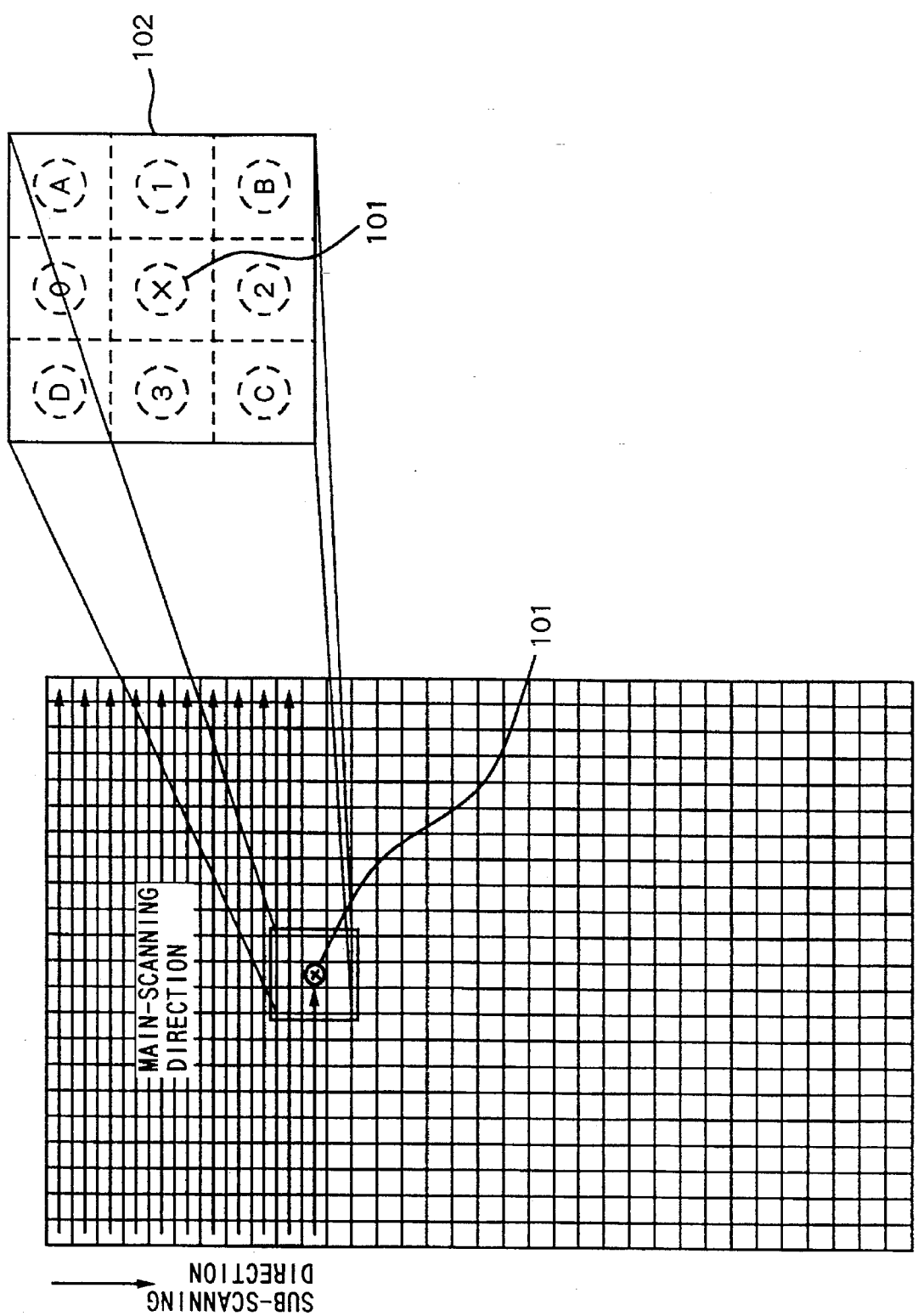
FIG. 2 is an explanatory view of inputting of a raster-scanning type binary image.

FIG. 2 shows the raster-scanning of binary image data which is outputted from the binary image input unit 1. The outline extractor 2 inputs the binary image data in this format. In FIG. 2, a pixel 101 represents one pixel in the binary image currently being raster-scanned. An area 102 is a 8-connected component including eight peripheral pixels around the pixel 101. The outline extractor 2 moves the object pixel in the raster-scanning order, and detects whether or not an outline vector (horizontal vector or vertical vector) exists between the object pixel and the peripheral pixels in accordance with a state of each pixel in the area 102 (white pixel or black pixel). If such vector exists, the outline extractor 2 extracts start point coordinates of the vector and vector direction information, and extracts coarse-outline vectors with updating the connecting relation between the vectors.

<Outline Vector Extraction>

Figure 3:
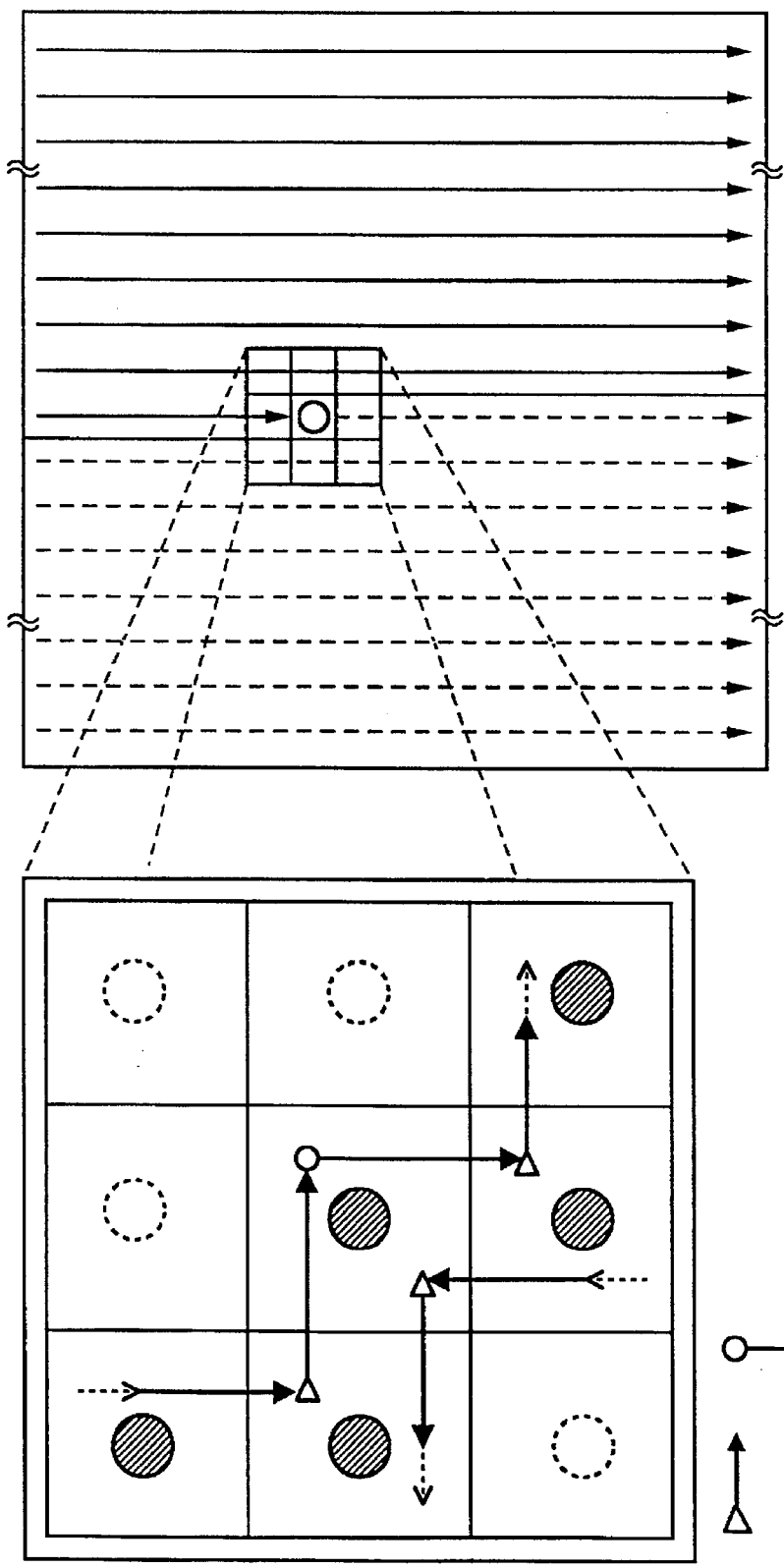
FIGS. 3 and 4 are explanatory views of outline extraction from the raster-scanning type binary image.
Figure 4:
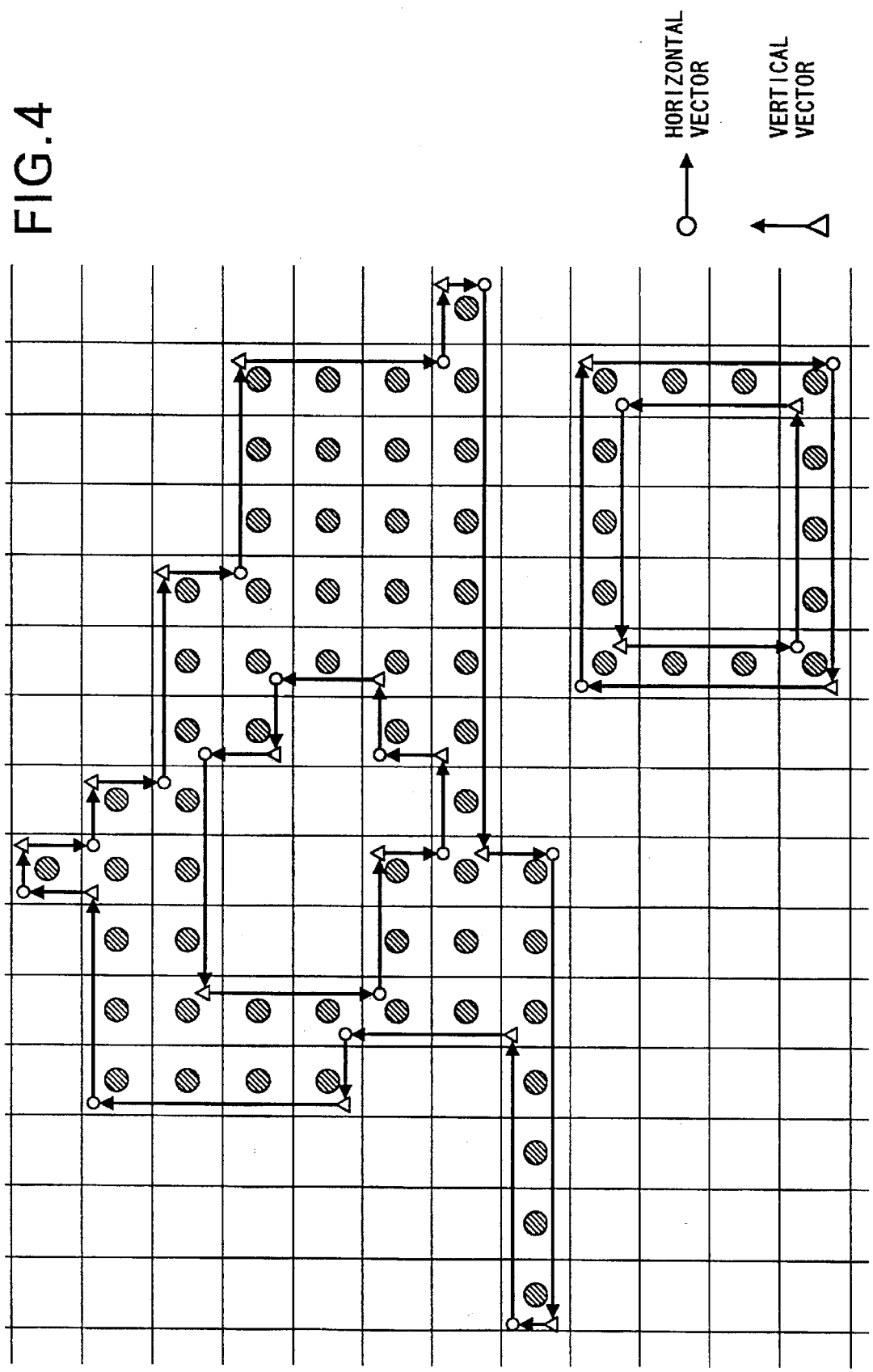

FIG. 3 shows an example of extraction of an outline vector between an object pixel and its peripheral pixels. In FIG. 3, a triangle represents a start point of a vertical vector; a circle, a start point of a horizontal vector. FIG. 4 shows a coarse-outline vector loop extracted by the outline extractor 2. In FIG. 4, each cell represents a pixel position of the input image. An empty cell represents a white pixel; a cell with a hatched circle, a black pixel. Similar to FIG. 3, a triangle represents a start point of a vertical vector; a circle, a start point of a horizontal vector. As it is understood from the example in FIG. 4, the outline extractor 2 extracts an area in which black pixels are connected as a coarse-outline vector loop in which horizontal vectors and vertical vectors alternate with each other, in a manner that pixels right of the vectors are always black pixels.

The outline extractor 2 extracts each coarse-outline vector start point (hereinafter, also referred to as "coarse-outline point") as a neutral point, positioned between a white pixel of a white pixel area and a black pixel of a black pixel area, but also positioned closer to the black pixel. The outline extractor 2 further extracts a line of the original image, which has one-pixel width, as a coarse-outline loop having a processible width. In the present embodiment, the coarse-outline points are defined at a position closer to the black pixel side by ¼ pixel length from the neutral position between a black pixel and a white pixel.

Figure 10:
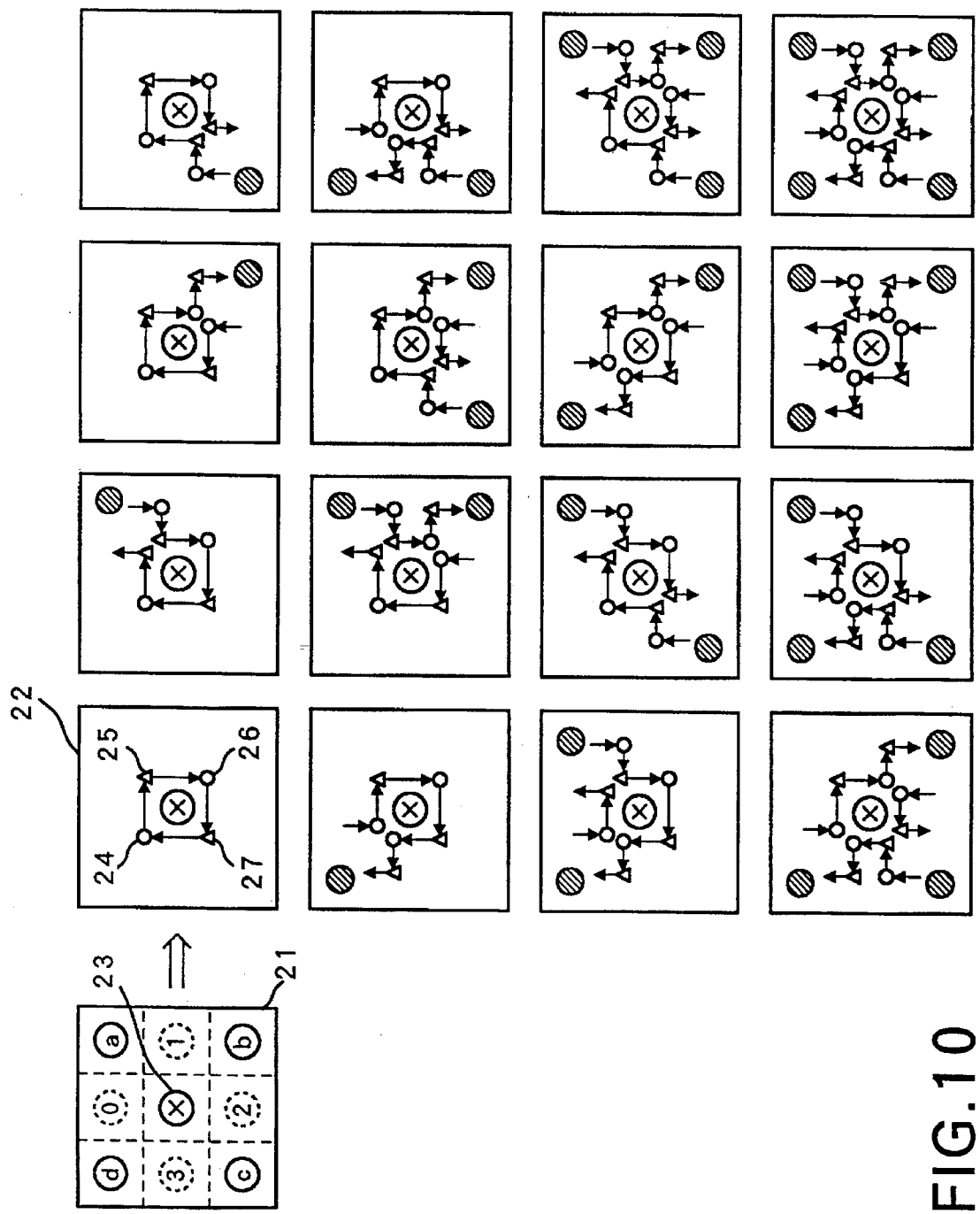
FIG. 10 illustrates an example of the relation between an original image pixel and outline vectors to be extracted.

As to pixel position indication, a position at which a pixel is located is indicated by a positive integer both in main-scanning and sub-scanning directions. The pixel position is indicated by two-dimensional coordinates. For example, FIG. 10 shows an outline vector extraction states with respect to a black pixel as an object pixel having four white pixels as peripheral pixels (0, 1, 2, 3). Assuming that the position of the object pixel 23 is (3, 7), i.e., the third pixel in the seventh raster-scanning line, the four vectors shown in matrix 22 are represented as four continuous vectors with a start point 24 (2.75, 6.75), an end point 25 (3.25, 6.75), a start point 26 (3.25, 7.25) and an end point 27 (2.75, 7.25).

Representing these vectors as [start-point coordinates, end-point coordinates] results in:

[(2.75, 6.75), (3.25, 6.75)]
[(3.25, 6.75), (3.25, 7.25)]
[(3.25, 7.25), (2.75, 7.25)]
[(2.75, 7.25), (2.75, 6.75)]

To avoid decimals, a pixel position will be represented by a multiple of a positive integer four; a vector start point position, an integer (odd number) obtained from adding or subtracting a multiple of the integer four. That is, an image having m×n pixels (m: number of pixels, n: number of lines) will be represented by 4m×4n integer (multiple of four) coordinate representation. In case of the matrix 22 in FIG. 10, the position of the object pixel are (12, 28), and the start and end points are respectively (11, 27), (13, 27), (13, 29) and (11, 29). From these coordinates, the four vectors are represented as follows:

[(11, 27), (13, 27)]
[(13, 27), (13, 29)]
[(13, 29), (11, 29)]
[(11, 29), (11, 27)]

Hereinafter, a binary image will be represented as m-pixels×n-raster scanning lines (m, n: positive integer), and the position of the i-th pixel in the j-th raster scanning line will be (4i, 4j) (i, j: positive integer, i≦m, j≦n). The coordinates of coarse-outline points will be an integer (positive odd number).

Figure 5:
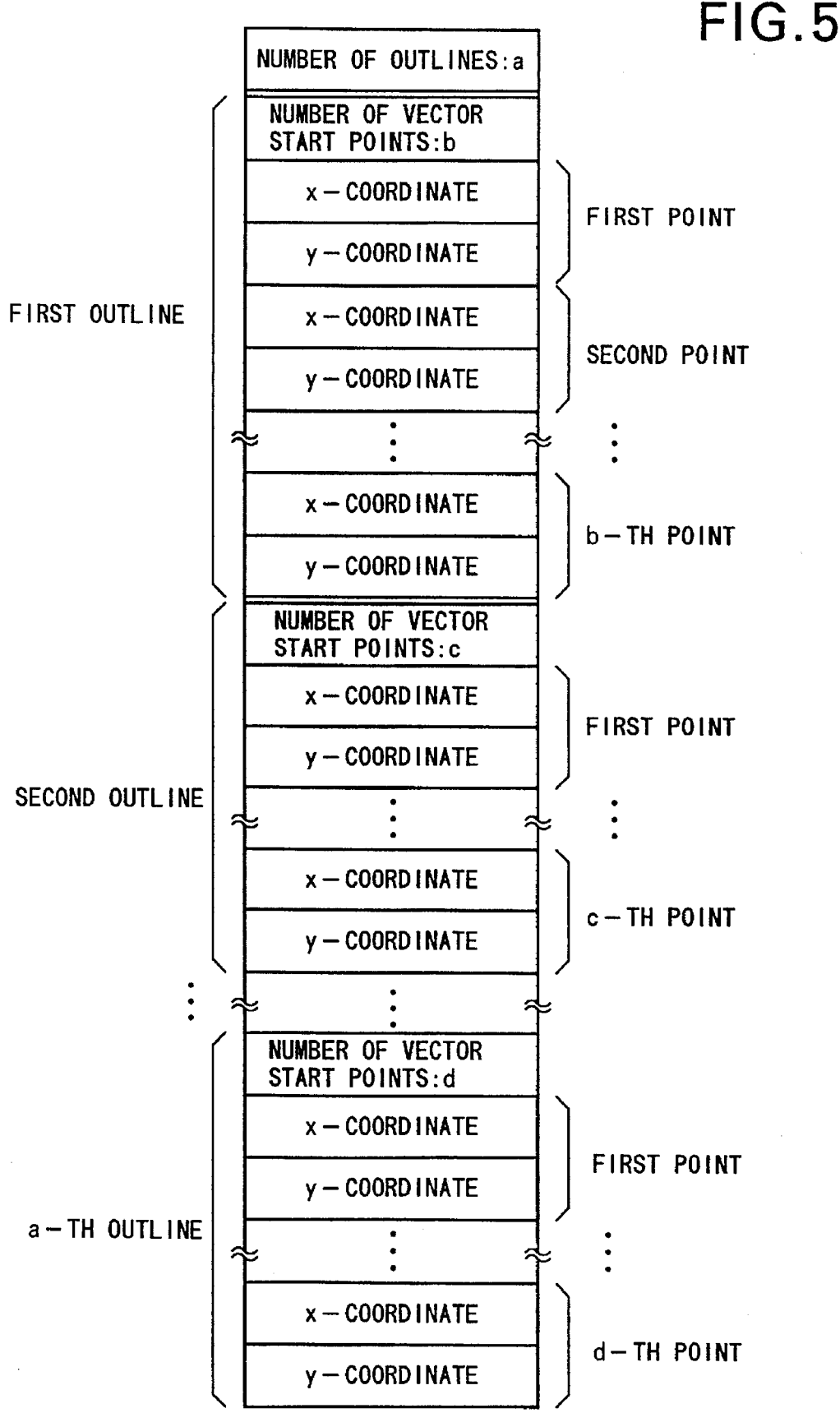
FIG. 5 illustrates an outline data format outputted by an outline extractor in FIG. 1.

The coarse-outline vector loops are outputted from the outline extractor 2 in a data format as shown in FIG. 5. The format comprises the number of loops a and respective coarse-outline loop data from the first loop to the a-th loop. Each coarse-outline loop data has the number of outline vector start points (or the number of outline vectors) and respective vector start point coordinate values (x-coordinate, y-coordinate) in loop-forming order (a horizontal vector and a vertical vector alternate).

<Outline Smoothing & Enlarging/Compressing>

Figure 6:
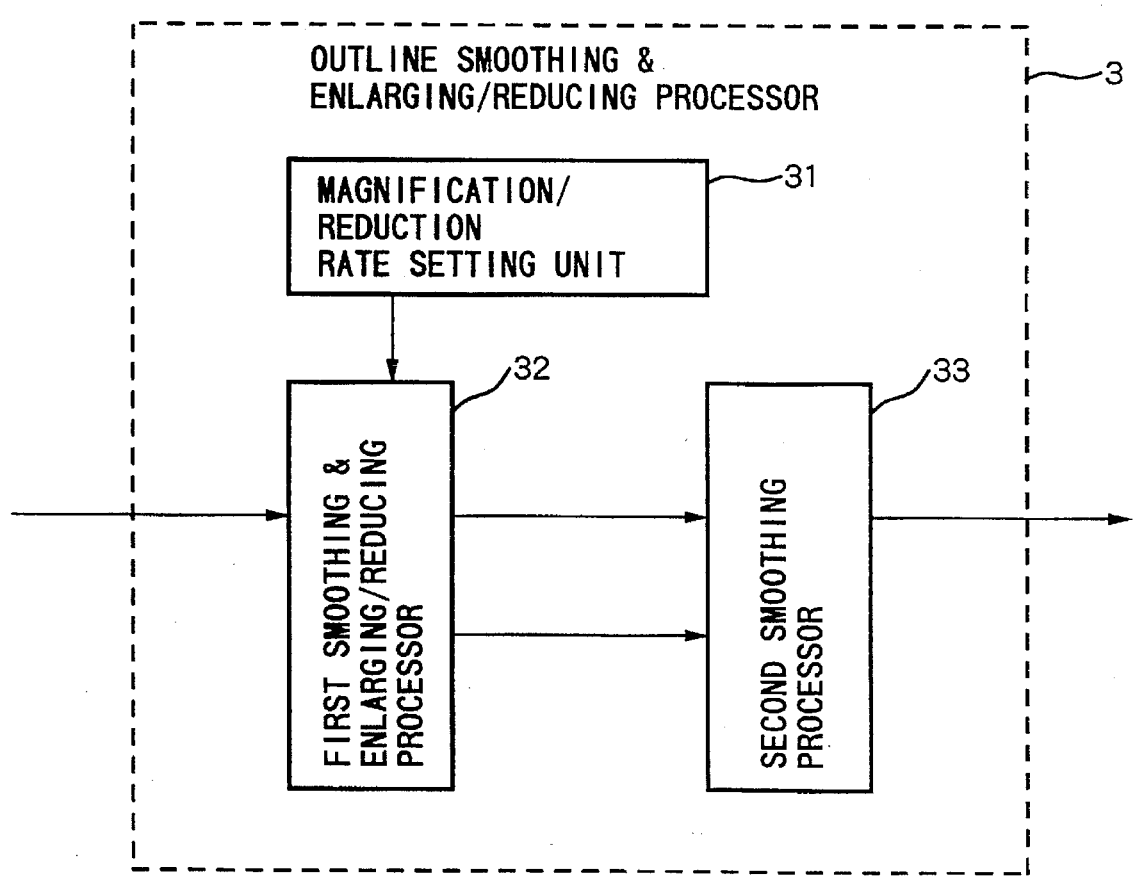
FIG. 6 is a block diagram showing the functional construction of an outline smoothing & enlarging/reducing processor in FIG. 1.

Next, the outline smoothing & enlarging/reducing processor 3 inputs coarse-outline edge data outputted from the outline extractor 2, and performs smoothing and enlarging/reducing on the outline edge data (coordinate value) format. FIG. 6 shows the functional construction the outline processor 3. In FIG. 6, a first smoothing & enlarging/reducing processor 32 (hereinafter referred to as "first processor 32") performs smoothing and enlarging/reducing on the input coarse-outline data at a magnification/reduction ratio set by a magnification/reduction ratio setting unit 31 (hereinafter referred to as "ratio setting unit 31"). A second smoothing processor 33 (hereinafter referred to as "second processor 33") performs further smoothing on an output from the first processor 32 and outputs the smoothing result as a final output.

The ratio setting unit 31 may provide a fixed value, set by a dip switch or a dial switch in advance, to the first processor 32. Otherwise, the ratio setting unit 31 may be an external device to provide the value via an interface. The ratio setting unit 31 provides information for enlarging/reducing an input image size in a main-scanning (horizontal) direction and a sub-scanning (vertical) direction, independent of each other.

The first processor 32 obtains the magnification/reduction information from the ratio setting unit 31 and performs smoothing and enlarging/reducing.

Figure 7:
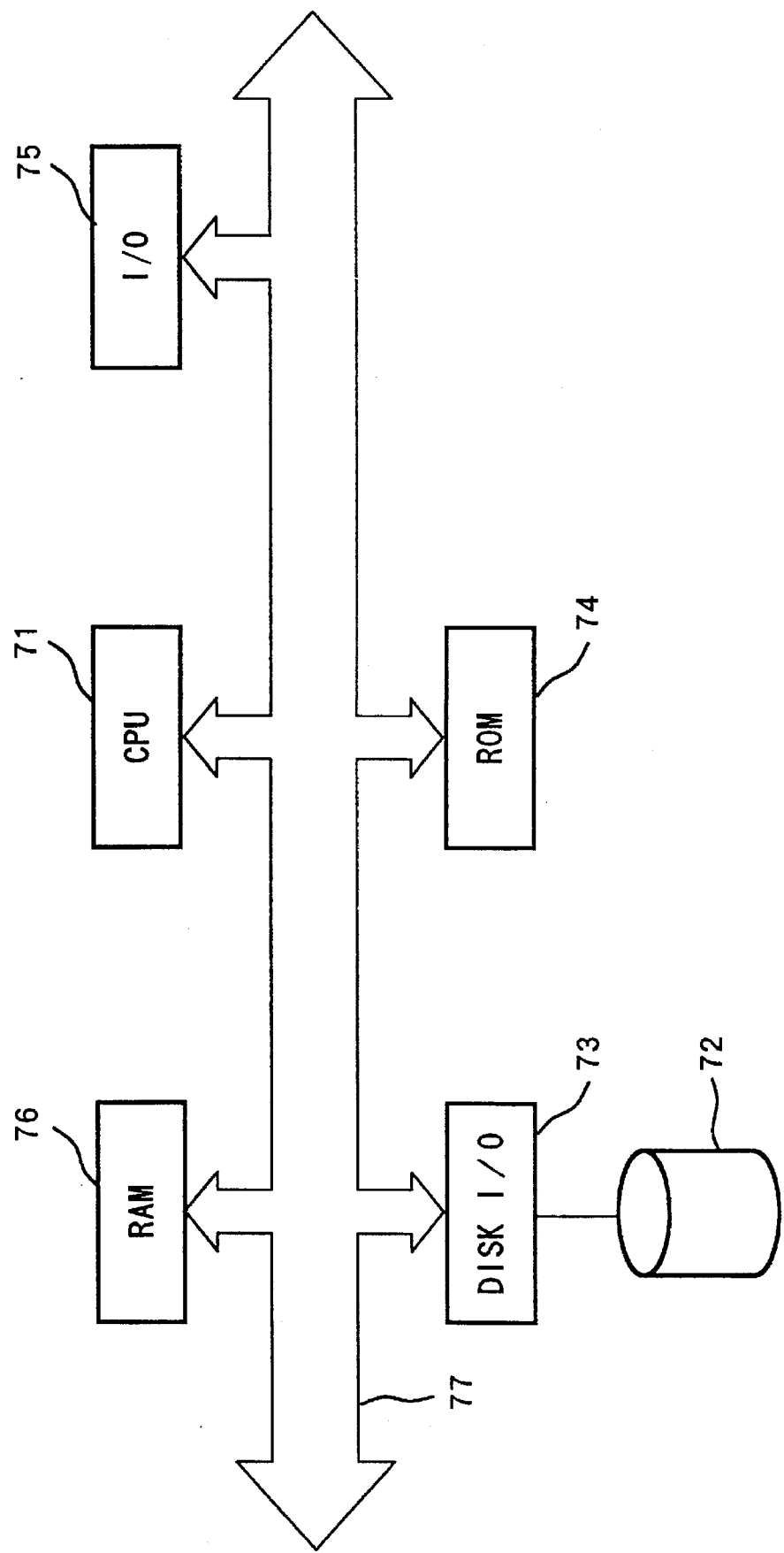
FIG. 7 is a block diagram showing the construction of the outline smoothing & enlarging/reducing processor.

FIG. 7 shows the construction of the outline processor 3. In FIG. 7, reference numeral 71 denotes a CPU; 72, a memory disk unit; 73 a disk I/O; 74, a ROM; 75, an I/O port; 76, a RAM; and 77, a bus connecting the respective elements.

The outline extractor 2 output is coarse-outline edge data of the data format shown in FIG. 5 and is stored in the disk 72 as a file.

Figure 8:
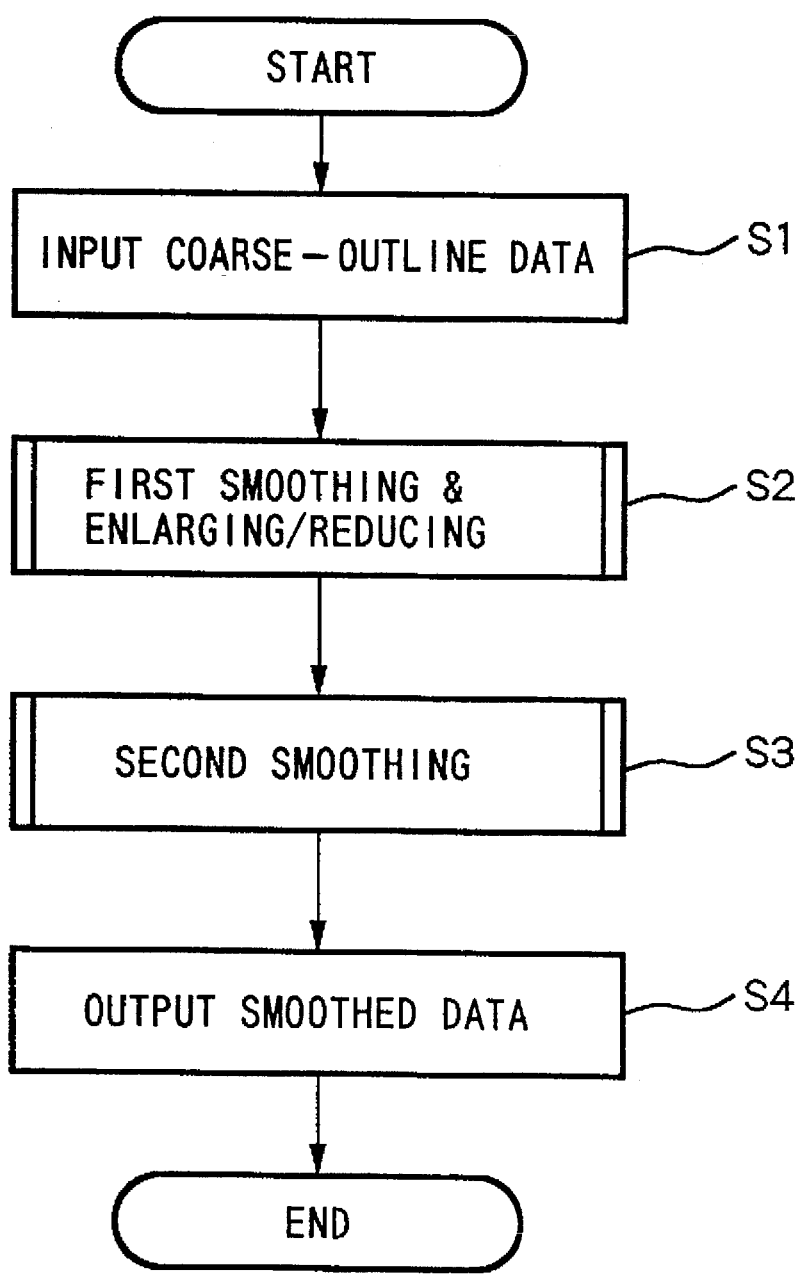
FIG. 8 is a flowchart showing an outline of an outline smoothing & enlarging/reducing processing.
Figure 9:
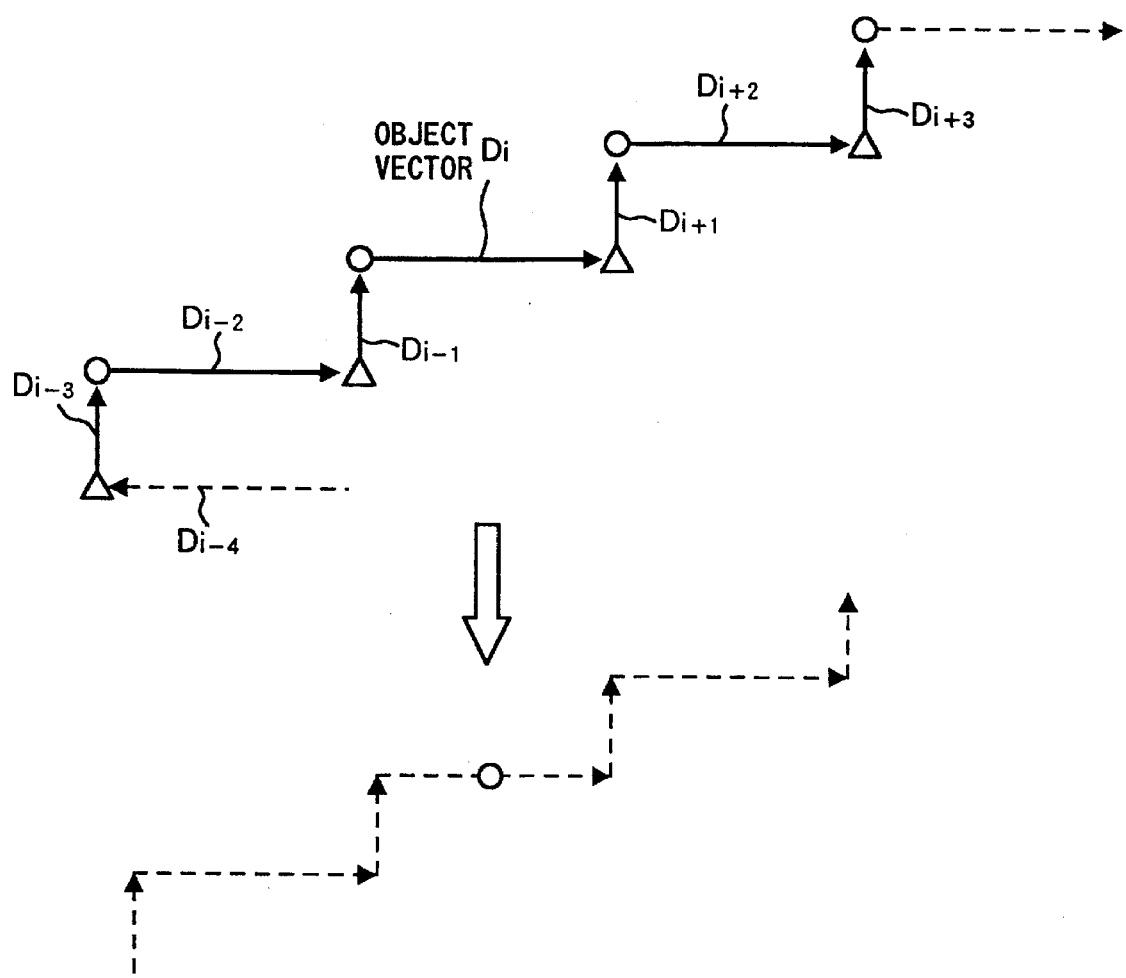
FIG. 9 is an explanatory view of a first smoothing.

The CPU 71 operates in accordance with the procedure outlined in FIG. 8 to execute the outline processing. In step S1, the CPU 71 reads coarse-outline edge data stored in the disk 72 via the disk I/O 73 and stores the read data into the RAM 76. In step S2, the CPU 71 executes the first smoothing & enlarging/reducing in coarse-outline vector loop units. In each outline edge data, outline vectors (horizontal or vertical vectors) are sequentially examined, and classified in accordance with vector pattern which is formed by seven vectors at most (combination of vector length and direction of the object vector and those of the preceding three vectors and the subsequent three vectors). An outline point after the first smoothing is defined by respect to each pattern. The CPU 71 outputs a coordinate value of the outline point after the first smoothing and additional information indicating whether or not the outline point is a corner point (hereinafter, this additional information will be referred to as "corner point information"). An outline point determined as a corner point will not be smoothed in the second smoothing, while an outline point determined as a non-corner point will be smoothed in the second smoothing in step S3. FIG. 9 shows an object outline vector $D_i$ with three preceding vectors $D_{i-1}$, $D_{i-2}$ and $D_{i-3}$ and three subsequent vectors $D_{i+1}$, $D_{i+2}$ and $D_{i+3}$, and an outline point defined after the first smoothing with respect to the object outline vector $D_i$.

It should be noted that one coarse-outline loop may be defined by four vectors in accordance with an output from the outline extractor 2. In this case, a preceding vector of an object vector and a subsequent vector may be the same. That is, in a case where one loop consists of four vectors, vectors $D_{i-3}$ and $D_{i+1}$, vectors $D_{i-2}$ and $D_{i+2}$, and vectors $D_{i-1}$ and $D_{i+3}$ actually have the same direction and the same length. In a case where one loop consists of six vectors, vectors $D_{i-3}$ and $D_{i+2}$, $D_{i-2}$ and $D_{i+3}$ are actually the same vectors.

It should be noted that in the case of a loop consisting of four vectors, there is a rule for defining outline point data after the first smoothing with respect to a coarse-outline loop instead of defining an outline point with respect to each object vector.

[Rules for First Smoothing]

Next, the first smoothing rules for defining a length-and-direction pattern of the combination of vector length and direction of an object vector and those of at most three preceding vectors and at most three subsequent vectors, and for defining an outline point to be outputted after the first smoothing with respect to the object vector of one pattern will be described.

Coarse-outline data as an input is given in the data format as shown in FIG. 5. In each outline loop, when the number of outline points (start points of outline vectors) is n, a vector having the first outline point as the vector start point and the second outline point as the vector end point is the first vector; a vector having the second outline point as the vector start point and the third outline point as the vector end point is the second vector; a vector having the i-th (i<n) outline point as the vector start point and the i+1-th outline point as the vector end point is the i-th vector; and a vector having the n-th outline point (the last point in the outline loop) as the vector start point and the first outline point as the vector end point is the n-th vector. As described above, each outline loop consists of an even-number of vectors including vertical vectors and horizontal vectors which alternate with each other.

In a vertical vector, as the x-coordinate of the vector start point and that of the vector end point are the same, the y-coordinate of the start point is subtracted from that of the end point so that the length and direction of the vertical vector is defined based on the subtraction result. This definition is referred to as "edge data". Specifically, the absolute value of the difference between the y-coordinates is defined as the vector length. If the difference is a negative value, the vector direction is regarded as "upward", while if the difference is a positive value, the direction is regarded as "downward". This definition is based on the fact that the outline extractor takes a y-coordinate (sub-scanning direction) with a direction from the upper end to the lower end of the of the y-axis as "positive".

In a horizontal vector, as the y-coordinate of the vector start point and that of the vector end point are the same, the x-coordinate of the end point is subtracted from that of the start point. The length and direction of the horizontal vector is defined using the subtraction result, i.e., the absolute value of the difference between the x-coordinates is defined as the vector length, and if the difference is a negative value, the vector direction is regarded as "leftward", while if the difference is a positive value, the direction is regarded as "rightward". Also, this definition is based on the fact that the outline extractor takes an x-coordinate (main-scanning direction) with a direction from the left end to the right end of the of the x-axis as "positive".

<Isolated Dot (FIG. 11)>

Figure 11:
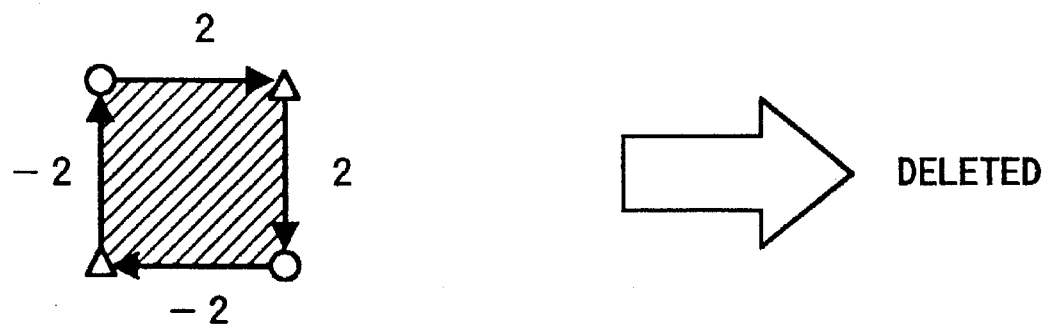

FIG. 11 shows processing on an outline loop consists of continuously connected four vectors in a clockwise direction (from the top, rightward, downward, leftward and upward). The vectors all have length "2" (corresponding to ½ pixel length when an interval between two original image pixels in a main-scanning/sub-scanning direction, i.e., one pixel length is assumed to be 4). In this case, the outline loop is deleted. To check whether the above conditions are satisfied or not, whether or not the number of outline points is four is examined. Further, if the first horizontal edge data is "2", whether or not the subsequent vertical edge data is also "2", otherwise, if the first horizontal edge data is "−2", whether or not the subsequent vertical edge data is also "−2" is examined. If these conditions are satisfied, the outline loop is in an isolated state as shown in FIG. 11. This rule functions as deleting of such state of outline loop, i.e., an isolated dot which is a kind of noise characteristic of a binary image obtained from binarization on multi-level image data read by an image reader.

<One-Dot Notch>

Figure 12:
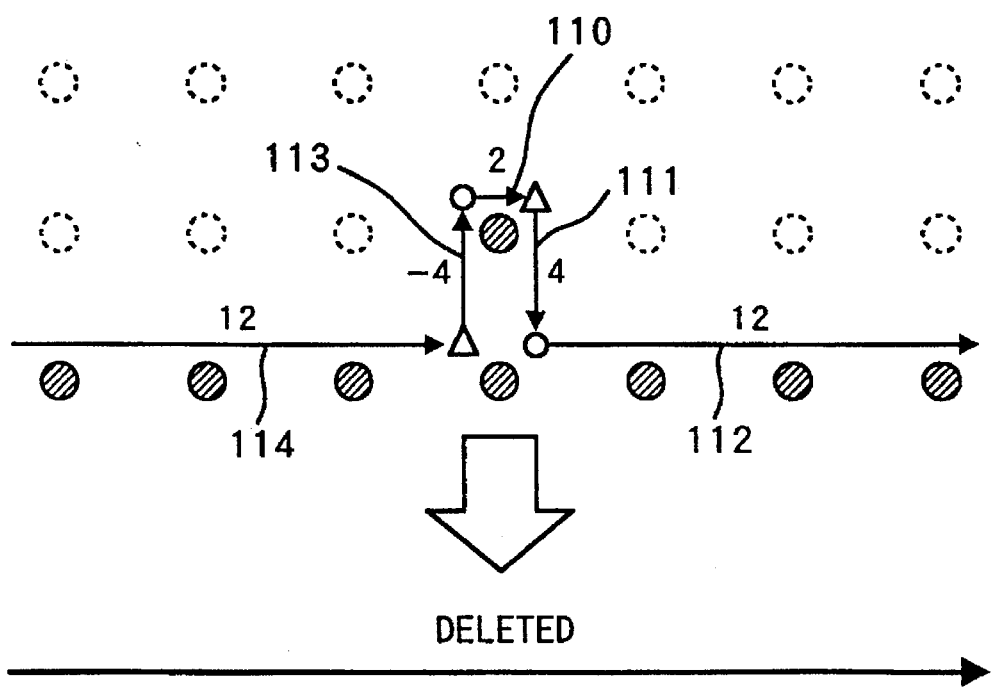
Figure 13:
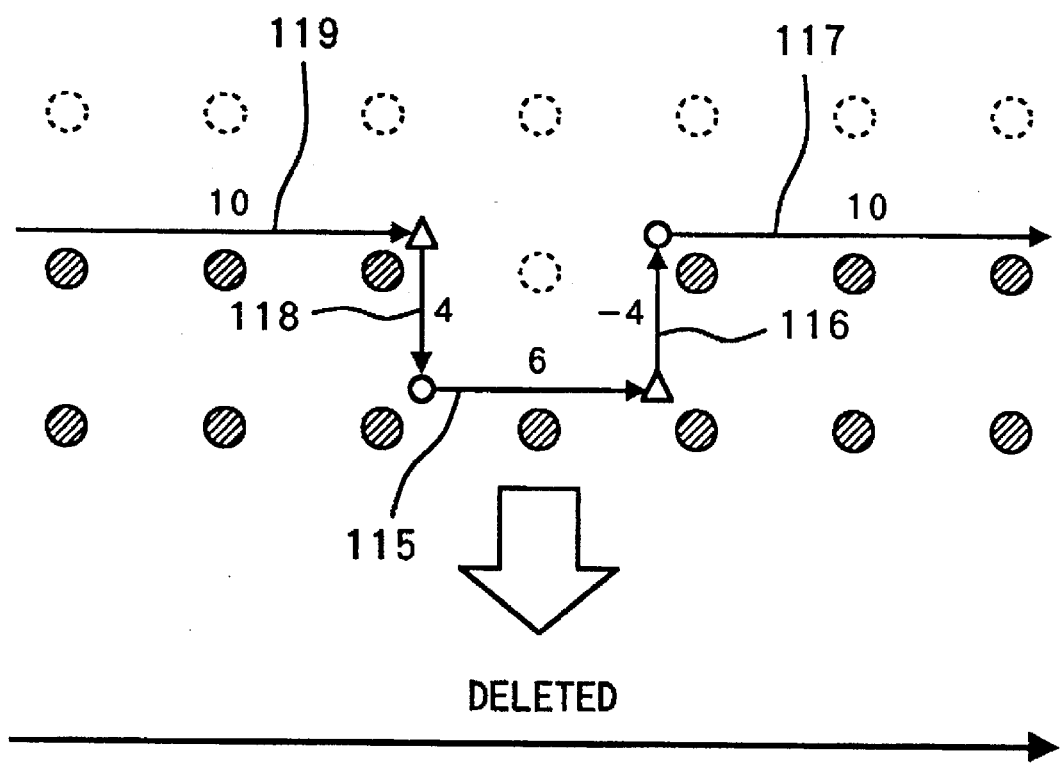
Figure 14:
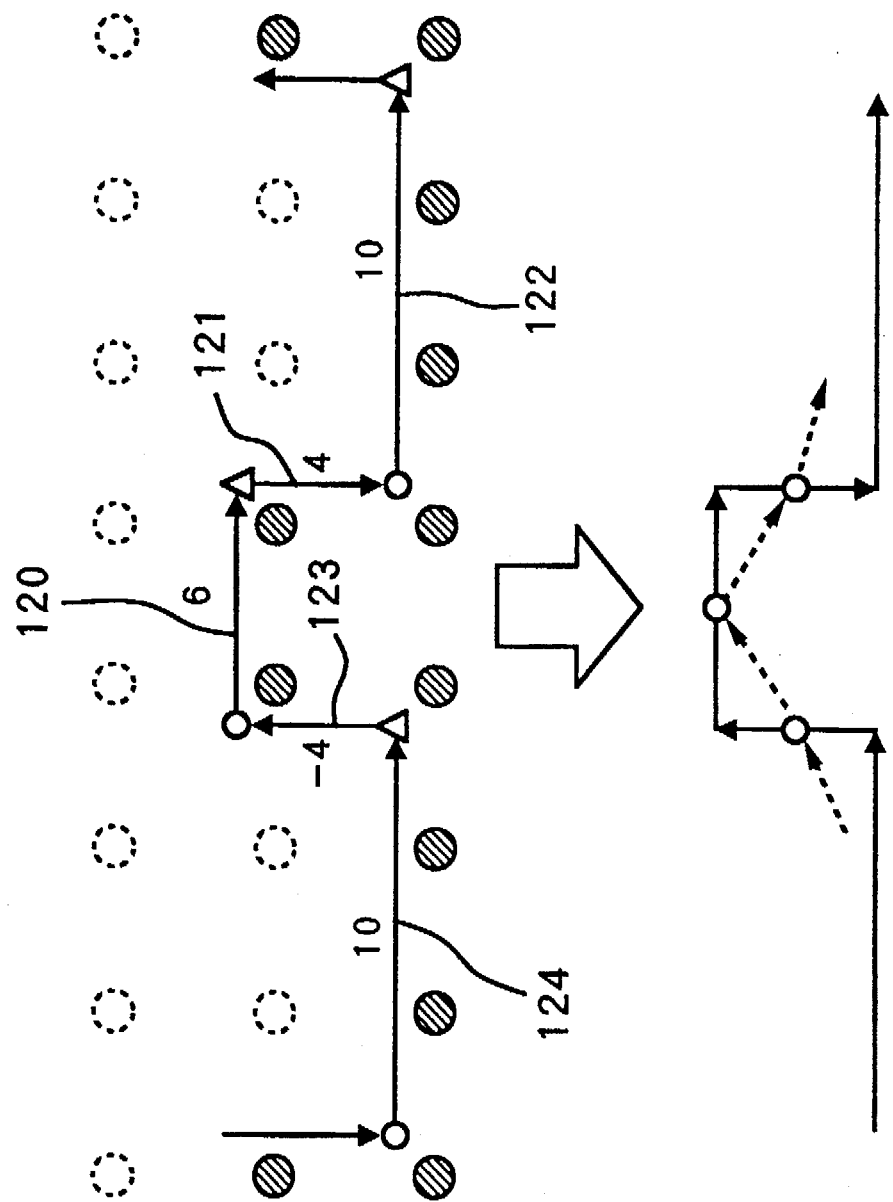

FIGS. 12 and 13 are explanatory views of rules for deleting a one-dot notch characteristic of a binary image obtained from binarization on image data read by an image reader.

FIG. 12 shows processing on an outline where a central vector 110 has length "2" (i.e., the absolute value of edge data is "2"), its preceding and subsequent vectors 113 and 111 have the same length "4", the directions of the preceding and subsequent vectors are opposed to each other, further, a vector 114 prior to the vector 113 and a vector 112 following the vector 111 have the length which is "12" or longer and the same direction as the central vector 110. If the central vector is in rightward direction (i.e., the edge data is horizontal and positive), the direction of the preceding vector is upward (the edge data is negative) and that of the subsequent vector is downward (the edge data is positive). If the central vector is in a leftward direction (i.e., the edge data is horizontal and negative), the direction of the preceding vector is downward (the edge data is positive) and that of the subsequent vector is upward (the edge data is negative).

If the direction of the central vector is downward (the edge data is vertical and positive), the direction of the preceding vector is rightward (the edge data is positive), and that of the subsequent vector is leftward (the edge data is negative). If the direction of the central vector is upward (the edge data is vertical and negative), the direction of the preceding vector is leftward (the edge data is negative), and that of the subsequent vector is rightward (the edge data is positive). Whether or not the above conditions are satisfied can be checked by examining patterns of combination of edge data each indicating an object vector and its preceding and subsequent vectors, regarding each of consecutive three vectors as object vector. Patterns of combinations of edge data are made by taking the central edge of the one-dot notch (the vector 110 in FIG. 12), the preceding edge (the vector 113) and the subsequent edge (the vector 111) as object vectors respectively, and defining combinations of edge data with respect to the respect object vectors.

In FIG. 12, in a pattern having the vector 113, the edge preceding the central edge of the one-dot notch, as the object vector, the length of the object vector is "4", that of the following vector 110 is "2" and that of the vector 114 prior to the object vector 113 is "12" or longer. The direction of the vector 114 and that of the vector 110 are the same. The length of the vector 111 is "4" and its direction is opposite to that of the object vector 113. In this pattern, no outline point is given to the vector 113 which precedes the central vector of one-dot notch after the first smoothing.

In a pattern having the vector 110, the central edge of the one-dot notch, as the object vector, the length of the vector 110 is "2", and that of the preceding vector 113 and that of the subsequent vector 111 are "4". The direction of the vector 113 and that of the vector 111 are opposite to each other (the signs of the edge data are different). The length of the vector 114 and that of the vector 112 are "12" or longer, and the direction of the vector 114 and that of the vector 112 are the same as that of the object vector 110. In this pattern, no outline point is given to the vector 110, central vector of the one-dot notch, after the first smoothing.

In a pattern having the vector 111, the edge subsequent to the central edge of the one-dot notch, as the object vector, the length of the object vector 111 is "4", that of the preceding vector 110 is "2", and that of the subsequent vector 112 is "12" or longer. The direction of the vector 110 and the that of the vector 112 are the same. The length of the vector 113 prior to the vector 110 is "4", and its direction is opposite to that of the object vector 111. In this pattern no outline point is given to the vector 111, following vector of the central vector of the one-dot notch, after the first smoothing.

It should be noted that FIG. 12 shows only a one-dot notch having a rightward horizontal vector as the central vector, however, the above conditions are applicable to a one-dot notch having a leftward horizontal vector as the central vector, a one-dot notch having an upward vertical vector as the central vector, and a one-dot notch having a downward vertical vector as the central vector.

FIG. 13 shows processing on an outline where a central vector 115, as the object vector of five consecutive vectors has length "6" (i.e., the absolute value of edge data is "6"), edge data of a preceding vector 118 is "4", edge data of a subsequent vector 116 is "−4", and edge data of a vector 119 preceding the vector 118 and that of a vector 117 following the vector 116 are "10" or greater. The direction of the vector 119 and that of the vector 117 are the same as that of the central vector 115. If the direction of the object vector 115 is rightward (the horizontal edge data is positive), the direction of the preceding vector 118 is downward (the vertical edge data is positive) and that of the subsequent vector 116 is upward (the vertical edge data is negative). If the direction of the object vector 115 is leftward (the horizontal edge data is negative), the direction of the preceding vector 118 is upward (the vertical edge data is negative) and that of the subsequent vector 116 is downward (the vertical edge data is positive). If the direction of the object vector 115 is downward (in case of positive vertical data), the direction of the preceding vector 118 is leftward (the horizontal edge data is negative) and that of the subsequent vector 116 is rightward (the horizontal edge data is positive). If the direction of the object vector 115 is upward (in case of negative vertical data), the direction of the preceding vector 118 is rightward (the horizontal edge data is positive) and that of the subsequent vector 116 is leftward (the horizontal edge data is negative).

Whether or not the above conditions are satisfied can be checked by examining patterns of combination of edge data each indicating an object vector and its preceding and subsequent vectors, regarding each of consecutive three vectors as the object vector. Patterns of combinations of edge data are made by taking the central edge of the one-dot notch (the vector 115 in FIG. 13), the preceding edge (the vector 118) and the subsequent edge (the vector 116) as object vectors respectively, and defining combinations of edge data with respect to the respect object vectors.

In FIG. 13, in a pattern having the vector 118, the edge preceding the central edge of the one-dot notch, as the object vector, the object vector is vertical and the edge data of the object vector is "−4", that of the following vector 115 is "6", that of the vector 119 prior to the object vector 118 is "10" or greater, and that of the vector 116 following the following vector 115 is "−4". In this pattern, no outline point is defined at the object vector 118 after the first smoothing.

In a pattern having the vector 115, the central edge of the one-dot notch, as the object vector, the edge data of the object vector is "6", that of the preceding vector 118 is "4", that of the subsequent vector 116 is "−4", and that of the vector 119 prior to the vector 118 and that of the vector 117 following the vector 116 are "10" or greater. In this pattern, no outline point is defined at the object vector 115 after the first smoothing.

In a pattern having the vector 116, the edge subsequent to the central edge of the one-dot notch, as the object vector, the edge data of the object vector is "−4", that of the preceding vector 115 is "6", that of the vector 117 following the object vector 116 is "10" or greater, and that of the vector 118 prior to the vector 115 is "4". In this pattern, no outline point is defined at the object vector 16 after the first smoothing.

It should be noted that FIG. 13 shows only a one-dot notch having a rightward horizontal vector as the central vector, however, the above conditions are applicable to a one-dot notch having a leftward horizontal vector as the central vector. In this case, the conditions of the vertical and horizontal edge data are changed so that the positive/negative sign becomes opposite and the expression "or greater" becomes "or less". In a case where the central vector is an upward vertical vector, the conditions of the vertical edge data are changed so that the positive/negative sign becomes opposite and the expression "or greater" becomes "or less". In a case where the central vector is a downward vertical vector, the conditions of the horizontal edge data are changed so that the positive/negative sign becomes opposite and the expression "or greater" becomes "or less".

<Series of Notches (FIG. 15)>

Figure 15:
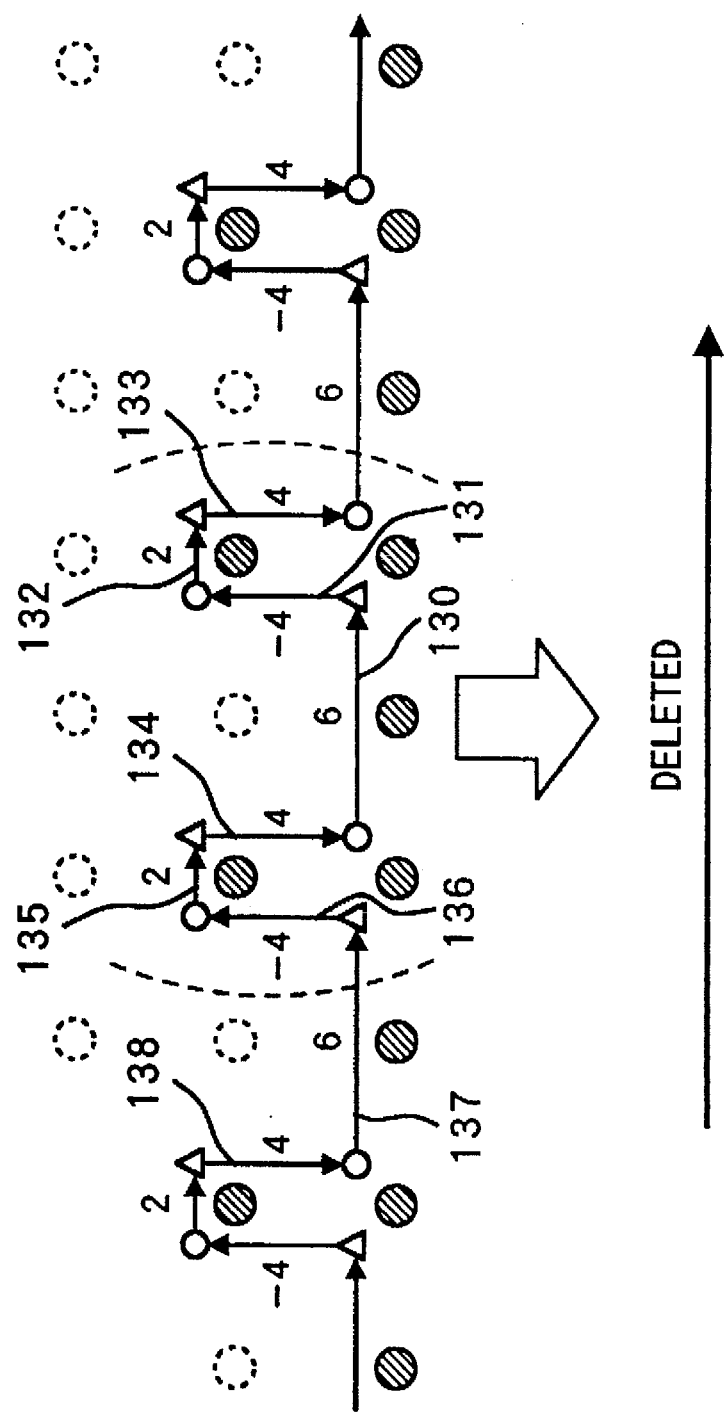

FIG. 15 shows deletion of a series of notches, occurred at every other pixel, characteristic of a binary image obtained from binarization of data read by an image reader. In FIG. 15, a central vector 130, as the object vector of seven vectors (within dot lined brackets), has a length "6" (1½ pixel length). The direction of a vector 135, the central vector of a notch prior to the vector 130, and that of a vector 132, the central vector of a notch following the vector 130, are the same as that of the object vector, and the length of these vectors is "2" (½ pixel length). The direction of a vector 134 prior to the object vector 130 and that of a vector 131 following the object vector 130 are opposite to each other, and the lengths of these vectors are respectively "4" (one pixel length). Similarly, The direction of a vector 136 prior to the vector 135 and that of a vector 133 following the vector 132 are opposite to each other, and the lengths of these vectors are respectively "4". This case is determined based on whether or not an object vector and its preceding and subsequent vectors meet the above-described conditions. If the object vector is a horizontal vector, an outline point after the first smoothing is defined by an x-coordinate value the same as that of the central point of the object vector and a y-coordinate value the same as that of the central point of the preceding vector. If the object vector is a horizontal vector, an outline point after the first smoothing is defined by an x-coordinate value the same as that of the central point of the preceding vector and a y-coordinate value the same as that of the central point of the object vector.

Further, FIG. 15 shows seven vectors having the vector 135 as the central vector. The length of the object vector 135 is "2" (½ pixel length), that of a vector 137, two-vector prior to the object vector 135, and the vector 130, two-vector subsequent to the object vector 135, are "6" (1½ pixel length), and the direction of the vector 137 and that of the vector 130 are the same as that of the object vector 135. The direction of a vector 136 prior to the object vector 135 and that of a vector 134 following the object vector 135 are opposite to each other, and both of the lengths of these vectors are "4" (one pixel length). Similarly, the direction of a vector 138 and that of a vector 131 following the vector 132 are opposite to each other, and both of the lengths of these vectors are "4". Also this case is determined based on whether or not an object vector and its preceding and subsequent vectors meet the above-described conditions. If the object vector is a horizontal vector, an outline point after the first smoothing is defined by an x-coordinate value the same as that of the central point of the object vector and a y-coordinate value the same as that of the central point of the preceding vector. If the object vector is a vertical vector, an outline point after the first smoothing is defined by an x-coordinate value the same as that of the central point of the preceding vector and a y-coordinate value the same as that of the central point of the object vector.

FIG. 15 shows a case where the object vector is a rightward horizontal vector. In a case where the object vector is a leftward horizontal vector, the conditions of the vertical and horizontal edge data are changed so that the positive/negative sign becomes opposite. In a case where the central vector is an upward vertical vector, the conditions of the vertical edge data are changed so that the positive/negative sign becomes opposite. In a case where the central vector is a downward vertical vector, the conditions of the horizontal edge data are changed so that the positive/negative sign becomes opposite.

<Narrow Line (FIGS. 16 and 17)>

Figure 16:
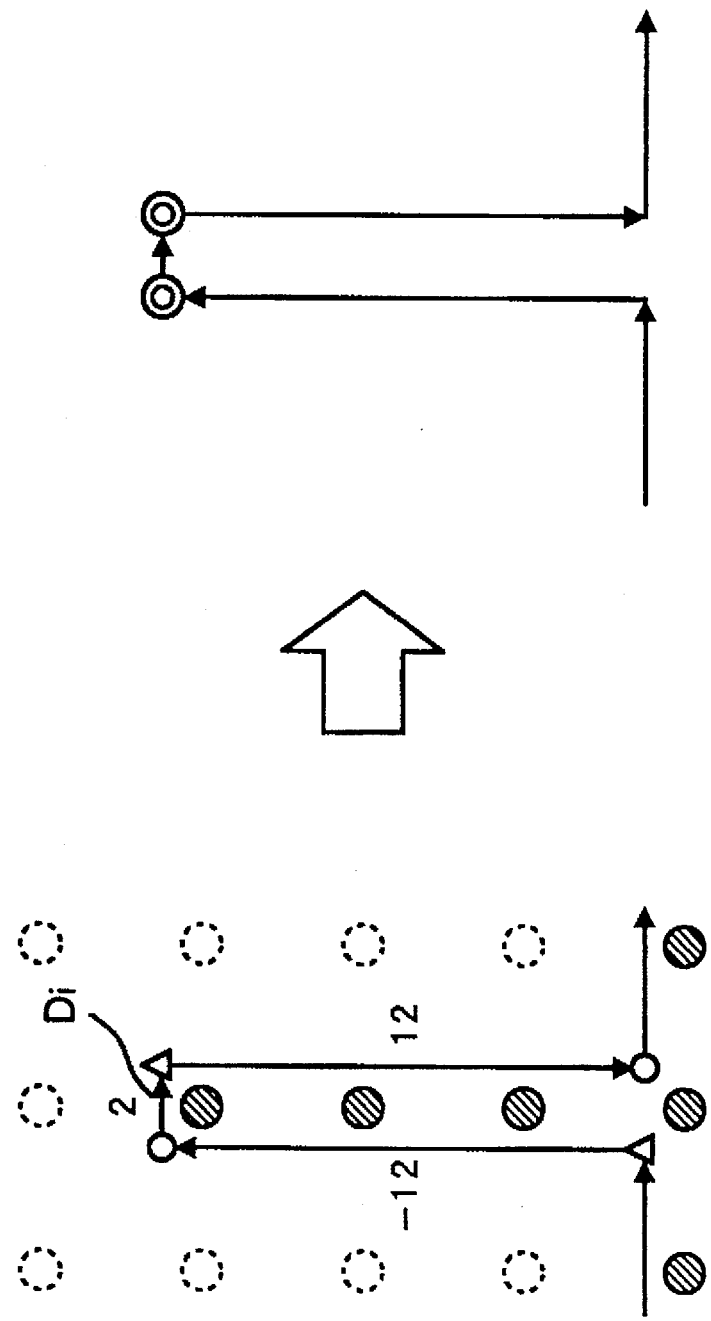
Figure 17:
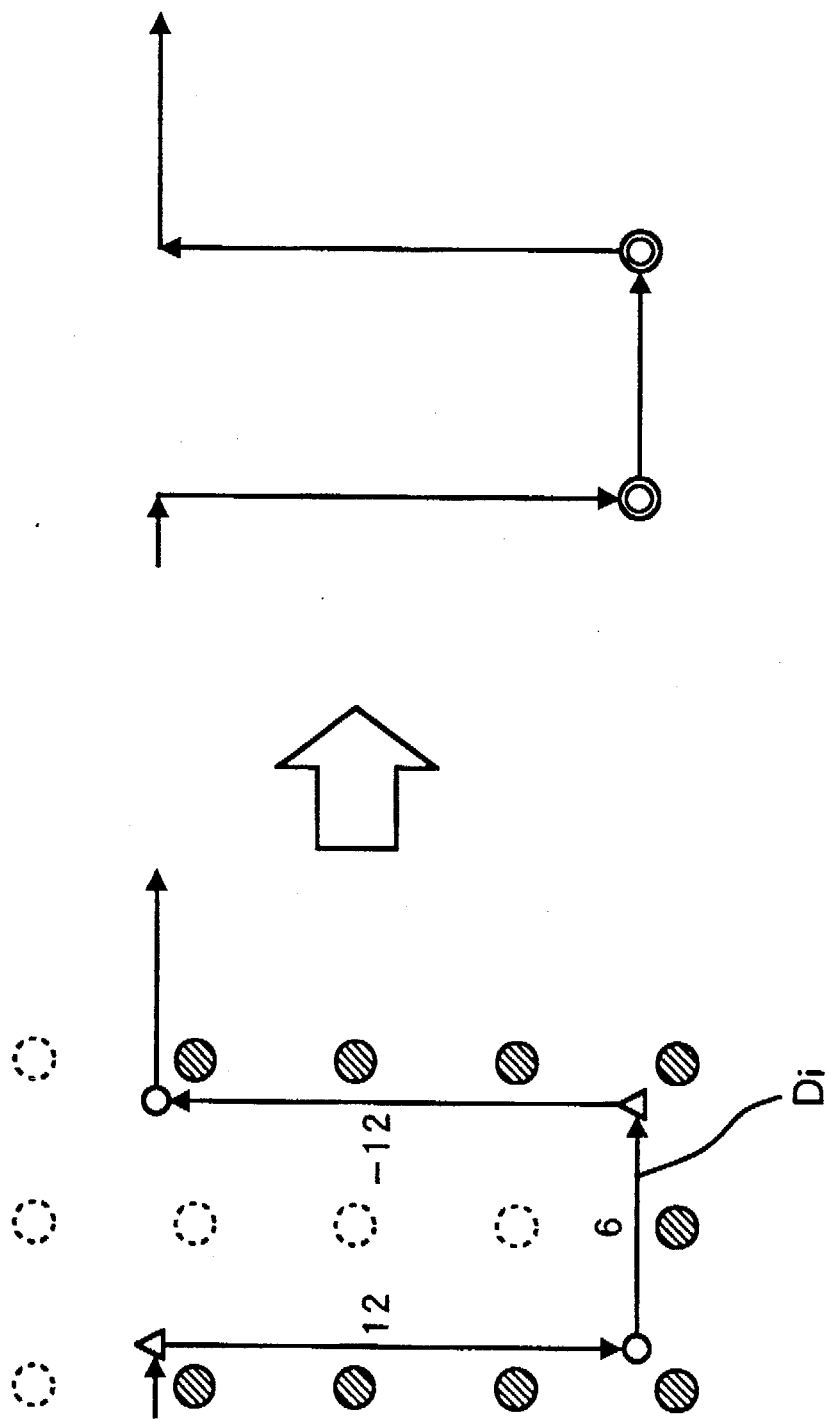

FIG. 16 and 17 show processing that maintains a narrow-line convexity and a narrow-line concavity in a binary image obtained from binarization on data read by an image reader.

FIG. 16 shows a narrow-line notch in which the length of an object vector $D_i$ of three vectors is "2" (½ pixel length), that of the preceding and the subsequent vectors are "12" (three pixel length) or more, and the direction of the preceding and the subsequent vectors are opposite to each other. This case is determined based on whether or not an object vector and its preceding and subsequent vectors meet the above-described conditions.

FIG. 17 shows a narrow-line notch in which the length of an object vector $D_i$ of three vectors is "6" (1½ pixel length), that of the preceding and the subsequent vectors are "12" (three pixel length), and the direction of the preceding and the subsequent vectors are opposite to each other. If the object vector is rightward (i.e., in case of a positive horizontal edge data), the preceding vector is downward (the vertical edge data is positive), and the subsequent vector is upward (the vertical edge data is negative). If the object vector is leftward (i.e., in case of a negative horizontal edge data), the preceding vector is upward (the vertical edge data is negative), and the subsequent vector is downward (the vertical edge data is positive). If the object vector is downward (i.e., in case of a positive vertical edge data), the preceding vector is leftward (the horizontal edge data is negative), and the subsequent vector is rightward (the horizontal edge data is positive). If the object vector is upward (i.e., in case of a negative vertical edge data), the preceding vector is rightward (the horizontal edge data is positive), and the subsequent vector is leftward (the horizontal edge data is negative). Also in this case, an object vector and its preceding and subsequent vectors can be detected in accordance with the above conditions.

When the conditions as shown in FIGS. 16 and 17 are satisfied, two outline points after the first smoothing are defined at the two vector start points, by an x-coordinate value at the start/end point of the object vector and a y-coordinate value at the start/end point of the object vector.

<Small White Pixel Area (FIG. 18)>

FIG. 18 shows a coarse-outline loop consisting of four vectors connected in a counterclockwise direction (from the top, leftward, downward, rightward and upward). To check whether the above condition is satisfied or not, whether or not the number of outline points is four is examined. Further, if the first horizontal edge data is positive (rightward), whether or not the following vertical edge data is negative (upward), otherwise, if the first horizontal edge data is negative (leftward), the following vertical edge data is positive (downward) is examined. That is, whether or not the positive/negative sign of the first horizontal edge data and that of the following vertical edge data are opposite to each other is examined. If these conditions are satisfied, four outline points after the first smoothing are defined at the four vector start points having an x-coordinate value at a vector start/end point and a y-coordinate value at a vector start/end point. This rule enables maintaining a small white spot occur in a binary image obtained from binarization on data read by an image reader.

<Gentle Slope (FIGS. 19 to 22)>

FIGS. 19 to 22 show a gentle slope in which the length of the central vector, as the object vector of five coarse-outline vectors, is "12" (three pixel length) or longer, the direction of the preceding vector and that of the subsequent vector are the same (the edge data have the same positive/negative sign), and the length of these vectors correspond to one pixel of an original image. The length of a vector corresponding to one pixel is 2 (½ pixel length), 6 (1½ pixel length) or 4 (one pixel length) in accordance with whether it is a convexity, a concavity or a jagged portion, respectively.

Figure 19:
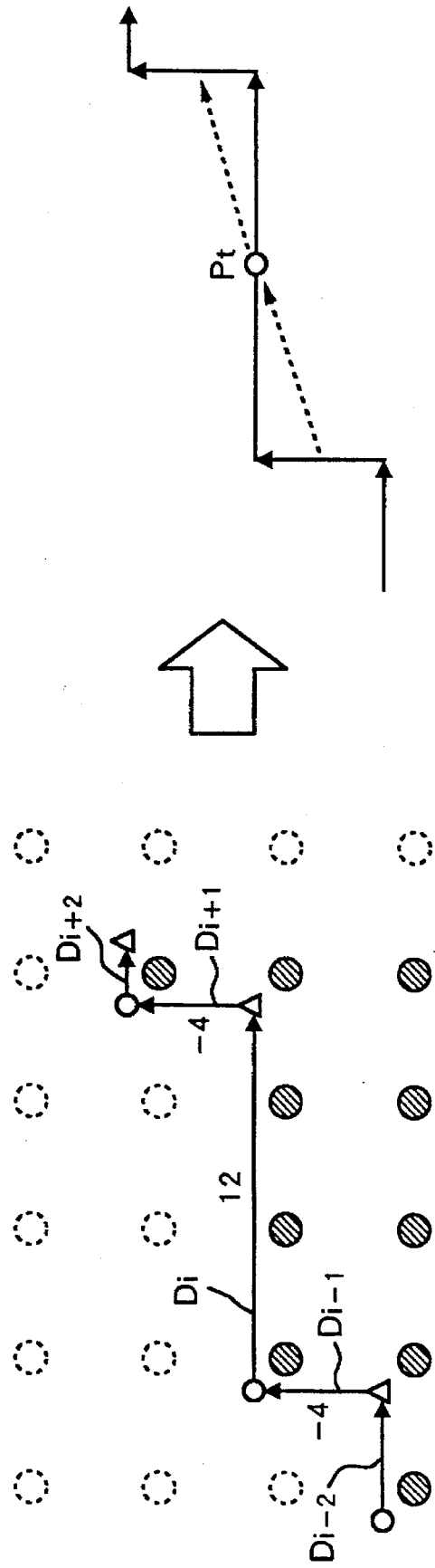

FIG. 19 shows a processing on an outline in which a vector $D_{i-2}$, prior to an object vector $D_i$ by two vectors, and a vector $D_{i+2}$, subsequent to the object vector $D_i$ by two vectors, have the same direction as that of the object vector. The length of a vector $D_{i-1}$ preceding the object vector and that of a vector $D_{i+1}$ following the object vector are both "–4". In this case, an outline point after the first smoothing is defined by coordinate value at a central point Pt of the object vector $D_i$.

FIG. 20 shows an outline in which the direction of a vector $D_{i-2}$ prior to an object vector $D_i$ by two vectors and that of a vector $D_{i+2}$ subsequent to the object vector $D_i$ by two vectors are opposite to each other, and direction of the vector $D_{i+2}$ and that of the object vector $D_i$ are the same. If a vector $D_{i-1}$ preceding the object vector $D_i$ and a vector $D_{i+1}$ following the object vector $D_i$ are upward, the length of the vector $D_{i-1}$ is "–2" (½ pixel length), and that of the vector $D_{i+1}$ is "–4" (one pixel length). If these vectors are downward, the length of the vector $D_{i-1}$ is "6" (1½ pixel length) and that of the vector $D_{i+1}$ is "4" (one pixel length). In this outline, an outline point is defined as a corner point Pc by a coordinate value at the start point of the object vector, and an outline point is defined as a point Pt by a coordinate value at the central point of the object vector.

Figure 21:
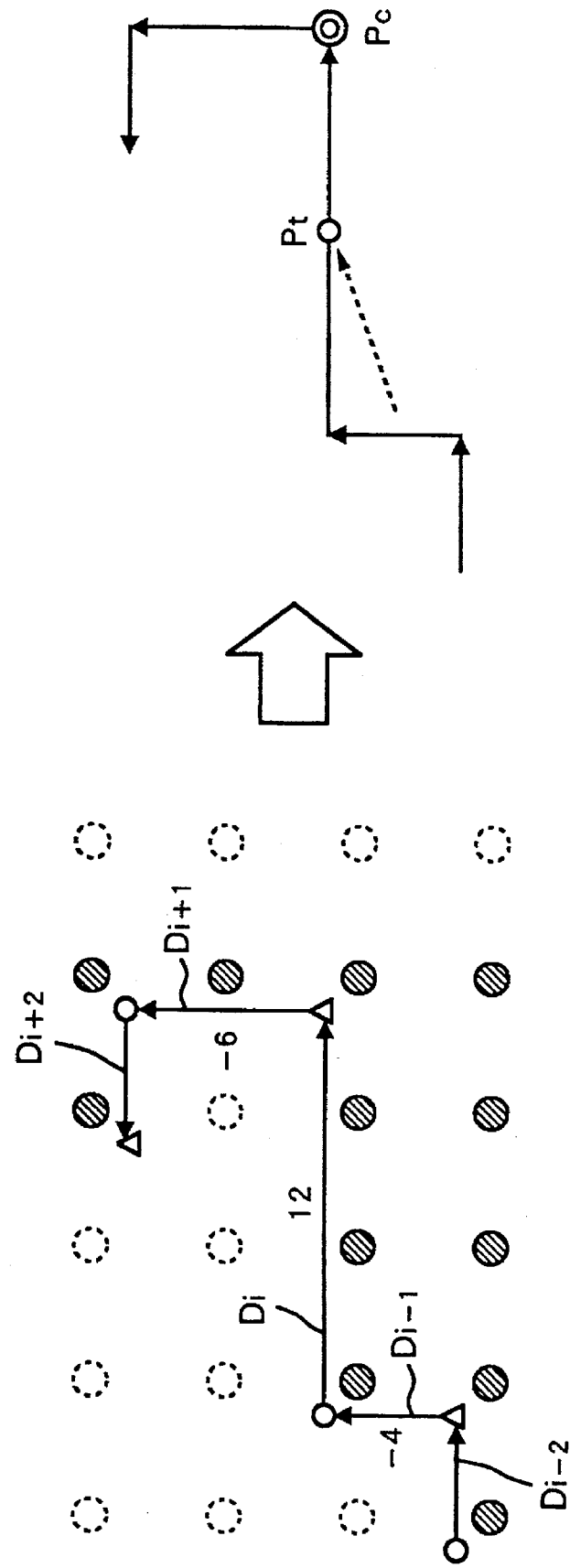

FIG. 21 shows an outline in which the direction of a vector $D_{i-2}$ prior to an object vector $D_i$ by two vectors and that the object vector $D_i$ are the same, and the direction of a vector $D_{i+2}$ subsequent to the object vector by two vectors and that of the object vector $D_i$ are opposite to each other. If the direction of a vector $D_{i-1}$ preceding the object vector $D_i$ and that of a vector $D_{i+1}$ following the object vector $D_i$ are upward, the length of the vector $D_{i-1}$ is "–4" (one pixel length), and that of the vector $D_{i+1}$ is "–6" (1½ pixel length). If the direction of a vector $D_{i-1}$ and that of a vector $D_{i+1}$ are downward, the length of the vector $D_{i-1}$ is "4" (one pixel length), and that of the vector $D_{i+1}$ is "2" (1½ pixel length). In these cases, an outline point after the first smoothing is defined as a point Pt by a coordinate value at the central point of the object vector, and an outline point after the first smoothing is defined as a corner point Pc by a coordinate value at the end point of the object vector.

Figure 22:
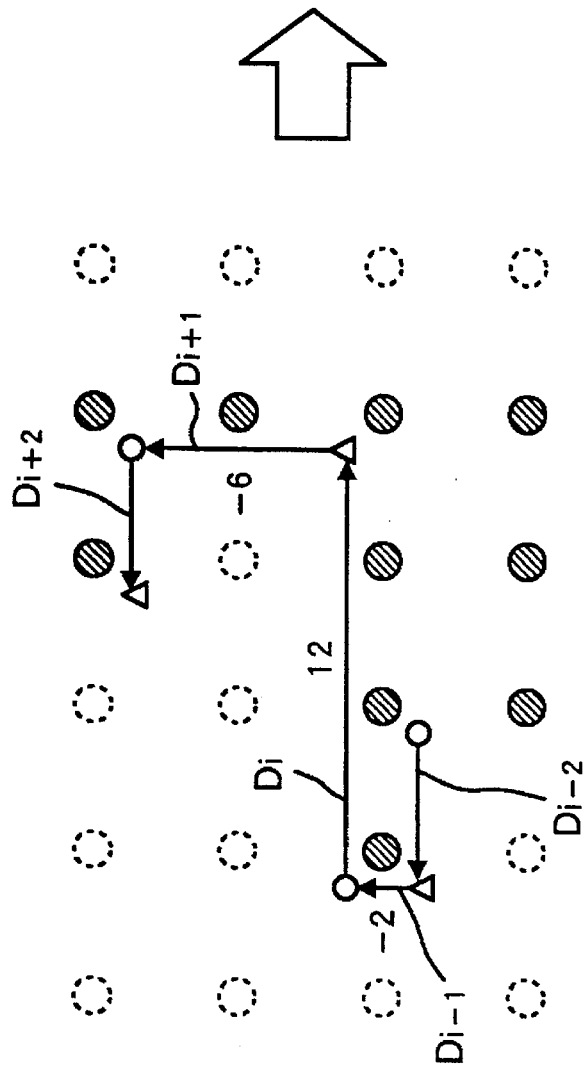

FIG. 22 shows an outline in which the direction of a vector $D_{i-2}$, two vector prior to an object vector $D_i$ and that of a vector $D_{i+2}$, two vector subsequent to the object vector $D_i$ are opposite to each other. If a vector $D_{i-1}$ preceding the object vector $D_i$ and a vector $D_{i+1}$ following the object vector $D_i$ are upward, the length of the vector $D_{i-1}$ is "–2" (½ pixel length), and that of the $D_{i+1}$ is "–6" (1½ pixel length). If the vector $D_{i-1}$ and the vector $D_{i+1}$ are downward, the length of the $D_{i-1}$ is "6" (1½ pixel length) and that of the $D_{i+1}$ is "2" (½ pixel length). In these cases, outline points after the first smoothing are defined as corner points by a coordinate values at the start/end point of the object vector.

In FIGS. 19 to 22, an object vector and its preceding and subsequent vectors can be detected in accordance with the above rules. The processing shown in FIG. 19 renders a gentle smooth slope, and the processings in FIGS. 20 and 21, on a portion where a slope and a minute concave or convexity contact with each other, render the slope smooth and maintain the concave/convexity. FIGS. 19 to 22 show a case where the object vector is rightward and its preceding and subsequent vectors are upward, however, a case where the preceding and subsequent vectors are downward has been described. If the object vector is a leftward horizontal vector, the conditions of the vertical edge data and the horizontal edge data are changed so that the positive/negative sign becomes opposite and the expression "or longer" becomes "or shorter". If the object vector is a vertical vector, the conditions of the horizontal edge data are changed so that the positive/negative sign becomes opposite and the expression "or longer" becomes "or shorter".

<Border between Slope and Convexity (FIGS. 23 to 30)>

FIGS. 23 to 30 show a series of five vectors having the central vector as an object vector $D_i$, where the length of one of vector $D_{i-1}$ prior to the object vector $D_i$ or a vector $D_{i+1}$ following the object vector $D_i$ is "4" (one pixel length), that of another one of the vector $D_{i-1}$ and vector $D_{i+1}$ corresponds to two pixel length or longer "6", "8" or "10", depending upon whether the part is an convexity, a jagged portion or a concavity), and that of the object vector $D_i$ corresponds to two pixel length or longer 6, 8 or 10, depending upon the part is an convexity, a jagged portion or a concavity) (note that a case where the length of the object vector corresponds to two pixel length and at least one of the preceding and subsequent vectors corresponds to two pixel length is excluded).

Figure 23:
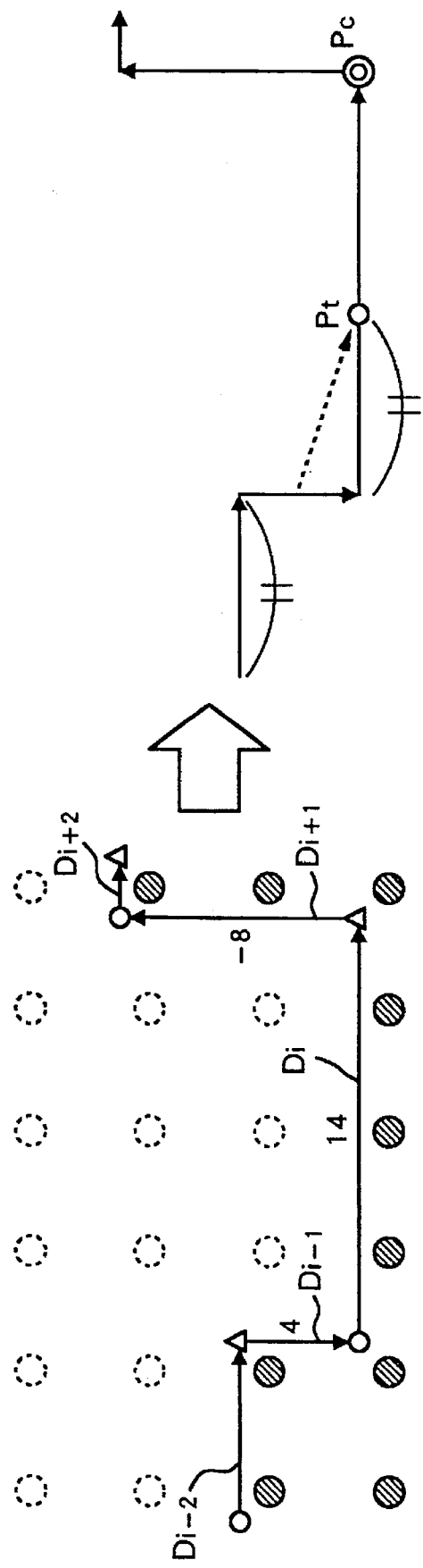

FIGS. 23 to 26 show an outline in which the length of the vector $D_{i-1}$ prior to the object vector Di corresponds to one pixel length, and that of the subsequent vector $D_{i+1}$ corresponds to two pixel length or longer. In FIG. 23, if the object vector $D_i$ is the central vector of the concavity, i.e., it is rightward (the horizontal edge data is positive), the preceding vector $D_{i-1}$ is downward (the vertical edge data is positive), and the subsequent vector $D_{i+1}$ is upward (the vertical edge data is negative).

Figure 24:
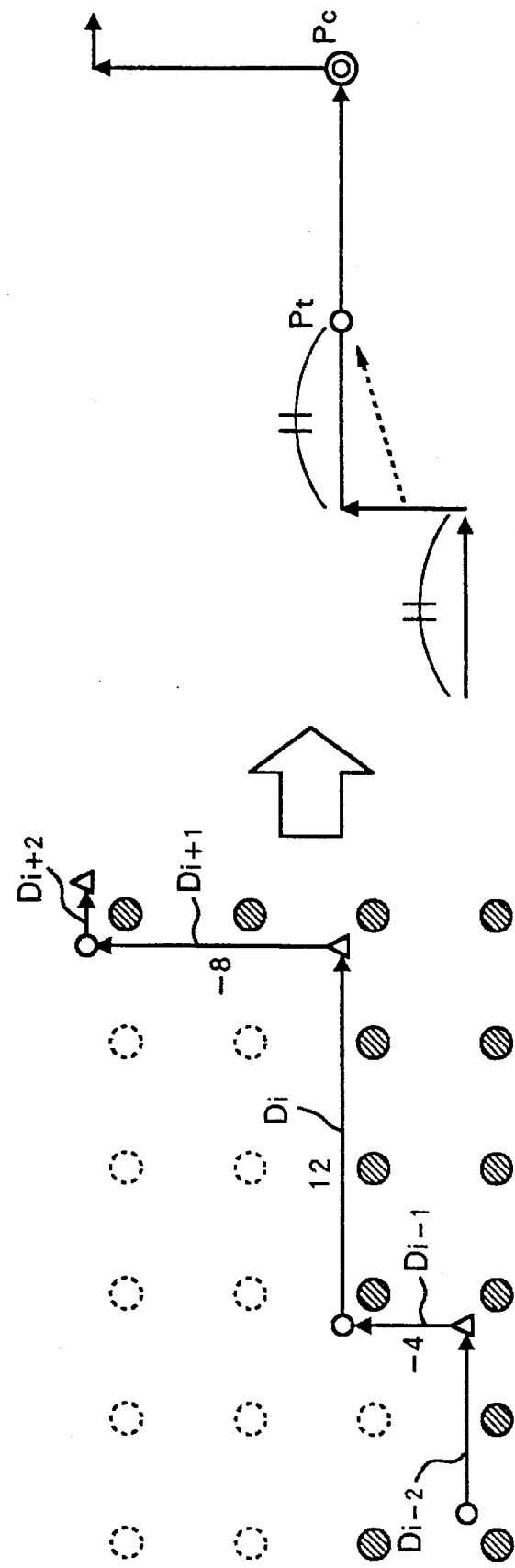
Figure 26:
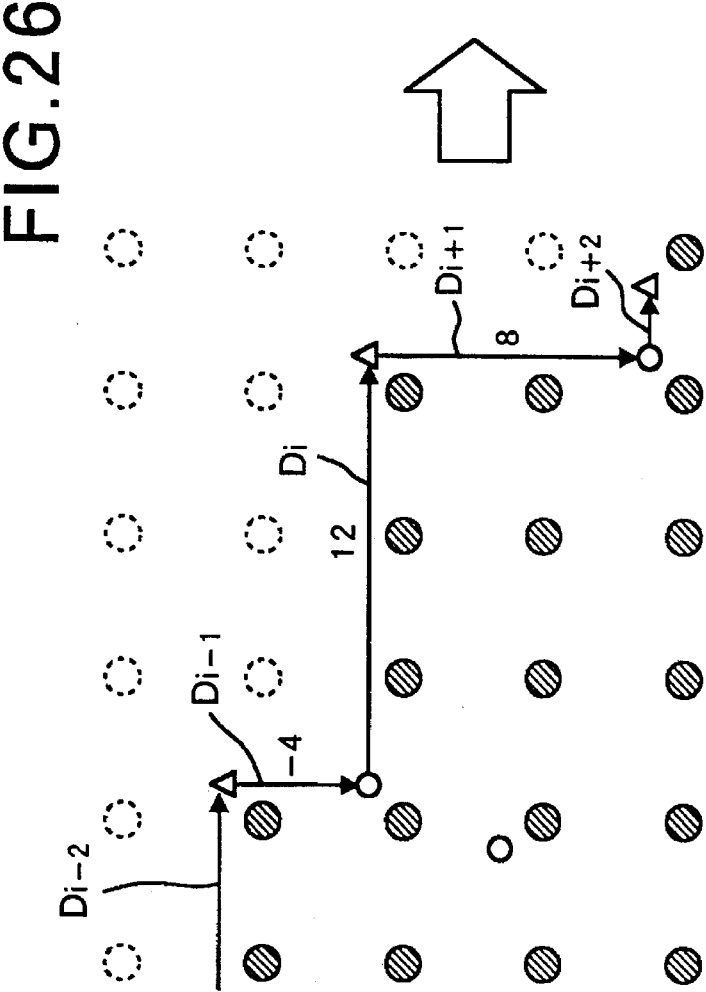

In FIGS. 24 and 26, the object vector Di is the central vector of the jagged portion, i.e., the direction of the preceding vector $D_{i-1}$ and that of the subsequent vector $D_{i+1}$ are the same.

Figure 25:
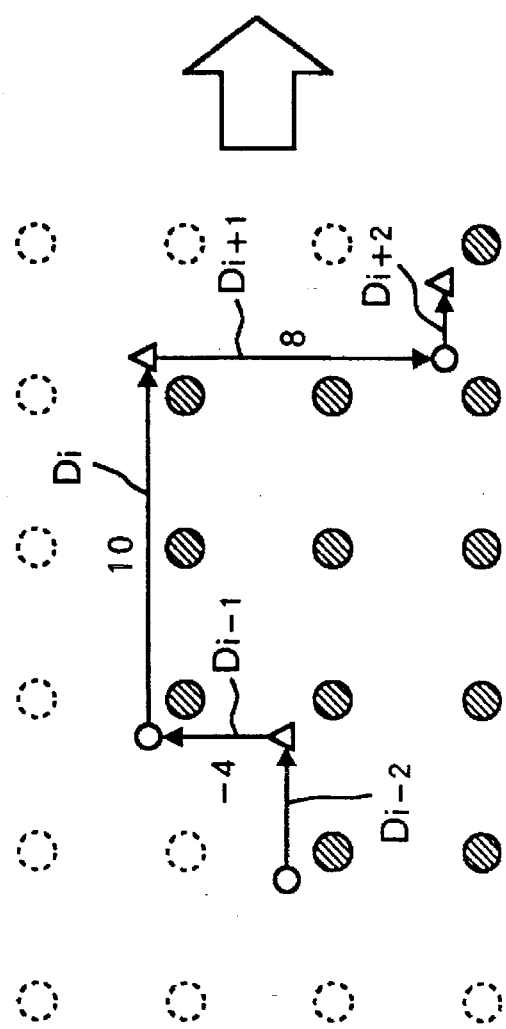

In FIG. 25, the object vector $D_i$ is the central vector of the convexity, i.e., if the object vector is rightward (the horizontal edge data is positive), the preceding vector $D_{i-1}$ is upward (the vertical edge data is negative), and the subsequent vector $D_{i+1}$ is downward (the vertical edge data is positive).

In these cases, if the length of a vector $D_{i-2}$, two-vector prior to the object vector $D_i$, is shorter than that of the object vector, an outline point Pt is defined by a coordinate value on the object vector at a position away from start point of the object vector by the length of the vector $D_{i-2}$ toward end point of the object vector. Further, a corner point Pc is defined by a coordinate value of the object vector end point, regardless of the length of the $D_{i-2}$.

Figure 27:
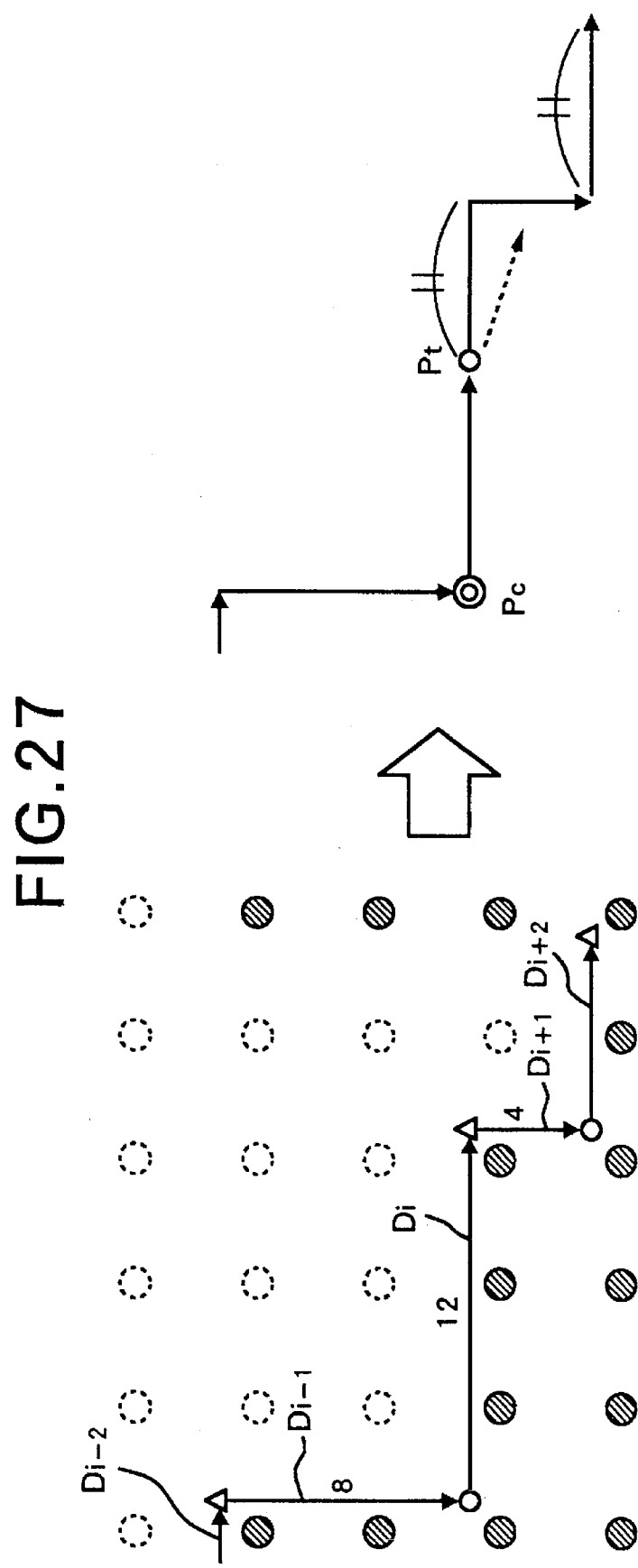
Figure 28:
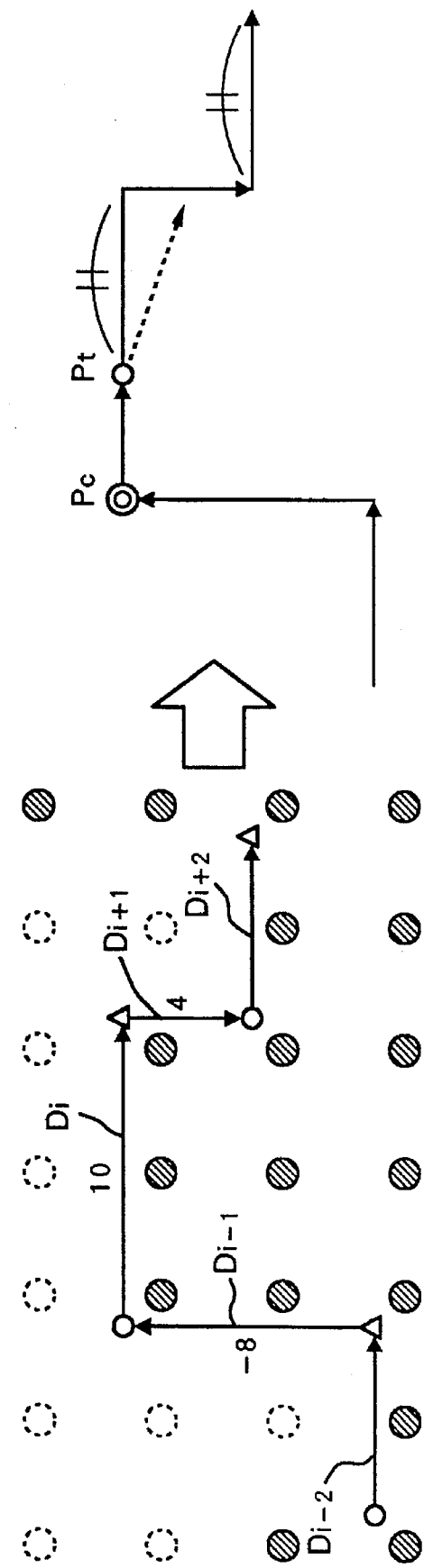
Figure 29:
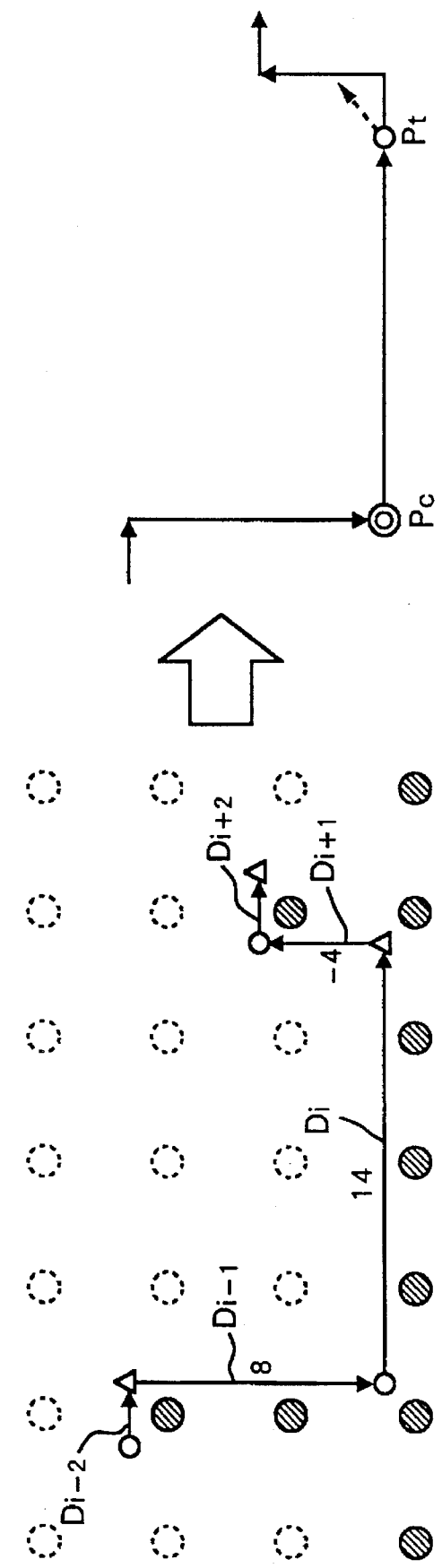
Figure 30:
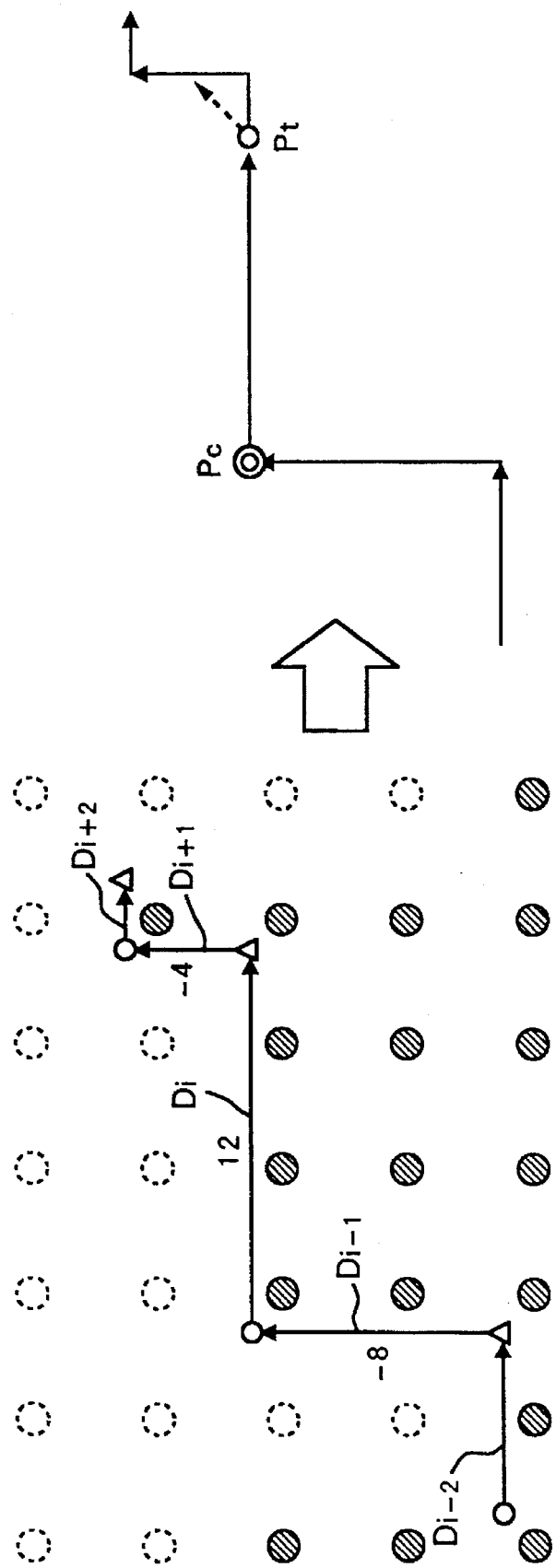

FIGS. 27 to 30 show an outline in which the length of a vector $D_{i-1}$ prior to an object vector $D_i$ corresponds to two pixel length, and that of a vector $D_{i+1}$ following the object vector corresponds to one pixel length. In FIGS. 27 and 30, the object vector $D_i$ is the central vector of a jagged portion, i.e., the direction of the vector $D_{i-1}$ and that of the vector $D_{i+1}$ are the same.

In FIG. 28, if the object vector $D_i$ is the central vector of a convexity, i.e., the object vector is rightward (the horizontal edge data is positive), the preceding vector $D_{i-1}$ is upward (the vertical edge data is negative), and the subsequent vector $D_{i+1}$ is downward (the vertical edge data is positive).

In FIG. 29, if the object vector is the central vector of a concavity, i.e., the object vector is rightward (the horizontal edge data is positive), the preceding vector $D_{i-1}$ is downward (the vertical edge data is positive), and the subsequent vector $D_{i+1}$ is upward (the vertical edge data is negative).

In these cases, a corner point Pc is defined by the start point of the object vector. Further, if the length of a vector $D_{i+2}$, two vector subsequent to the object vector, is shorter than that of the object vector, an outline point Pt, having a coordinate value on the object vector at a position away from the end point of the object vector by the length of the vector $D_{i+2}$ toward the start point of the object vector, is defined.

This case as shown in FIGS. 23 to 30 is determined based on whether or not an object vector and its preceding and subsequent vectors meet the above-described conditions. The processings in these cases render a smooth slope, and maintains a concavity/convexity. FIGS. 23 to 30 only show a case where the object vector is rightward and the preceding and subsequent vectors are upward. If the object vector is leftward, the conditions of the vertical edge data and the horizontal edge data are changed so that the positive/ negative sign becomes opposite, and the expression "longer" becomes "shorter". If the object vector is upward, the conditions of the vertical edge data are changed so that the positive/negative sign becomes opposite and the expression "or longer" becomes "or shorter".

<Maintaining of Corner (FIGS. 31 to 38)>

FIGS. 31 to 34 show five vectors having the central vector as an object vector $D_i$, where the length of a vector $D_{i-1}$ prior to the object vector $D_i$ and that of a vector $D_{i+1}$ following the object vector $D_i$ correspond to three pixel length or longer "10", "12" or "14", depending upon the part is an convexity, a jagged portion or a concavity), and that of the object vector $D_i$ corresponds to two pixel length "6", "8" or "10", depending upon whether the part is an convexity, a jagged portion or a concavity).

Figure 31:
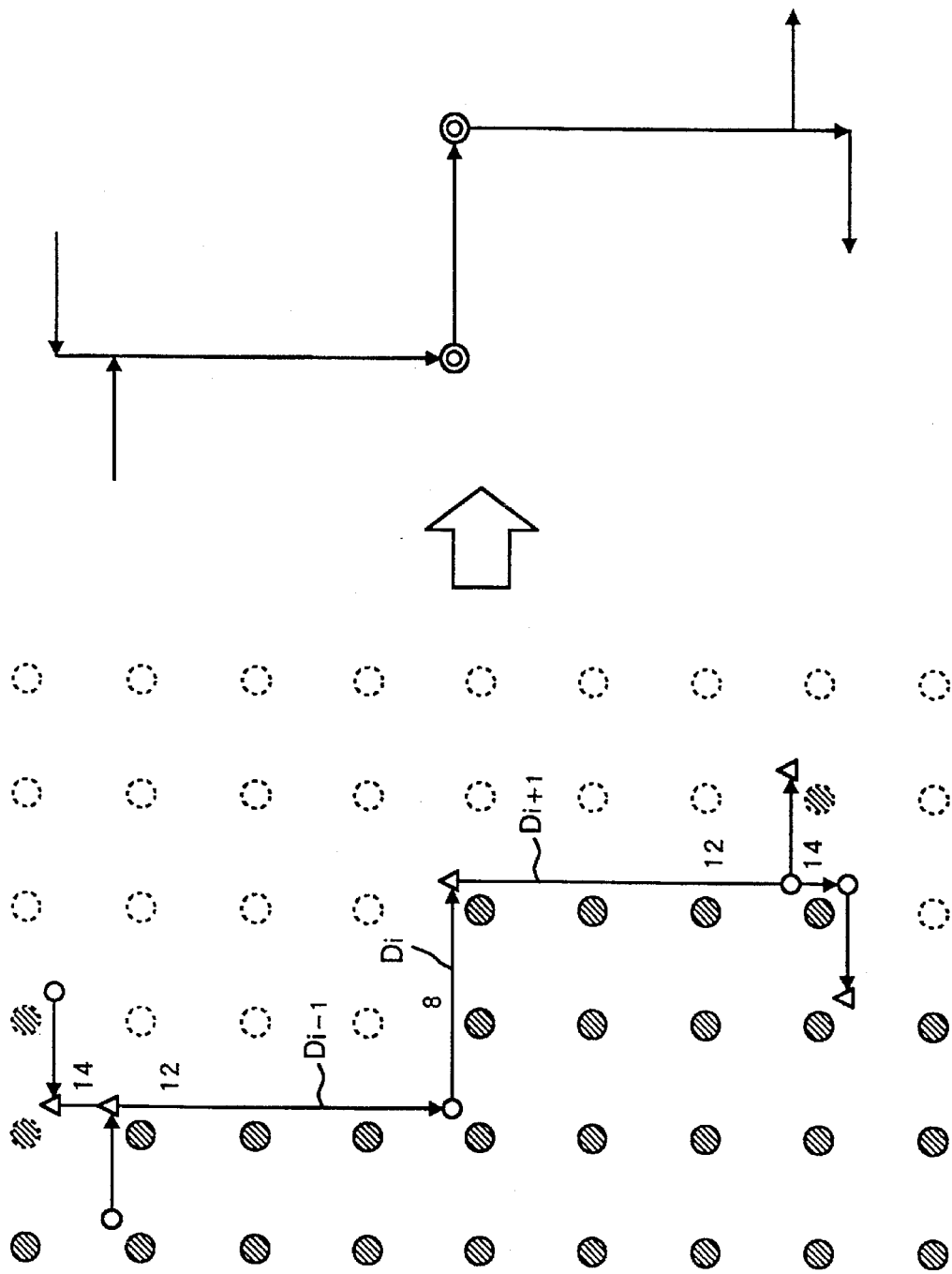
Figure 32:
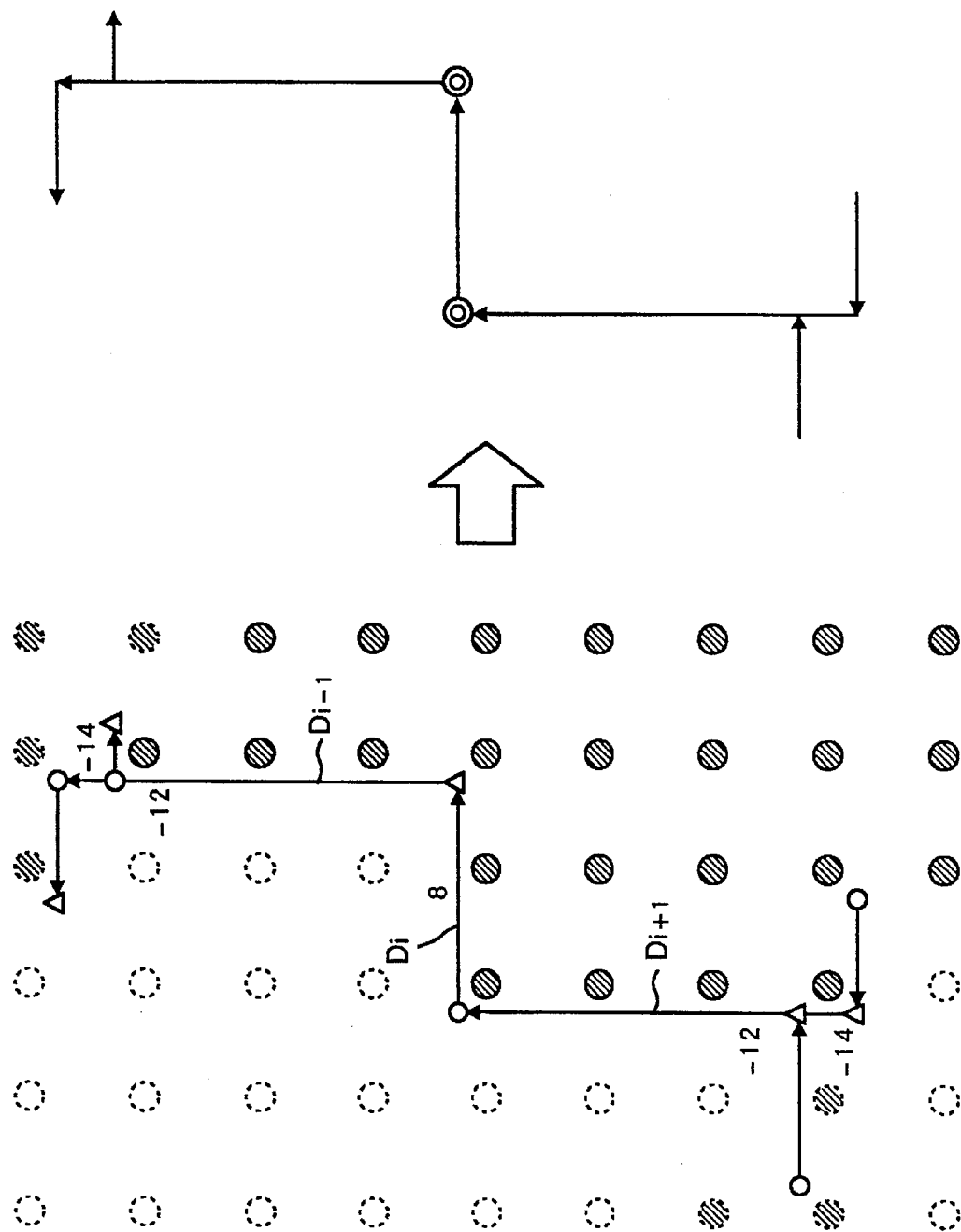

FIGS. 31 and 32 show an outline in which the object vector $D_i$ is the central vector of a jagged portion, i.e., the direction of the preceding vector $D_{i-1}$ and that of the subsequent vector $D_{i+1}$ are the same.

Figure 33:
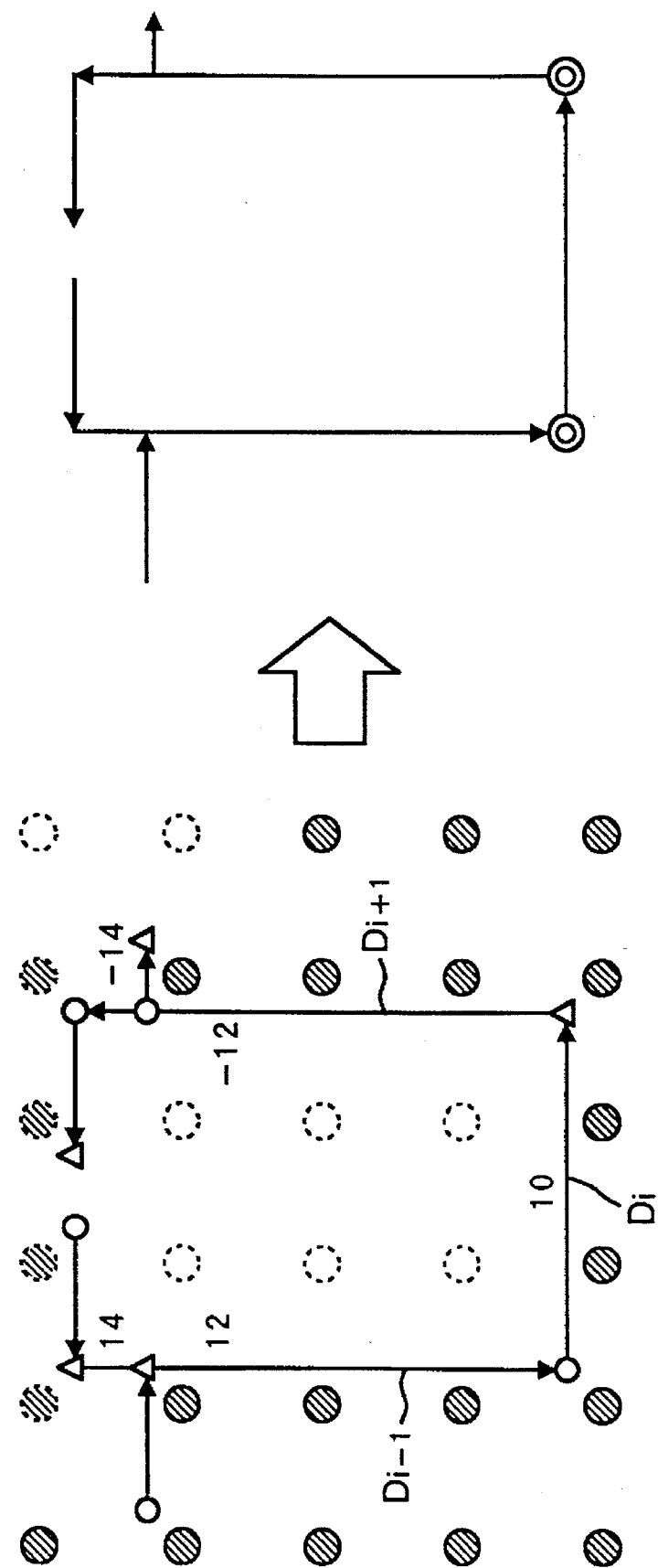

In FIG. 33, the object vector $D_i$ is the central vector of a concavity. That is, if the object vector $D_i$ is rightward (the horizontal edge data is positive), the preceding vector $D_{i-1}$ is downward (the vertical edge data is positive), and the subsequent vector $D_{i+1}$ is upward (the vertical edge data is negative).

Figure 34:
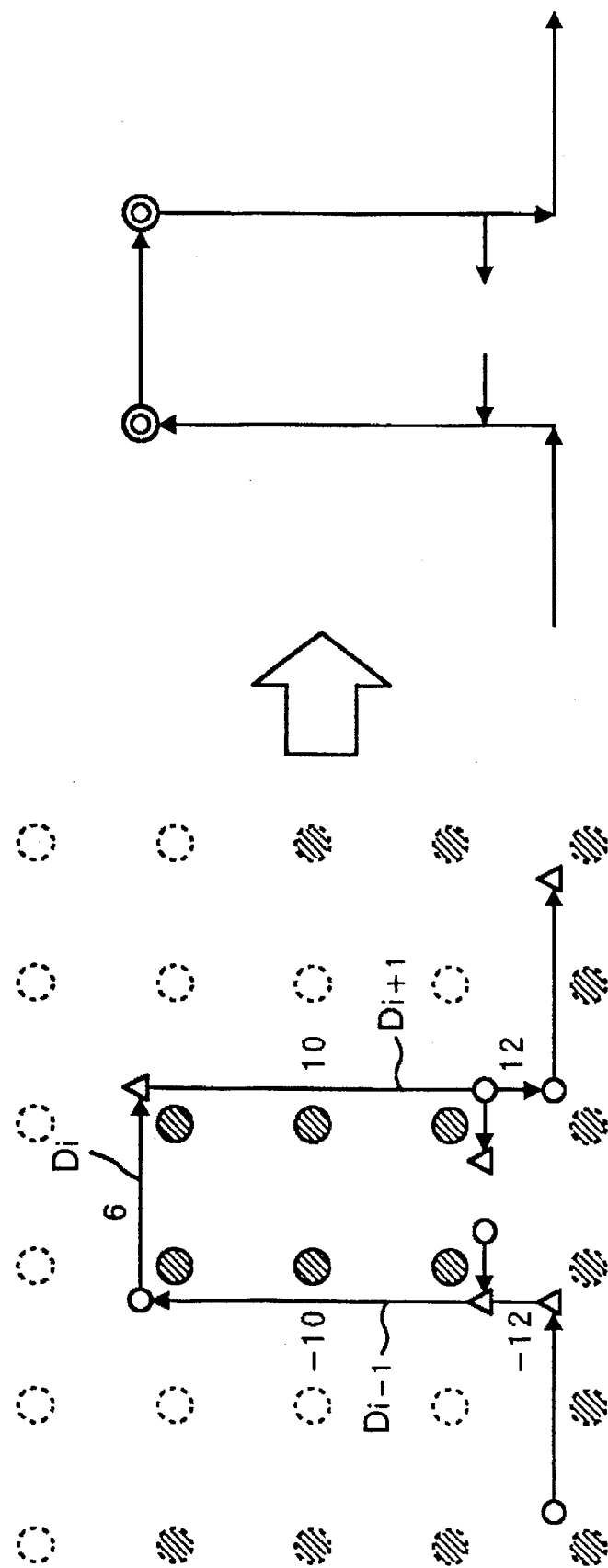

In FIG. 34, if the object vector $D_i$ is the central vector of a convexity. That is, if the object vector is rightward (the horizontal edge data is positive), the preceding vector $D_{i-1}$ is upward (the vertical edge data is negative), and the subsequent vector $D_{i+1}$ is downward (the vertical edge data is positive).

In this case, outline points after the first smoothing are defined as corner points by the coordinate value at the starting point and the end point of the object vector. In the processings as shown in FIGS. 31 to 34, an object vector and its preceding and subsequent vectors can be detected in accordance with the above conditions. These processings maintain the corner portions.

FIGS. 35 to 38 show five vectors having the central vector as an object vector $D_i$, where the length of a vector $D_{i-1}$ prior to the object vector $D_i$ and that of a vector $D_{i+1}$ following the object vector $D_i$ correspond to two pixel length or longer, "6", "8" or "10", depending upon whether the part is a convexity, a jagged portion or a concavity), and that of the object vector corresponds to three pixel length "10", "12" or "14", depending upon whether the part is a convexity, a jagged portion or a concavity).

Figure 35:
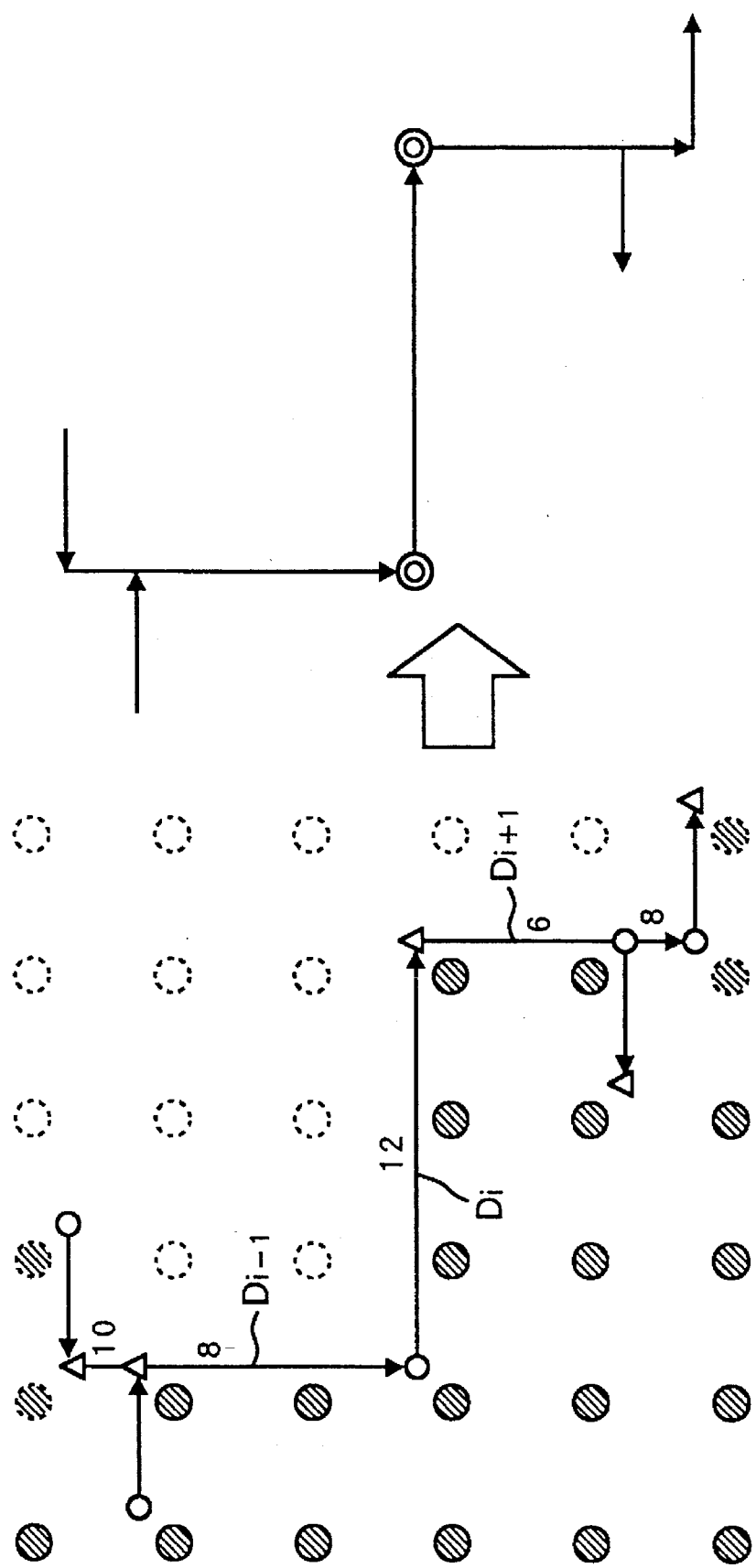
Figure 36:
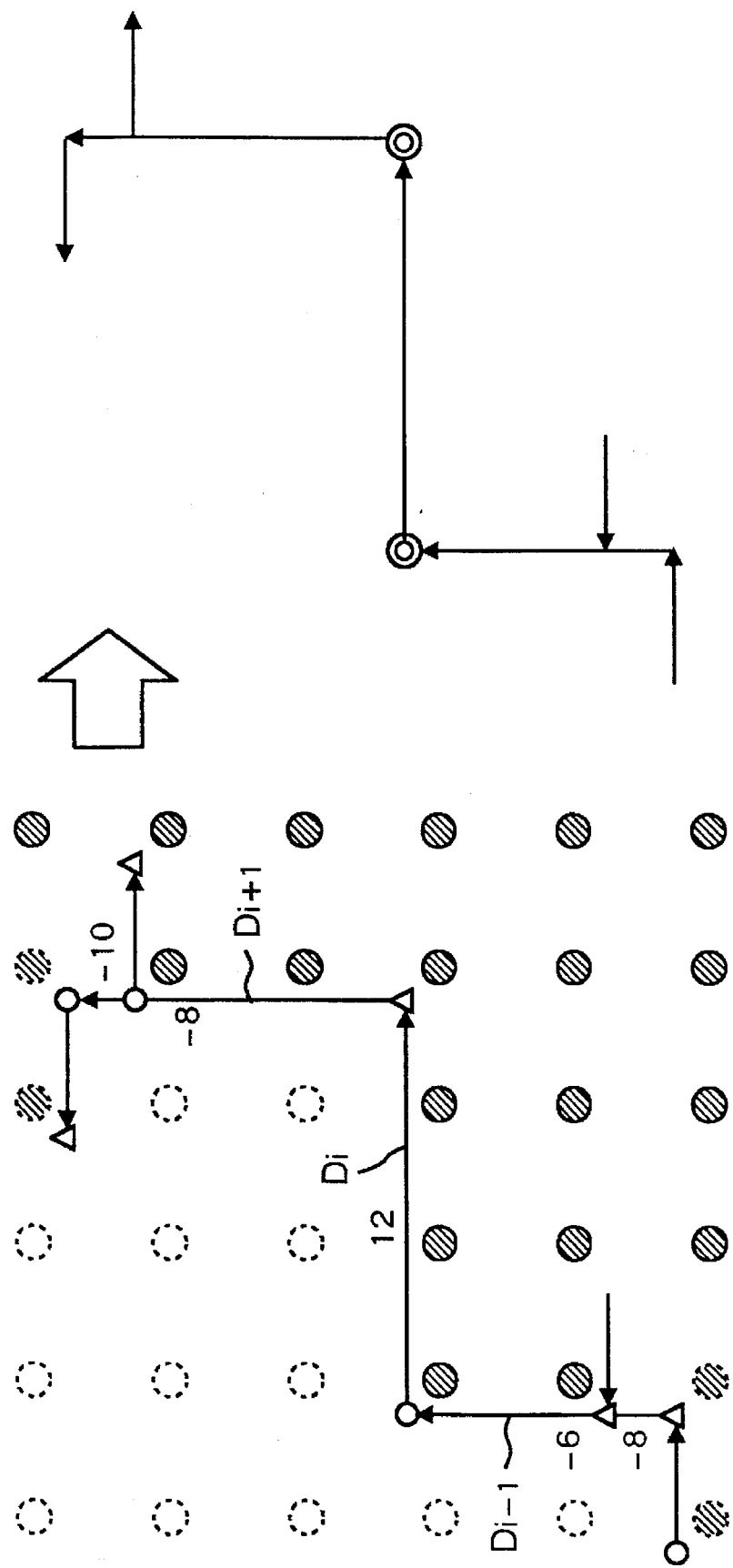

FIGS. 35 and 36 show an outline in which the object vector $D_i$ is the central vector of a jagged portion, i.e., the direction of the preceding vector $D_{i-1}$ and that of the subsequent vector $D_{i+1}$ are the same.

Figure 37:
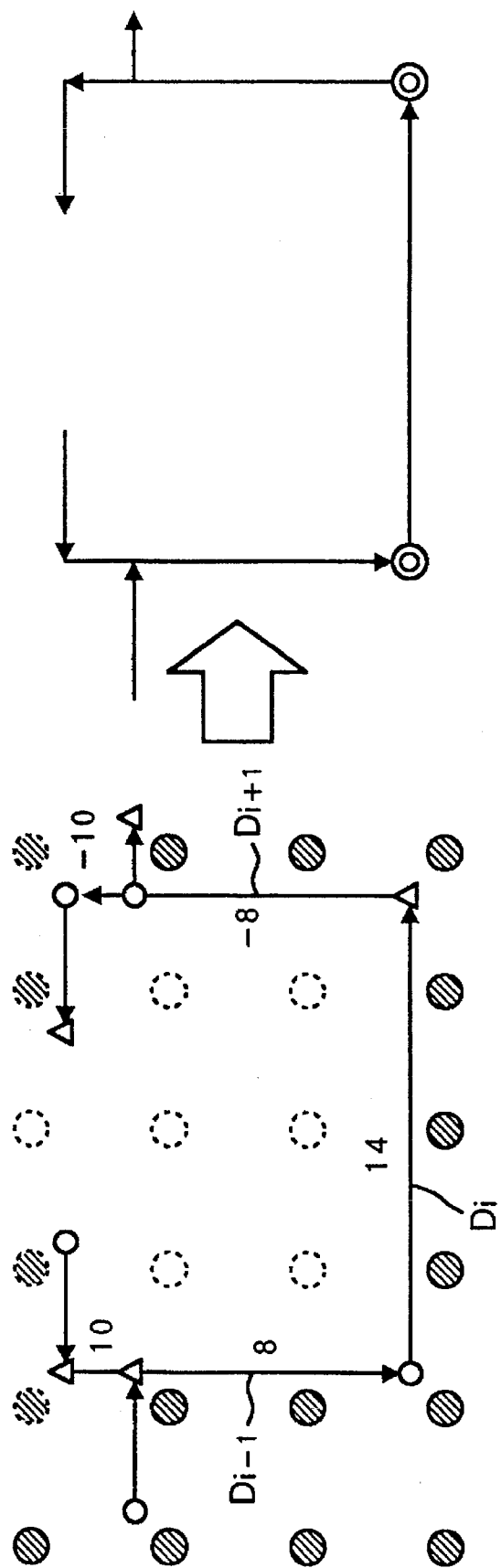

In FIG. 37, the object vector is the central vector of a concavity. That is, if the object vector is rightward (the horizontal edge data is positive), the preceding vector $D_{i-1}$ is downward (the vertical edge data is positive), and the subsequent vector $D_{i+1}$ is upward (the vertical edge data is negative).

Figure 38:
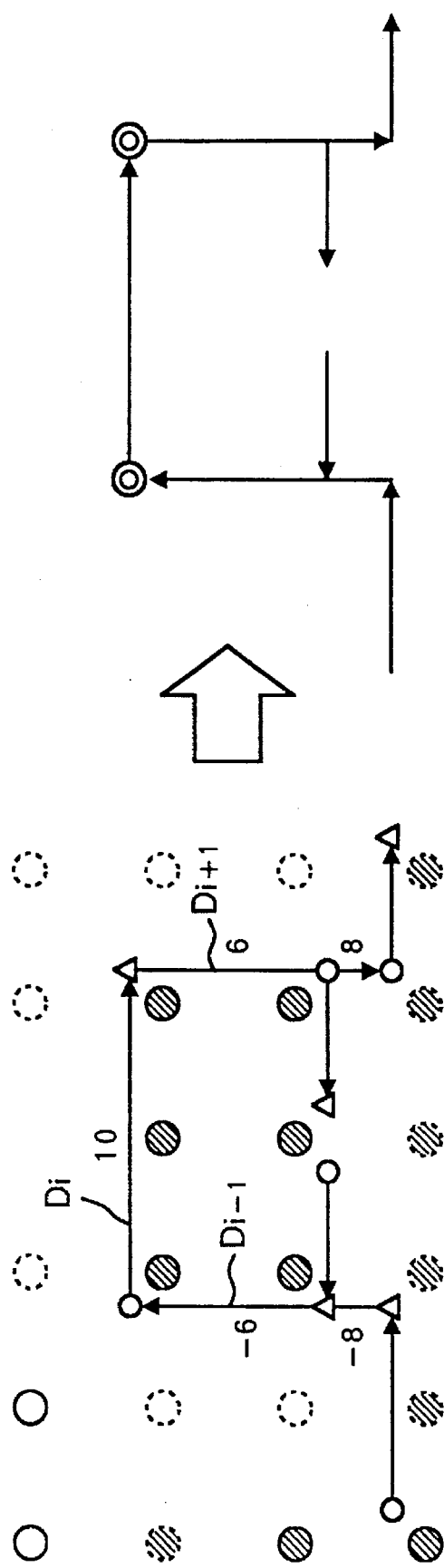

In FIG. 38, the object vector $D_i$ is the central vector of a convexity. That is, if the object vector $D_i$ is rightward (the horizontal edge data is positive), the preceding vector $D_{i-1}$ is upward (the vertical edge data is negative), and the subsequent vector $D_{i+1}$ is downward (the vertical edge data is positive).

In these cases, outline points after the first smoothing are defined by coordinate values at the start point and the end point of the object vector. In processings as shown in FIGS. 35 to 38, an object vector and its preceding and subsequent vectors can be detected in accordance with the above conditions. These processings maintain a convexity.

FIGS. 31 to 38 show only a case where the object vector is rightward. In a case where the object vector is leftward, the conditions of the vertical edge data and horizontal edge data are changed so that the positive/negative sign becomes opposite and the expression "or longer" become "or shorter". Further, in a case where the object vector is upward, the conditions of the vertical edge data are changed so that he positive/negative sign becomes opposite and the expression "or longer" become "or shorter". In a case where the object vector is downward, the conditions of the horizontal edge data are changed so that the positive/negative sign becomes opposite and the expression "or longer" become "or shorter".

<Slope (FIGS. 39 to 48)>

Figure 39:
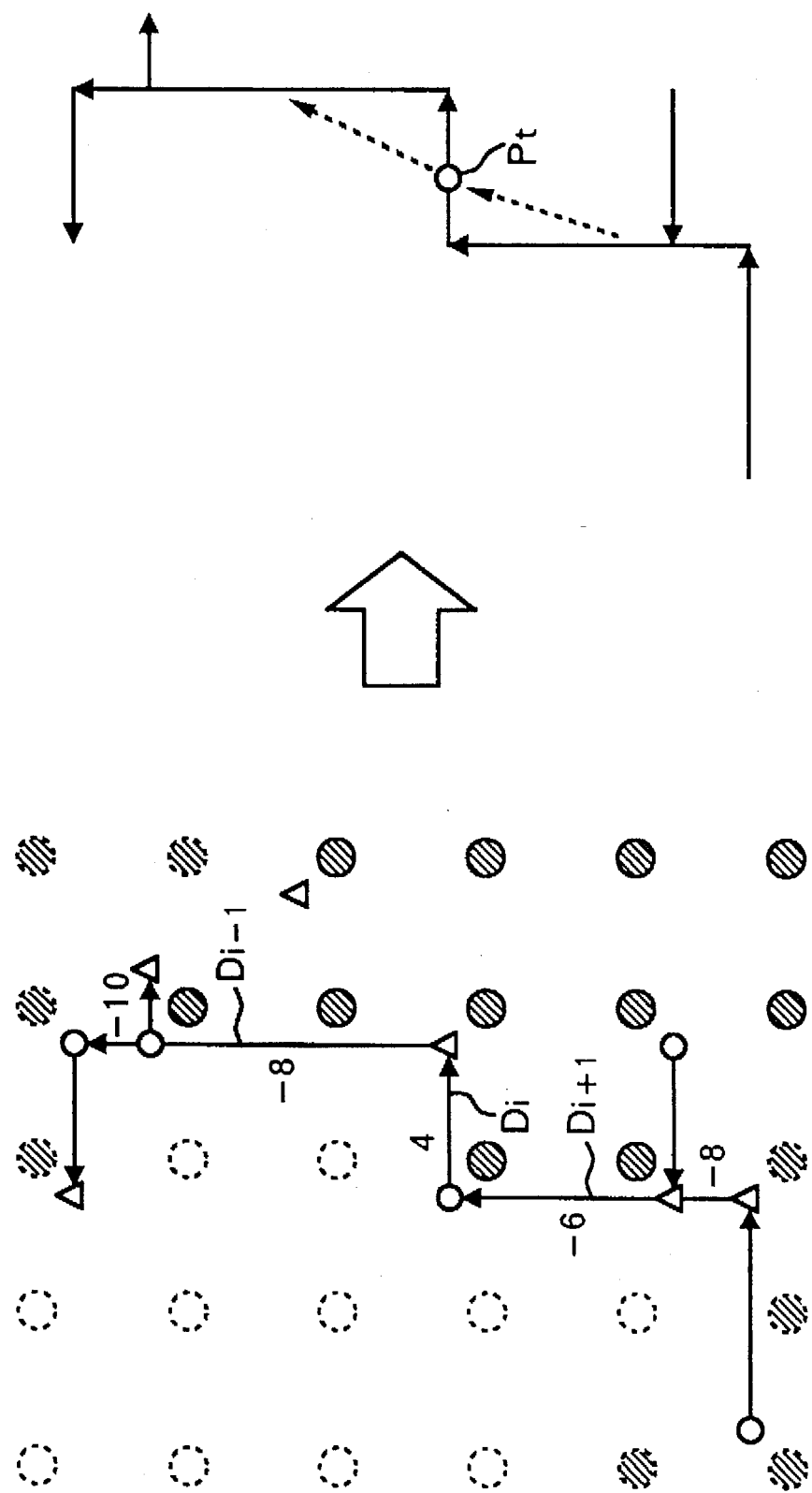
Figure 40:
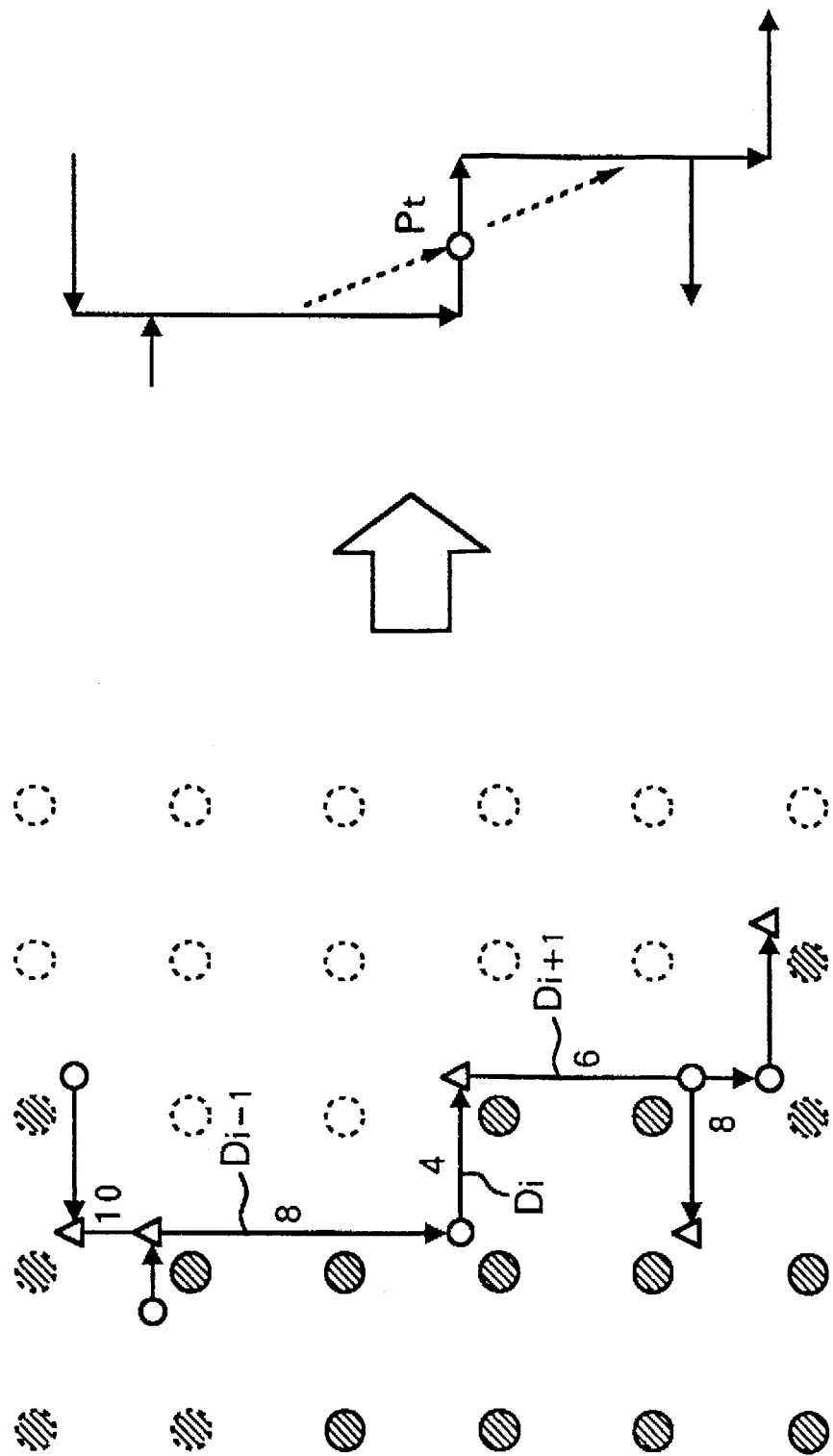
Figure 41:
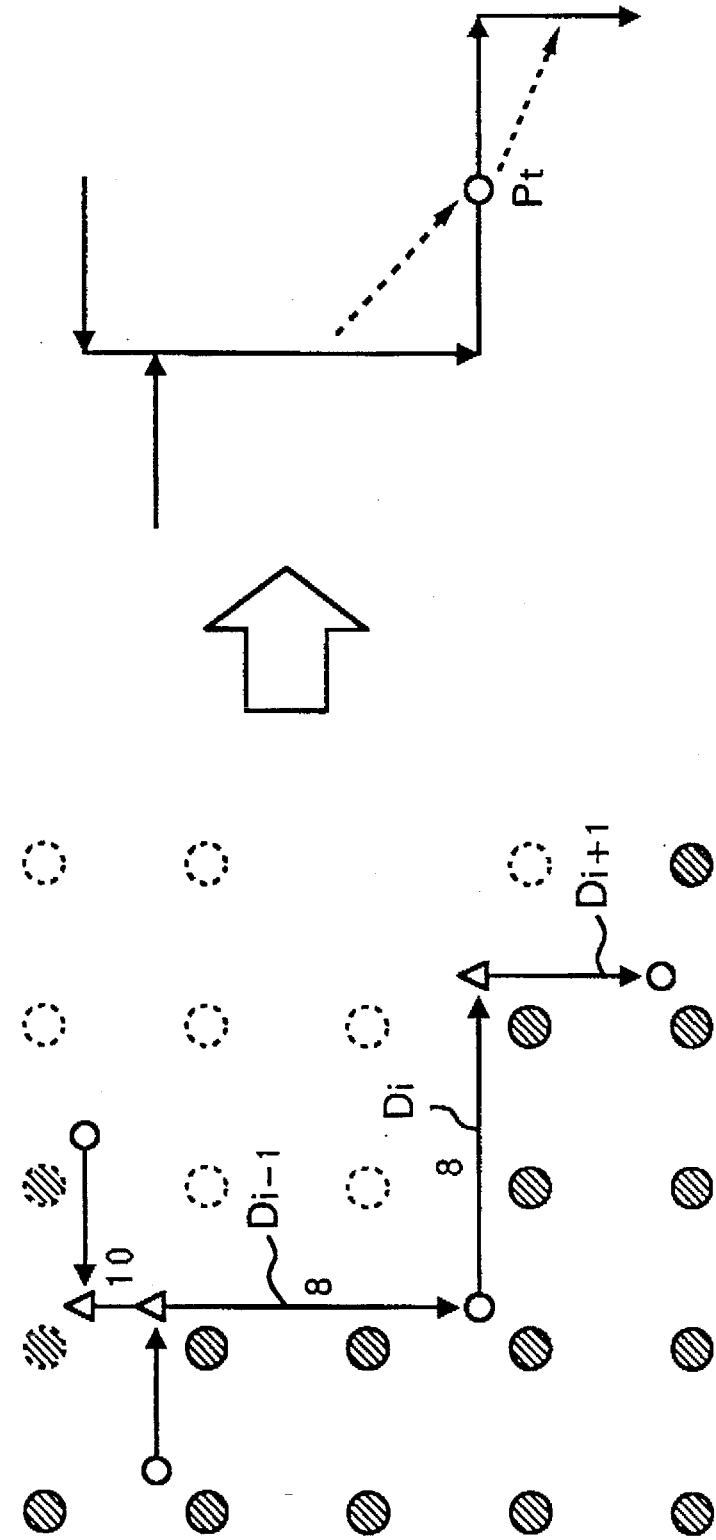
Figure 42:
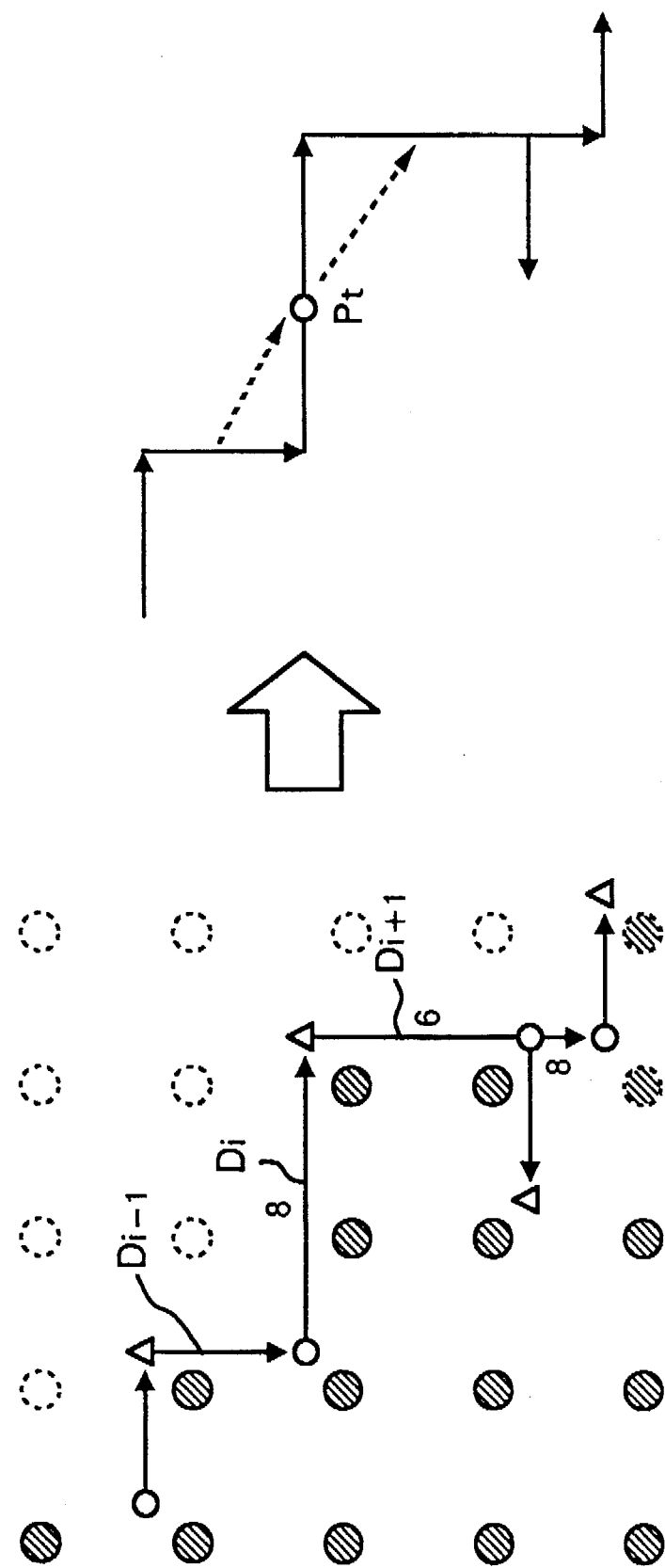
Figure 44:
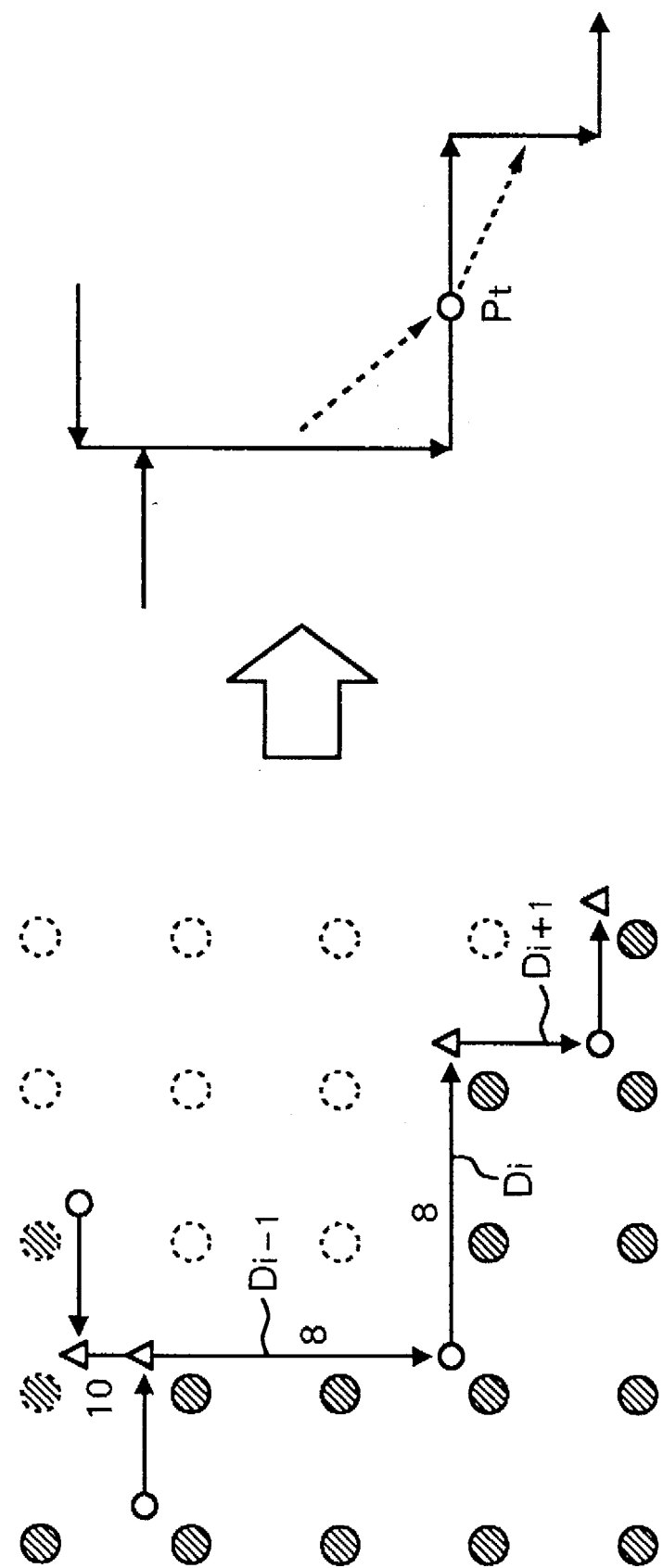

FIGS. 39 and 40 show a slope in which the length of an object vector $D_i$ is "4" (one pixel length) and the pattern of this object vector and its preceding and subsequent vectors does not coincide with any pattern as described above. In this case, an outline point Pt is defined by a coordinate value at the central point of the object vector $D_i$. This processing smoothes a slope.

In FIGS. 41 to 48, the object vector $D_i$ is one of two central vectors, and the length of the object vector and that of the preceding vector $D_{i-1}$ or the subsequent vector $D_{i+1}$ correspond to two pixel length "6", "8" or "10", depending upon whether the part is a convexity, a jagged portion or a concavity).

In FIGS. 41 to 44, the object vector $D_i$ is the central vector of a jagged portion, i.e., the direction of the preceding vector $D_{i-1}$, that of the subsequent vector $D_{i+1}$ are the same, and the length of the object vector $D_i$ is "8" (two pixel length).

Figure 45:
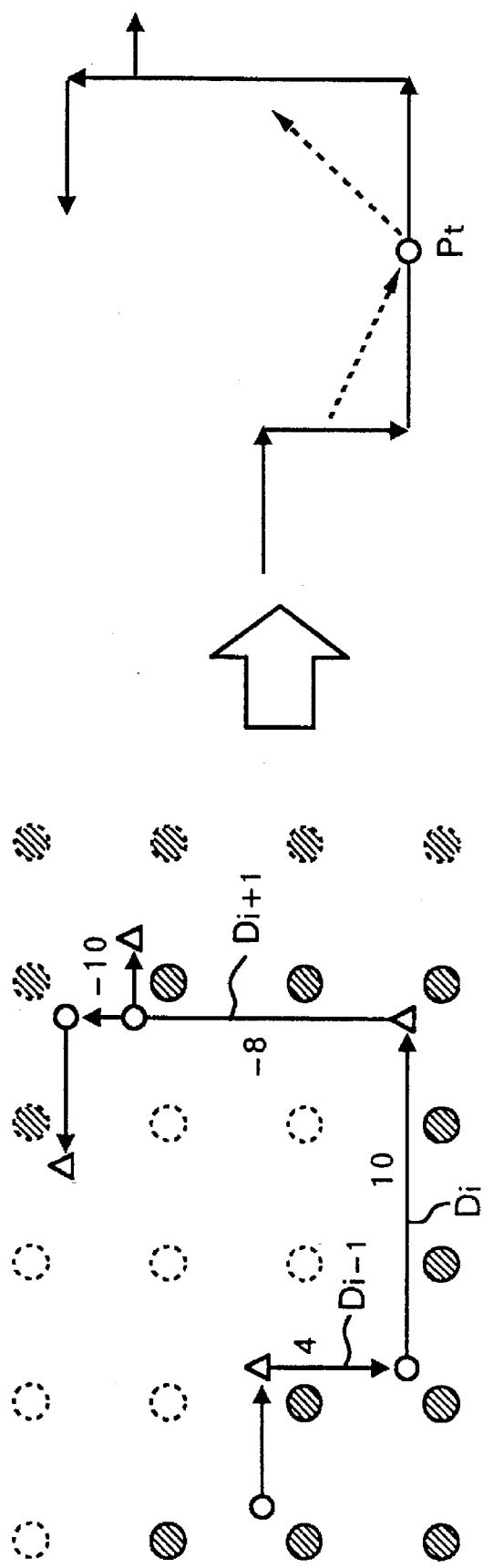
Figure 46:
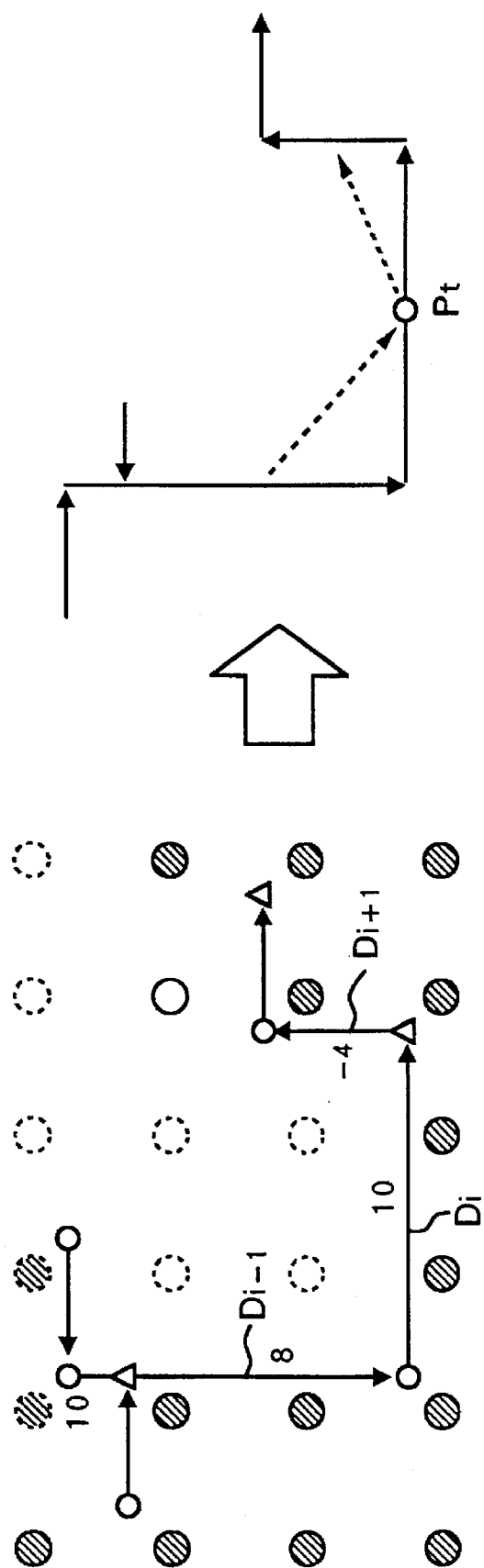

In FIGS. 45 and 46, the object vector $D_i$ is the central vector of a concavity. That is, if the object vector is rightward (the horizontal edge data is positive), the preceding vector $D_{i-1}$ is downward (the vertical edge data is positive), and the subsequent edge data $D_{i+1}$ is upward (the vertical edge data is negative), and the length of the object vector $D_i$ is "10" (2½ pixel length).

Figure 47:
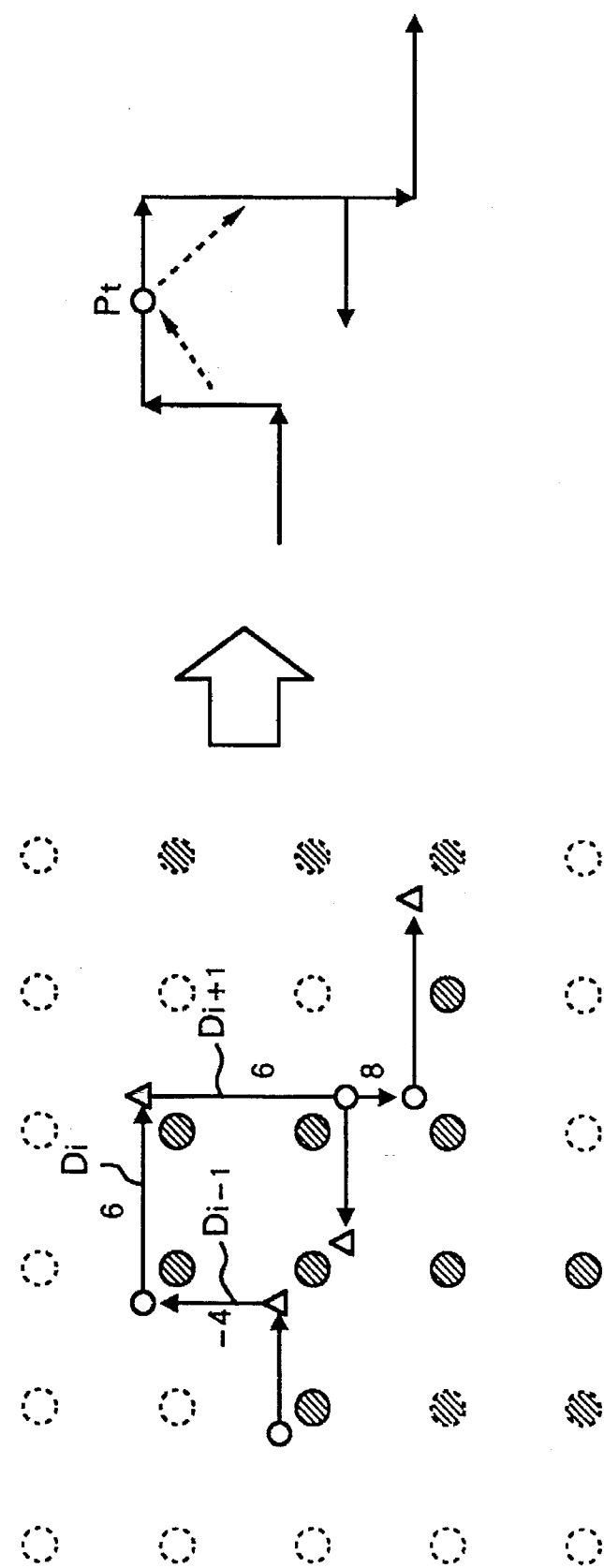

In FIGS. 47 and 48, the object vector $D_i$ is the central vector of a convexity. That is, if the object vector is rightward (the horizontal edge data is positive), the preceding vector $D_{i-1}$ is upward (the vertical edge data is negative), and the subsequent vector $D_{i+1}$ is downward (the vertical edge data is positive), and the length of the object vector $D_i$ is "6" (1½ pixel length).

In these cases, an outline point Pt after the first smoothing is defined by a coordinate value at the central point of the object vector. In the processings as shown in FIGS. 41 to 48, an object vector and its preceding and subsequent vectors can be detected in accordance with the above conditions. These processings smooth a slope.

FIGS. 41 to 48 show only a case where the object vector is rightward. If the object vector is leftward, the conditions of the vertical edge data and the horizontal edge data are changed so that the positive/negative signs become opposite and the expression "or longer" become "or shorter". If the object vector is upward, the conditions of the vertical edge data are changed so that the positive/negative signs become opposite and the expression "or longer" become "or shorter". If the object vector is downward, the conditions of the horizontal edge data are changed so that the positive/negative signs become opposite and the expression "or longer" become "or shorter".

<Gentle Curve (FIGS. 49 and 50)>

Figure 49:
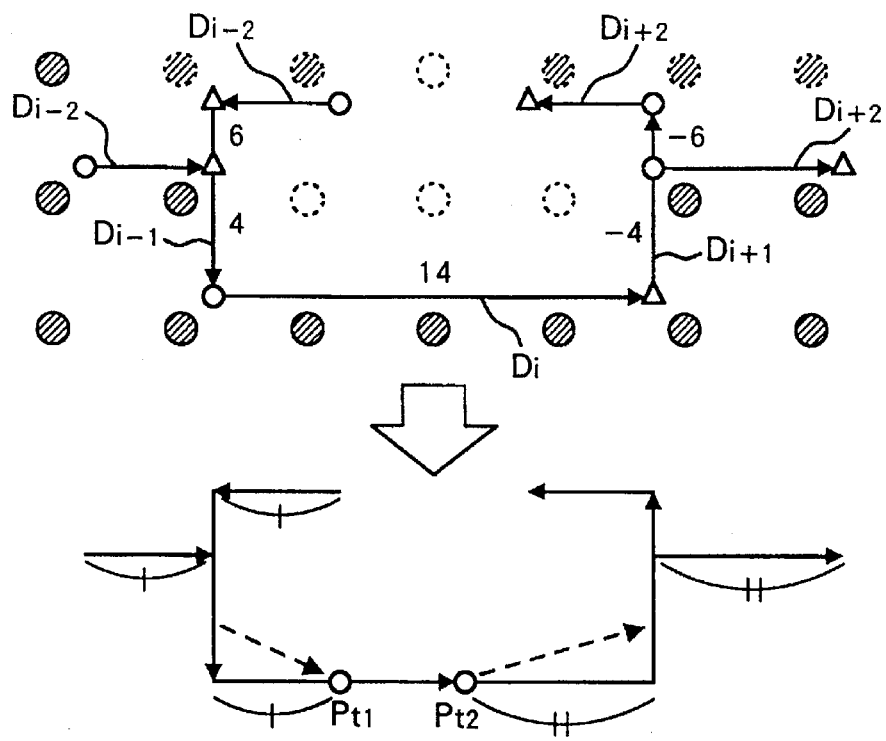
Figure 50:
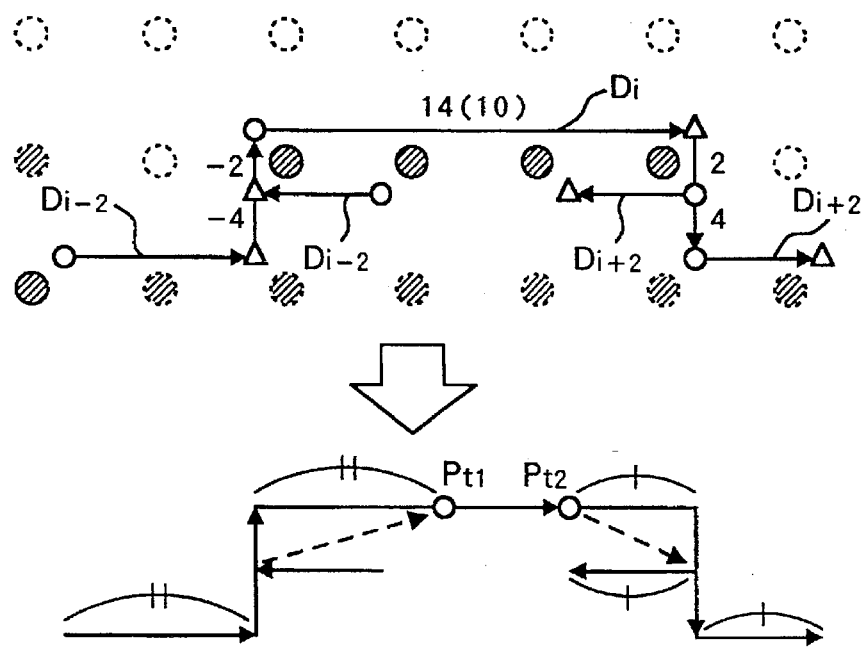

FIGS. 49 and 50 show a series of five outline vectors having the central vector as an object vector $D_i$. The length of the object vector corresponds to three pixel length or longer "10" or "14", depending upon whether the part is a convexity or a concavity), and that of a preceding vector $D_{i-1}$ and that of a subsequent vector $D_{i+1}$ correspond to one pixel length "2", "4" or "6", depending upon whether the part is a convexity, a jagged portion or a concavity). The direction of the vector $D_{i-1}$ and that of the vector $D_{i+1}$ are opposite to each other. The sum of a vector $D_{i-2}$, two vector prior to the object vector $D_i$ and a vector $D_{i+2}$, two vector subsequent to the object vector $D_i$ is shorter than the length of the object vector $D_i$.

In FIG. 49, the object vector $D_i$ is the central vector of a concavity. That is, if the object vector is rightward (the horizontal edge data is positive), the preceding vector $D_{i-1}$ is downward (the vertical edge data is positive), and the subsequent vector $D_{i+1}$ is upward (the vertical edge data is negative), and the length of the object vector is "14" (3½ pixel length) or longer.

In FIG. 50, the object vector $D_i$ is the central vector of a convexity. That is, if the object vector is rightward (the horizontal edge data is positive), the preceding vector $D_{i-1}$ is upward (the vertical edge data is negative) and the subsequent vector $D_{i+1}$ is downward (the vertical edge data is positive), and the length of the object vector $D_i$ is "10" (2½ pixel length) or longer.

In these cases, an outline point Pt1 is defined by a coordinate value at a point on the object vector, moved from the start point of the object vector by the length of a vector $D_{i-2}$, two vectors prior to the object vector, toward the end point of the object vector, and an outline point Pt2 is defined by a coordinate value at a point on the object vector, moved from the end point of the object vector by the length of a vector $D_{i+2}$, two vectors subsequent to the object vector, toward the start point of the object vector. These processings smooth a gentle curve.

FIGS. 49 and 50 show only a case where the object vector is rightward. If the object vector is leftward, the conditions of the vertical edge data and the horizontal edge data are changed so that the positive/negative sign becomes opposite and the expression "or longer" becomes "or shorter". If the object vector is upward, the conditions of the vertical edge data are changed so that the positive/negative sign becomes opposite and the expression "or longer" becomes "or shorter". If the object vector is downward, the conditions of the horizontal edge data are changed so that the positive/ negative sign becomes opposite and the expression "or longer" becomes "or shorter".

If a vector combination pattern does not coincide with any of the above-mentioned patterns in FIGS. 11 to 50, an outline point after the first smoothing is defined by a coordinate value at the central point of an object vector.

[First Smoothing (FIG. 51)]

The first smoothing operation by the CPU 71 in step S2 in FIG. 8 will be described with reference to FIGS. 51 to 67.

Figure 51:
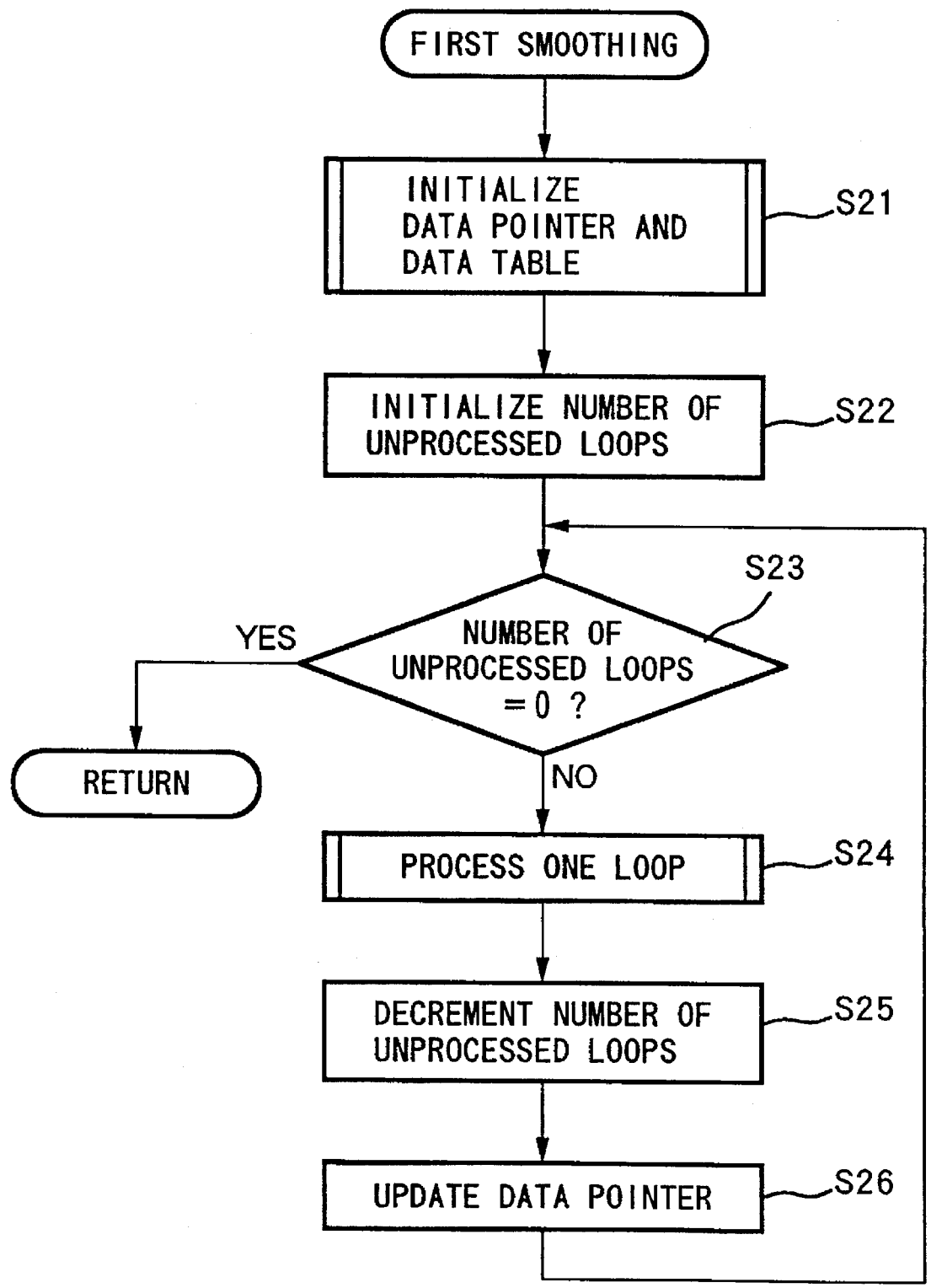

FIG. 51 shows the outline of the first smoothing. When the first smoothing is called in step S2 in FIG. 8, the processing as shown in FIG. 51 is executed. In step S21, a data area pointer (not shown), a data table (not shown) and a counter area (not shown), necessary for processing the coarse-outline data read into the working memory 76, are assigned in the working area 76 and initialized. Further, a desired magnification/reduction ratio in the main-scanning/sub-scanning direction is obtained by the ratio setting unit 31.

In step S22, the number of outlines in the coarse-outline data is copied in a temporary processing area as data of the number of unprocessed loops.

In step S23, whether or not the number of unprocessed loops is zero or not is determined. If YES, the process returns to the flowchart in FIG. 8, as the series of first smoothing processings have been finished. If NO, the process proceeds to step S24.

In step S24, the series of first smoothing processings are performed on the coarse-outline data using a start address of data area to be processed in the working memory 76. Note that the contents of the first smoothing processings will be described in detail later with reference to FIG. 52. The start address (held by the data area pointer) of the data to be processed in the working memory 76 is first initialized to a start address of the first outline data in step S21.

When the processing in step S24 is finished, the process proceeds to step S25, in which the number of unprocessed loops is decremented by one.

In step S26, the data area pointer is updated so that a start address of the next coarse-outline loop data area becomes the start address of data area to be processed. This updating is easily attained by adding a data amount of coarse-outline points within the prior coarse-outline loop to the prior start address data. Then the process returns to step S23 to repeat the above processings.

<Processing of One Loop (FIG. 52)>

Figure 52:
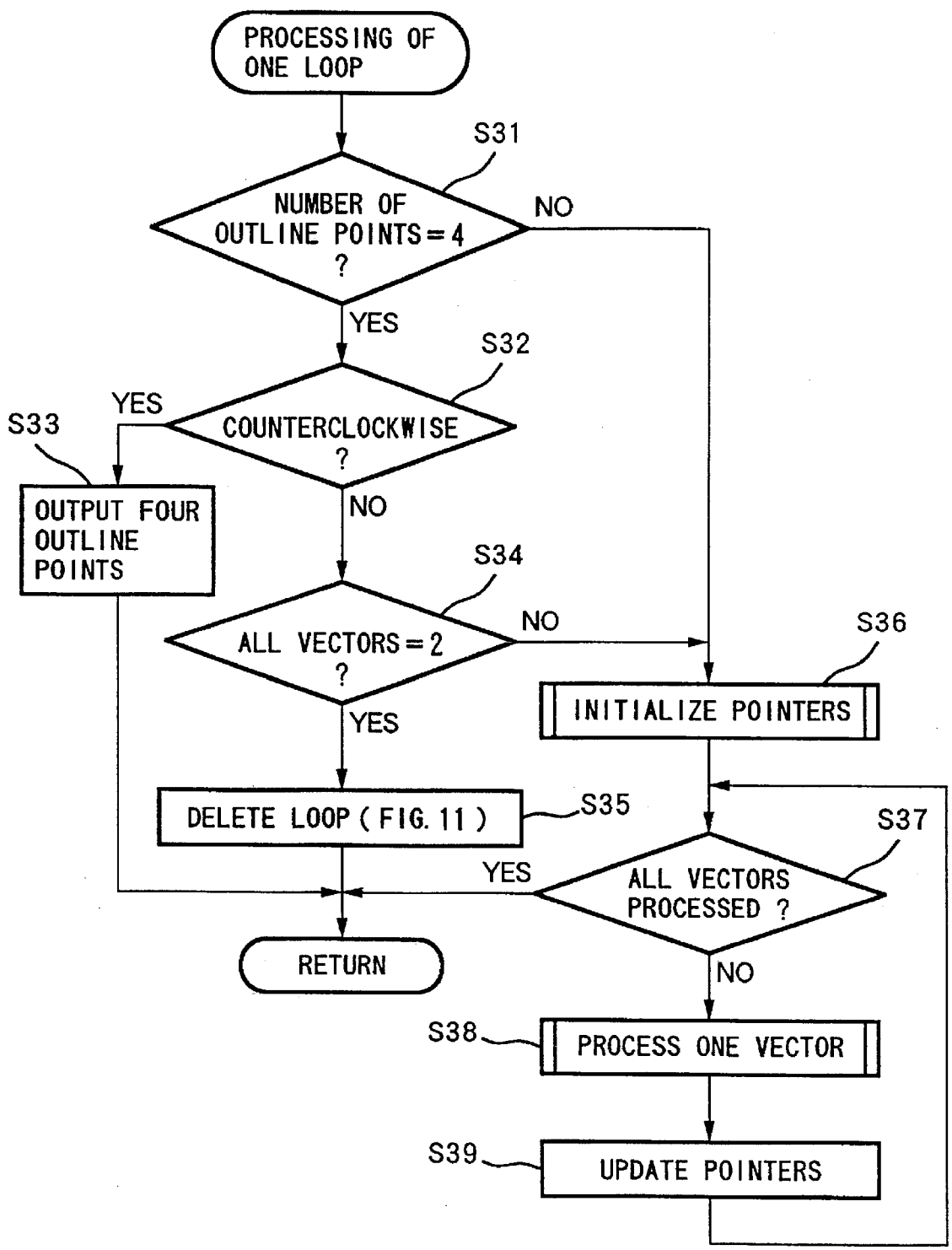
FIG. 52 is a flowchart showing the first smoothing with respect to one coarse outline loop.

Next, the processing of one loop in step S24 of FIG. 51 will be described with reference to FIG. 52. The flowchart in FIG. 52 starts when the processing of one-loop is called in step S24.

In step S31, whether or not the number of coarse-outline points in a coarse-outline loop designated by a data area pointer is four is determined. If YES, the process advances to step S32, while if NO, advances to step S36.

In step S32, whether or not the coarse-outline loop that consists of four outline points is a counterclockwise loop is determined. That is, assuming the first horizontal edge data is an object vector $D_i$, if $D_i<0$ and $D_{i+1}>0$, or if $D_i>0$ and $D_{i+1}<0$, the loop is counterclockwise. If these inequalities do not hold, the loop is clockwise. In case of counterclockwise loop, the process proceeds to step S33, while in case of clockwise loop, proceeds to step S34.

In step S33, as the loop is a counterclockwise loop having four outline points, i.e., the outline vector pattern corresponds to the pattern as shown in FIG. 18, the four coarse-outline points are outputted as corner points. Note that data on discrimination of corner/non-corner point is managed by a pointer in an additional data area ensured on the RAM 76, apart from coordinate data area, but similar to the coordinate data area. Additional data areas for respective outline point (including corner points and non-corner points) are ensured as continuous memory areas.

When the processing in step S33 is finished, the process returns to the routine in FIG. 51 as the processing of the coarse-outline loop has been completed.

In step S34, whether or not all the edge data of the loop, that is a clockwise having four outline points, are "2" is determined. That is, assuming that the first edge data is an object vector $D_i$, if $D_i=2$ or $D_i=-2$ and $D_{i+1}=2$ or $D_{i+1}=-2$ are determined. If these conditions are satisfied, it is determined that the respective vector lengths are "2" and the process proceeds to step S35. On the other hand, if these conditions are not satisfied, the process proceeds to step S36.

The loop processed in step S35 corresponds to a case where the length of all the vectors of the clockwise loop consisting of four outline points is "1", i.e., an isolated spot pattern as shown in FIG. 11. In this case, the loop itself is deleted. When the processing in step S35 is finished, the process returns to the routine in FIG. 51 as the processing of the loop has been completed.

In step S36, initialization necessary for processing the respective edge data in the coarse-outline loop is performed. That is, the edge data between respective outline points are generated for one loop. Further, pointers and registers for sequentially processing the data are initialized. Then the process proceeds to step S37 and the subsequent steps to process the edge data in one-vector units.

In step S37, whether or not all the vectors have been processed is determined. If YES, the process returns to the routine in FIG. 51 as the processing of the loop has been completed. If NO, the process proceeds to step S38. The determination as to whether or not the all the vectors have been processed is copied in the temporary processing area with outline points as the number of unprocessed vectors. Thereafter, as one vector has been processed, the number of unprocessed vectors in the temporary processing area is decremented by one. In step S37, whether or not this number is zero is determined.

In step S38, the edge data generated in step S36, a pointer designating an address of an area in which a edge data of the current object vector is stored, and a pointer designating an address of an area in which coordinate values of the start point and the end point of the object vector are stored are used for processing. These pointers have been initialized in step S36, and as one vector has been processed, the addresses designated by the pointers have been updated. FIG. 53 shows a edge data area generated in step S36.

The respective edge data are calculated using the differences between the continuous outline points. Horizontal edge data is generated by subtracting an x-coordinate value of a vector start point from an x-coordinate value of a vector end point. Vertical edge data is generated by subtracting a y-coordinate value of a vector start point from a y-coordinate value of a vector end point. The edge data are stored in memory areas of addresses in ascending/descending order. The contents of the processing in step S38 will be described in detail later with reference to FIGS. 54 to 70.

In step S39, the pointers designating the edge data area and the coordinate data area are updated for the next data areas, and data indicative of the number of unprocessed vectors is decremented by one. When the processing in step S39 is completed, the process returns to step S37 to repeat the above processings.

<Processing of One Vector (FIG. 54)>

Next, the smoothing of one vector will be described with reference to FIGS. 54 to 70. The flowchart in FIG. 54 starts when the processing of one-vector is called for in step S38 in FIG. 52.

In step S51, whether or not the edge data of the current outline including the object vector is a convexity, a concavity or a jagged portion is determined. In case of a convexity, the process proceeds to step S53 to perform corresponding processing, otherwise, proceeds to step S54. In step S54, whether or not the current outline represents a concavity is determined. If YES, the process proceeds to step S56 to perform corresponding processing, otherwise, proceeds to step S55 as it is determined that the data represents a jagged portion, to perform corresponding processing.

The contents of the processing in step S51 will be described in detail later with reference to FIG. 55.

In step S53, processing for a case where the object vector is in a convexity is performed. The content of the processing will be described in detail with reference to FIGS. 56 to 59.

In step S56, processing for a case where the object vector is in a concavity is performed. The content of the processing will be described in detail with reference to FIGS. 60 to 63.

In step S55, processing for a case where the object vector is in a jagged portion is performed. The content of the processing will be described in detail with reference to FIGS. 64 to 70. When any of the processings in step S53, S55 and S56 is finished, the process returns to the routine in FIG. 52 as the smoothing of one object vector has been completed.

<Discrimination of Outline (FIG. 55)>

The processing in step S51 in FIG. 54 will be described with reference to FIG. 55. The flowchart in FIG. 55 starts when the discrimination of outline is called in step S51 in FIG. 54.

In step S61, whether or not the direction of a vector prior to the object vector and that of a vector following the object vector are the same, i.e., the positive/negative signs of the edge data are the same or not is determined. If YES, the process proceeds to step S62, while if NO, proceeds to step S63.

Figure 54:
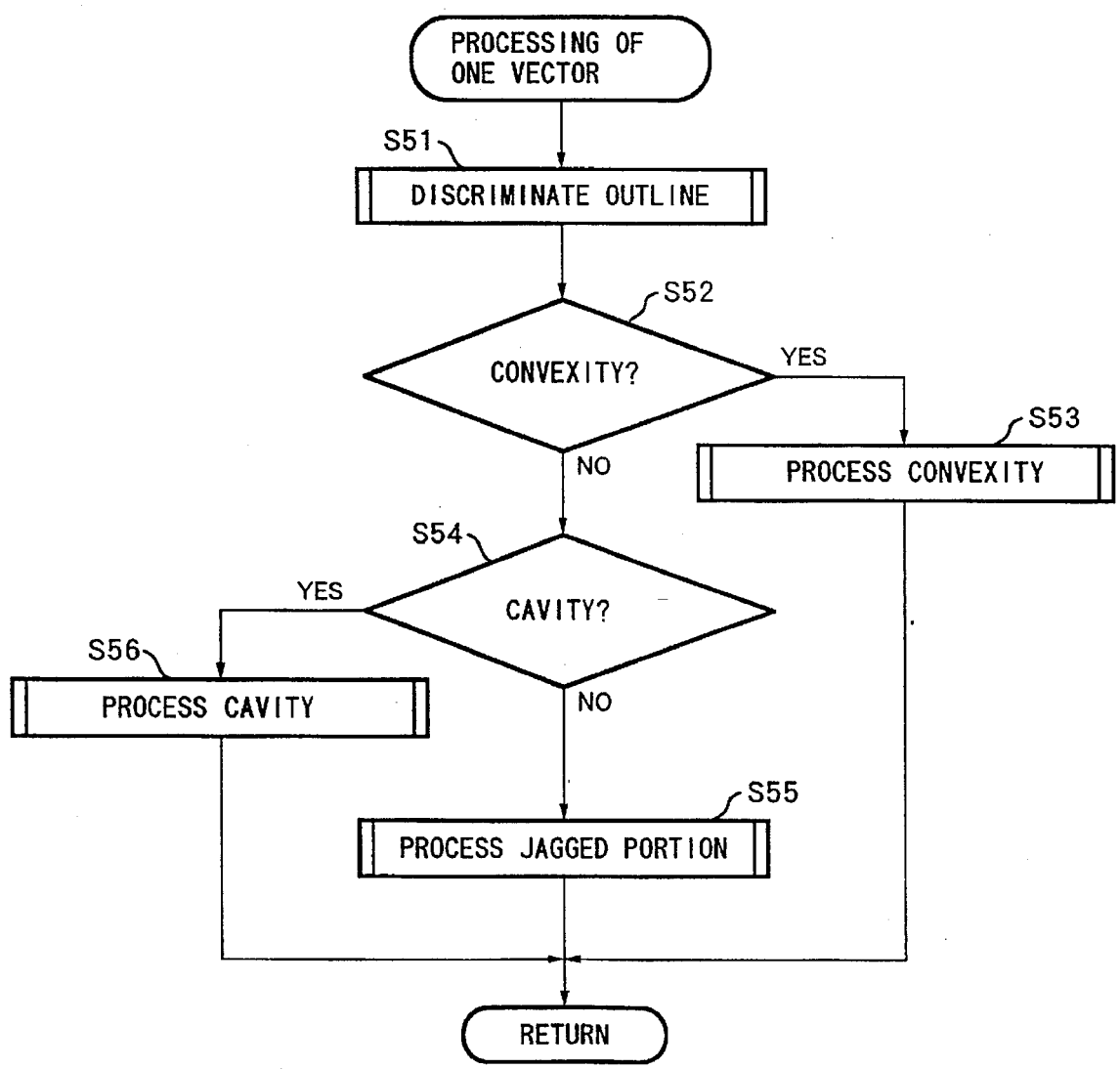
FIGS. 54 to 76 are flowcharts showing the first smoothing with respect to one coarse outline vector.

In step S62, it is determined that the current outline is a jagged portion based on the determination in step S61, and the process returns to the routine in FIG. 54. In step S63, whether the object vector is horizontal or vertical is determined. If the object vector is a horizontal vector, the process proceeds to step S68, while if NO, proceeds to step S64.

In step S64, whether or not the object vector is downward, i.e., whether the y-coordinate value of the end point of the object vector is greater than that of the start point of the object vector (a direction from the upper end to the lower end of the y-axis is positive) or not is determined. If YES, the process proceeds to step S67, while if NO, proceeds to step S65.

In step S65, whether or not the subsequent vector is rightward, i.e., whether the x-coordinate of the end point of the object vector is greater than that of the vector start point of the object vector (a direction from the left end to the right end of the x-axis is positive) or not is determined. If YES, the process proceeds to step S66, while if NO, proceeds to step S70.

In step S66, it is determined that the current outline is a convexity based on the determination in step S65, and the process returns to the routine in FIG. 54.

In step S67, whether or not the subsequent vector is rightward, i.e., the y-coordinate value of the vector start point and the vector end point of the subsequent vector are the same, and whether or not the x-coordinate value of the vector end point is greater than that of the vector start point, is determined. If YES in step S67, the process proceeds to step S70, while if NO, proceeds to step S66.

In step S68, whether or not the object vector is rightward, i.e., the x-coordinate value of the vector end point of the object vector is greater than that of the vector start point of the object vector, is determined. If YES, the process proceeds to step S71, while if NO, proceeds to step S69.

In step S69, whether or not the subsequent vector is downward or not, i.e., the y-coordinate value of the end point of the subsequent vector is greater than that of the start point of the subsequent vector, is determined. If YES, the process proceeds to step S70, while if NO, proceeds to step S66.

In step S70, it is determined that the current outline is a concavity based on the determination in step S69, and the process returns to the routine in FIG. 54.

In step S71, whether or not the subsequent vector is downward, i.e., the y-coordinate value of the end point of the subsequent vector is greater than that of the start point of the subsequent vector, is determined. If YES, the proceeds to step S66, while if NO, proceeds to step S70.

<Processing of Convexity (FIGS. 56 to 59)>

Next, the processing in step S53 in FIG. 54 will be described with reference to FIG. 56. The flowchart in FIG. 56 starts when the processing of convexity is called in step S53 in FIG. 54.

In step S101, whether or not the length of the object vector is "2", i.e., the edge data is "2" or "−2" is determined. If YES, the process proceeds to step S102, while if NO, proceeds to step S103.

In step S102, processing in a case where the object vector is in a convexity and the length of the object vector is "2" is performed. Thereafter, the process returns to the routine in FIG. 54.

In step S103, whether or not the length of the object vector is "6", i.e., the edge data is "6" or "−6" is determined. If YES, the process proceeds to step S105, while if NO, proceeds to step S104.

In step S104, processing in a case where the length of the object vector is "10" or longer is performed. Thereafter, the process returns to the routine in FIG. 54.

In step S105, processing in a case where the object vector is in a convexity and the length of the object vector is "6" is performed. The contents of the processings in steps S102, S104 and S105 will be described with reference to FIG. 57, FIG. 59 and FIG. 58 respectively.

Figure 56:
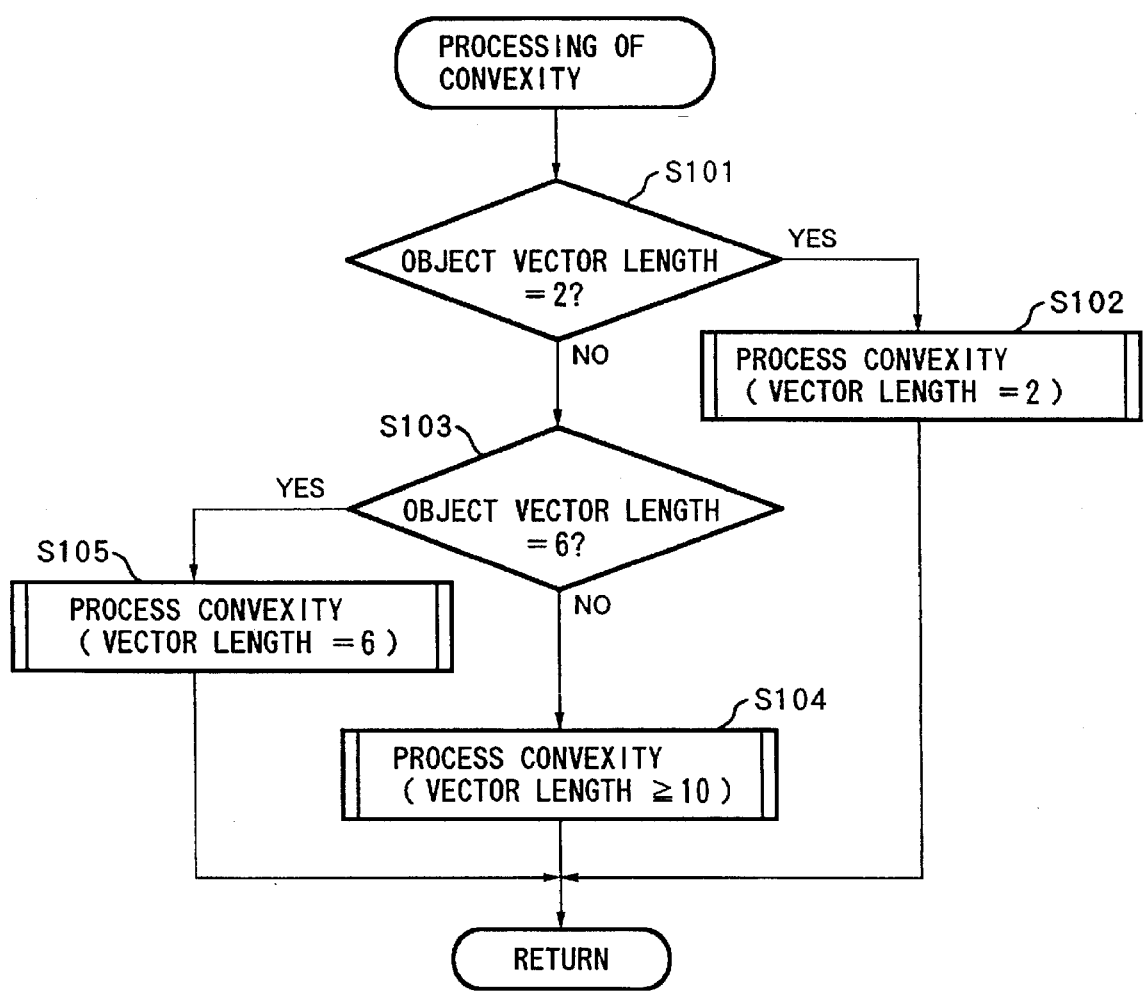
Figure 57:
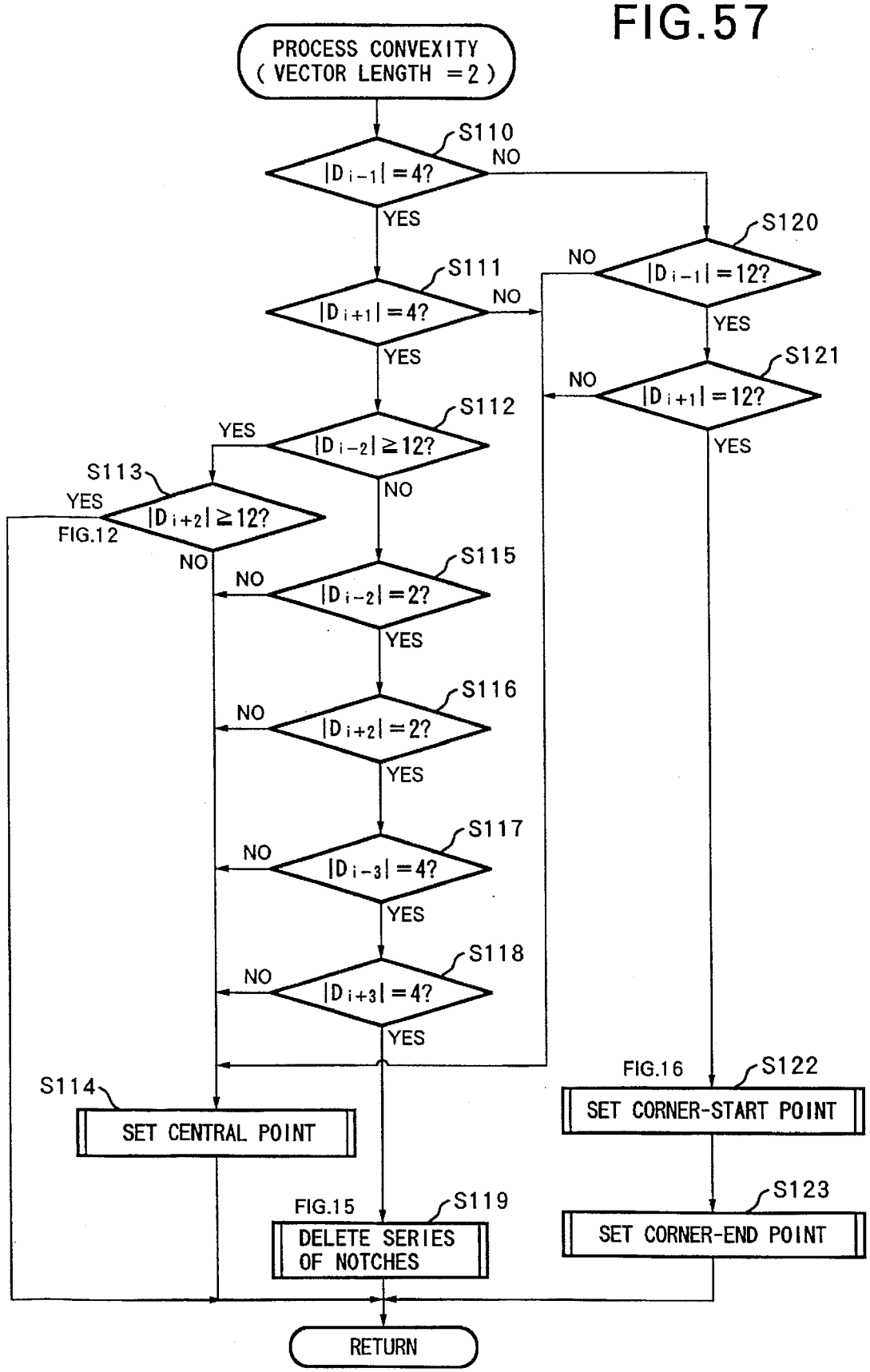

The flowchart in FIG. 57 starts when the processing of convexity is called in step S102 in FIG. 56. It should be noted that in FIG. 57, the object vector is represented by numeral "$D_i$"; a preceding vector, by numeral "$D_i-$(the number of prior vectors)"; and a subsequent vector, by numeral "$D_i+$(the number of following vectors)". Further, the length of vectors are represented by absolute values.

In step S110, whether or not the length of a preceding vector $|D_{i-1}|$ is "4", i.e., the preceding edge data is "4" or "−4" is determined. If YES, the process proceeds to step S111, while if NO, proceeds to step S120.

In step S111, whether or not the length of a subsequent vector $|D_{i+1}|$ is "4", i.e., the subsequent edge data is "4" or "−4" is determined. If YES, the process proceeds to step S112, while if NO, proceeds to step S114.

In step S112, whether or not the length of a second preceding vector $|D_{i-2}|$ is "12" or longer, i.e., the second preceding edge data is "12" or longer or "−12" or longer is determined. If YES, the process proceeds to step S113, while if NO, proceeds to step S115.

In step S113, whether or not the length of a second succeeding vector $|D_{i+2}|$ is "12" or longer, i.e., the second succeeding edge data is "12" or longer or "−12" or longer is determined. If YES, the process returns to the processing in FIG. 56, while if NO, proceeds to step S114.

In step S114, setting of central outline point is performed. That is, an outline point after the first smoothing is defined by a coordinate value at the central point of the object vector. Thereafter, the process returns to the routine in FIG. 56.

In step S115, whether or not the length of the second preceding vector is "6", i.e., the second preceding edge data is "6" or "−6" is determined. If YES, the process proceeds to step S116, while if NO, proceeds to step S114.

In step S115, whether or not the length of the second succeeding vector is "6", i.e., the second succeeding edge data is "6" or "−6" is determined. If YES, the process proceeds to step S116, while if NO, proceeds to step S114.

In step S116, whether or not the length of the second preceeding vector $D_{i-2}$ is "6", i.e., the second preceeding edge data is "6" or "−6" is determined. If Yes, the process proceeds to step S117, while if No, proceeds to step S114.

In step S117, whether or not the length of a three-vector preceding vector $|D_{i-3}|$ is "4", i.e., the three-vector preceding edge data is "4" or "−4" is determined. If YES, the process proceeds to step S118, while if NO, proceeds to step S114.

In step S118, whether or not the length of a three-vector subsequent vector $|D_{i+3}|$ is "4", i.e., the three-vector subsequent edge data is "4" or "−4" is determined. If YES, the process proceeds to step S119, while if NO, proceeds to step S114.

In step S119, deletion of series of notches, i.e., processing of an outline as shown in FIG. 15 is performed. Thereafter, the process returns to the routine in FIG. 56. It should be noted that figure numbers given at steps S119 and S122 depict the respective processing states.

In step S120, whether or not the length of the preceding vector $|D_{i-1}|$ is "12" or longer, i.e., the preceding edge data is "12" or longer or "−12" or longer is determined. If YES, the process proceeds to step S121, while if NO, proceeds to step S114.

In step S121, whether or not the length of the subsequent vector $|D_{i+1}|$ is "12" or longer, i.e., the subsequent edge data is "12" or longer or "−12" or longer is determined. If YES, the process proceeds to step S122, while if NO, proceeds to step S114.

In step S122, setting of corner-start point is performed. That is, an outline point after the first smoothing is defined by a coordinate value at the start point of the object vector. Thereafter, the process proceeds to step S123. In step S123, setting of corner-end point is performed. At this time, an outline point after the first smoothing is defined by a coordinate value at the end point of the object vector. Thereafter, the process returns to the routine in FIG. 56.

These processings in steps S114, S119, S122 and S123 will be described in detail later with reference to FIGS. 73, 74, 71 and 72.

Figure 58:
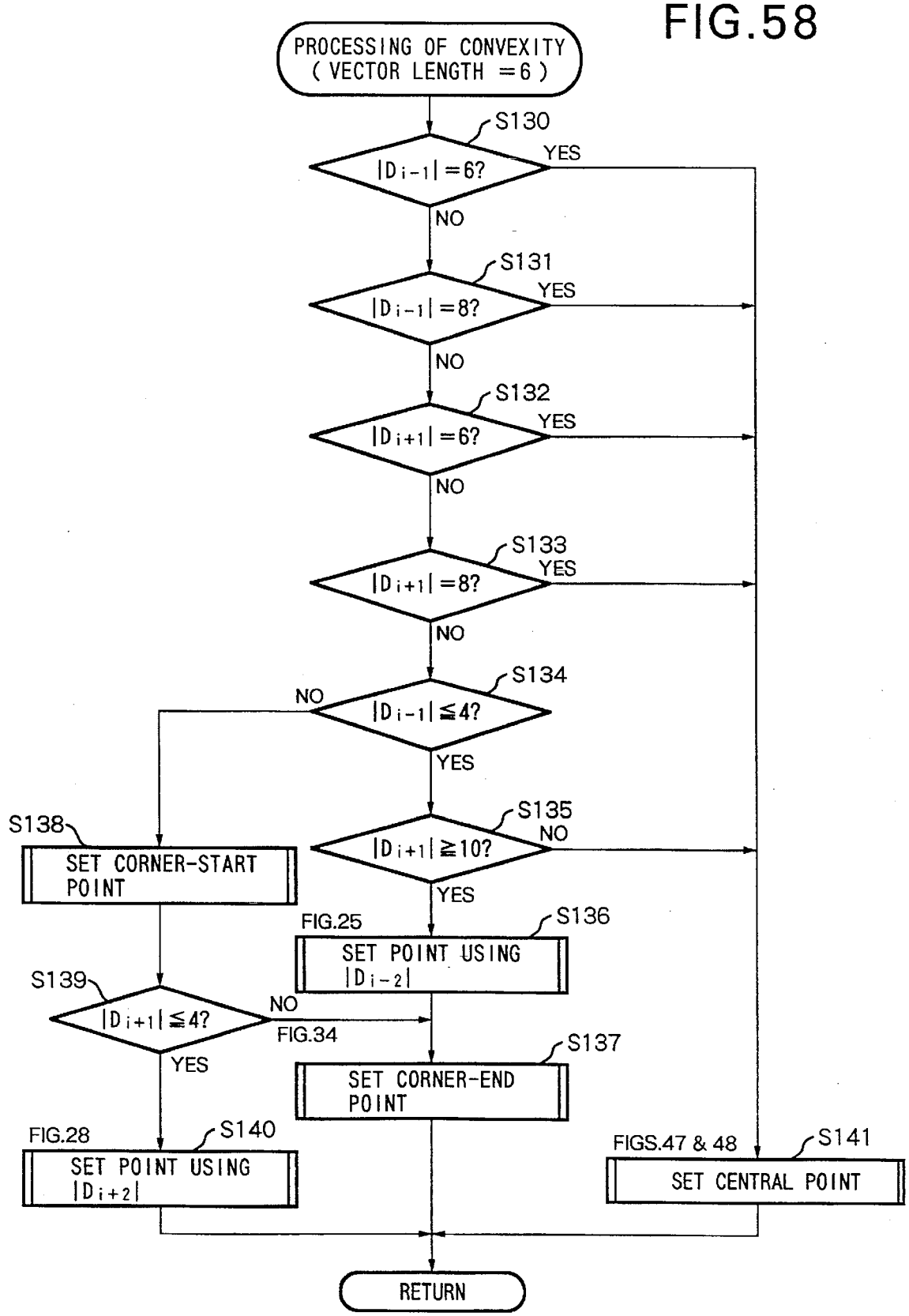

The flowchart in FIG. 58 starts when the processing of convexity is called in step S105 in FIG. 56.

In step S130, whether or not the length of the preceding vector $|D_{i-1}|$ is "6", i.e., the preceding edge data is "6" or "−6" is determined. If YES, the process proceeds to step S141, while if NO, proceeds to step S131.

In step S131, whether or not the length of the preceding vector $|D_{i-1}|$ is "8", i.e., the preceding edge data is "8" or "−8" is determined. If YES, the process proceeds to step S141, while if NO, proceeds to step S132.

In step S132, whether or not the length of the subsequent vector $|D_{i+1}|$ is "6", i.e., the subsequent edge data is "6" or "–6" is determined. If YES, the process proceeds to step S141, while if NO, proceeds to step S133.

In step S133, whether or not the length of the subsequent vector $|D_{i+1}|$ is "8", i.e., the subsequent edge data is "8" or "–8" is determined. If YES, the process proceeds to step S141, while if NO, proceeds to step S134.

In step S134, whether or not the length of the preceding vector $|D_{i-1}|$ is "4" or shorter, i.e., the preceding edge data is "4" or shorter or "–4" or shorter is determined. If YES, the process proceeds to step S135, while if NO, proceeds to step S138.

In step S135, whether or not the length of the subsequent vector $|D_{i+1}|$ is "10" or longer, i.e., the subsequent edge data is "10" or longer or "–10" or longer is determined. If YES, the process proceeds to step S136, while if NO, proceeds to step S141.

In step S136, setting of outline point using second preceding vector length is performed. That is, an outline point after the first smoothing is defined at a point on the object vector moved from the vector start point toward the vector end point by the length of the second preceding vector. Thereafter, the process proceeds to step S137.

In step S137, setting of corner-end point is performed. That is, an outline point after the first smoothing by a coordinate value at the end point of the object vector. Thereafter, the process returns to the routine in FIG. 56.

In step S138, setting of a corner-start point is performed. That is, an outline point after the first smoothing is defined by a coordinate value at the start point of the object vector. Thereafter, the process proceeds to step S139.

In step S139, whether or not the length of the subsequent vector $|D_{i+1}|$ is "4" or shorter, i.e., the subsequent edge data is "4" or shorter and "–4" or shorter is determined. If YES, the process proceeds to step S140, while if NO, proceeds to step S137.

In step S140, setting of outline point using the second succeeding vector length is performed. That is, an outline point after the first smoothing is defined at a point on the object vector moved from the vector end point toward the vector start point by the length of the second succeeding vector. Thereafter, the process returns to the routine in FIG. 56.

In step S141, setting of central point is performed. That is, an outline point after the first smoothing is defined by a coordinate value at the central position of the object vector is defined. Thereafter, the process returns to the routine in FIG. 56.

The processings in steps S136, S137, S138, S140 and S141 will be described in detail later with reference to FIGS. 75, 72, 71, 76 and 73.

Figure 59:
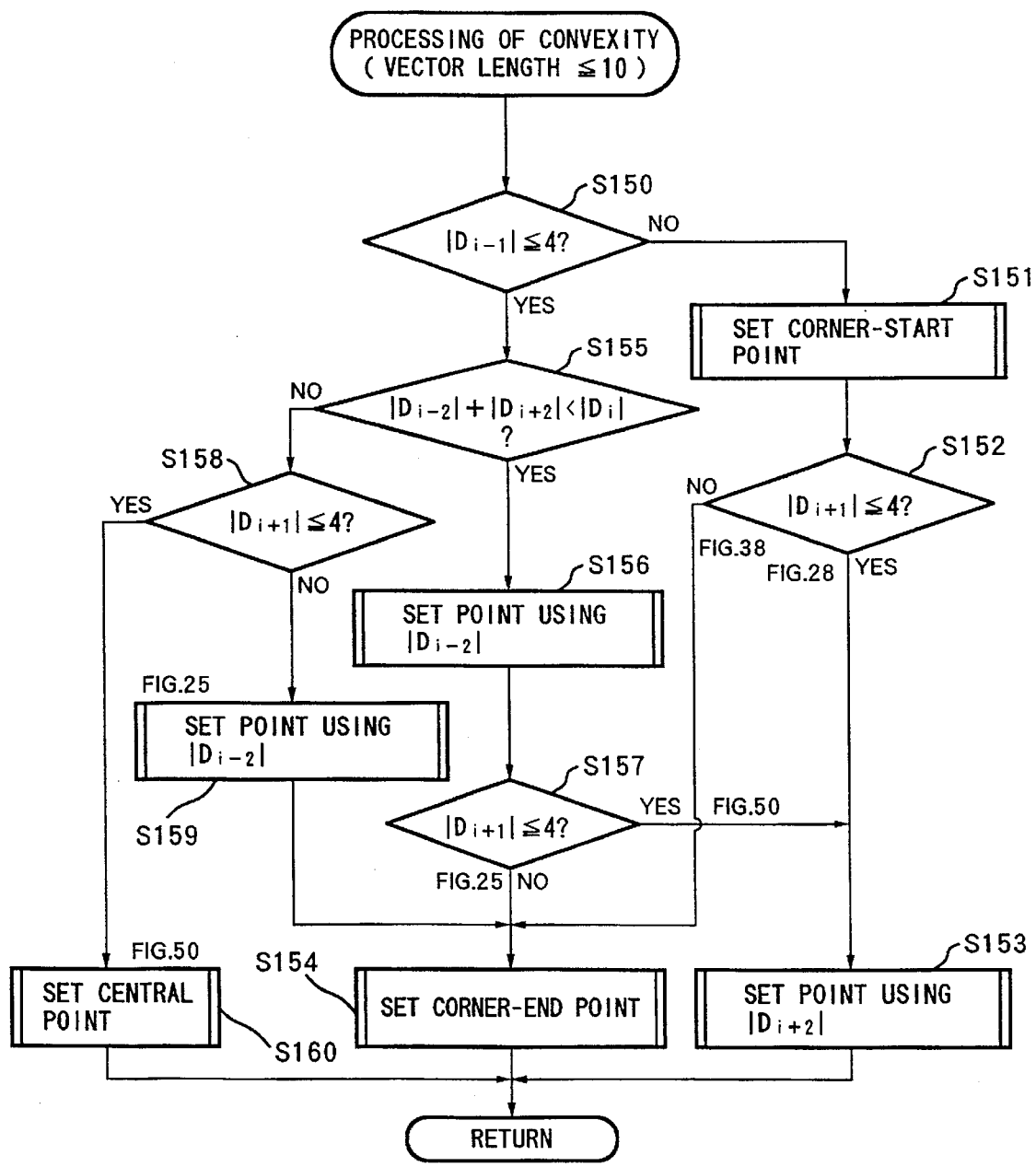

The flowchart in FIG. 59 starts when the processing of convexity is called in step S104 in FIG. 56.

In step S150, whether or not the length of the preceding vector $|D_{i-1}|$ is "4" or shorter, i.e., the preceding edge data is "4" or shorter and "–4" or shorter is determined. If YES, the process proceeds to step S155, while if NO, proceeds to step S151.

In step S151, setting of corner-start point is performed. That is, an outline point after the first smoothing is defined by a coordinate value at the end point of the object vector. Thereafter, the process proceeds to step S152.

In step S152, whether or not the length of the subsequent vector $|D_{i+1}|$ is "4" or shorter, i.e., the subsequent edge data is "4" or shorter and "–4" or shorter is determined. If YES, the process proceeds to step S153, while if NO, proceeds to step S154.

In step S153, setting of outline point using second succeeding vector length is performed. That is, an outline point after the first smoothing is defined at a point on the object vector moved from the vector end point toward the vector start point by the length of the second succeeding vector. Thereafter, the process returns to the routine in FIG. 56.

In step S154, setting of corner-end point is performed. That is, an outline point after the first smoothing by a coordinate value at the end point of the object vector. Thereafter, the process returns to the routine in FIG. 56.

In step S155, whether or not the sum of the length of the second preceding vector and that of the second succeeding vector is shorter than the length of the object vector. If YES, the process proceeds to step S156, while if NO, proceeds to step S158.

In step S156, setting of outline point using second preceding vector length is performed. That is, an outline point after the first smoothing is defined at a point on the object vector moved from the vector start point toward the vector end point by the length of the second preceding vector. Thereafter, the process proceeds to step S157.

In step S157, whether or not the length of the subsequent vector $|D_{i+1}|$ is "4" or shorter, i.e., the subsequent edge data is "4" or shorter and "–4" or shorter is determined. If YES, the process proceeds to step S153, while if NO, proceeds to step S154.

In step S158, whether or not the length of the subsequent vector $|D_{i+1}|$ is "4" or shorter, i.e., the subsequent edge data is "4" or shorter and "–4" or shorter is determined. If YES, the process proceeds to step S160, while if NO, proceeds to step S154.

In step S159, setting of outline point using second preceding vector length is performed. That is, an outline point after the first smoothing is defined at a point on the object vector moved from the vector start point toward the vector end point by the length of the second preceding vector. Thereafter, the process retunrs to the routine in FIG. 56.

In step S160, setting of central point is performed. That is, an outline point after the first smoothing is defined by a coordinate value at the central position of the object vector is defined. Thereafter, the process returns to the routine in FIG. 56.

The processings in steps S151, S153, S154, S156, S159 and S160 will be described in detail later with reference to FIGS. 71, 76, 72, 75 and 73.

<Processing of Cavity (FIGS. 60 to 63)>

Next, the contents of the processing in step S56 in FIG. 54 will be described with reference to FIG. 60. The flowchart in FIG. 60 starts when the processing of concavity is called in step S56.

In step S201, whether or not the length of the object vector is "6" or shorter, i.e., the object edge data is "6" or shorter and "–6" or shorter is determined. If YES, the process proceeds to step S202, while if NO, proceeds to step S203.

In step S202, processing in a case where the object vector is in a concavity and the vector length is "6" or shorter is performed. Thereafter, the process returns to the routine in FIG. 54.

In step S203, whether or not the length of the object vector is "10" or shorter, i.e., the object edge data is "10" or shorter and "–10" or shorter is determined. If YES, the process proceeds to step S205, while if NO, proceeds to step S204.

In step S204, processing in a case where the object vector is in a concavity and the vector length is "12" or longer is performed. Thereafter, the process returns to the routine in FIG. 54.

In step S205, processing in a case where the object vector is in a concavity and the vector length is "10" or shorter is performed.

The processings in steps S202, S204 and S205 will be described in detail later with reference to FIGS. 61, 63 and 62.

Figure 60:
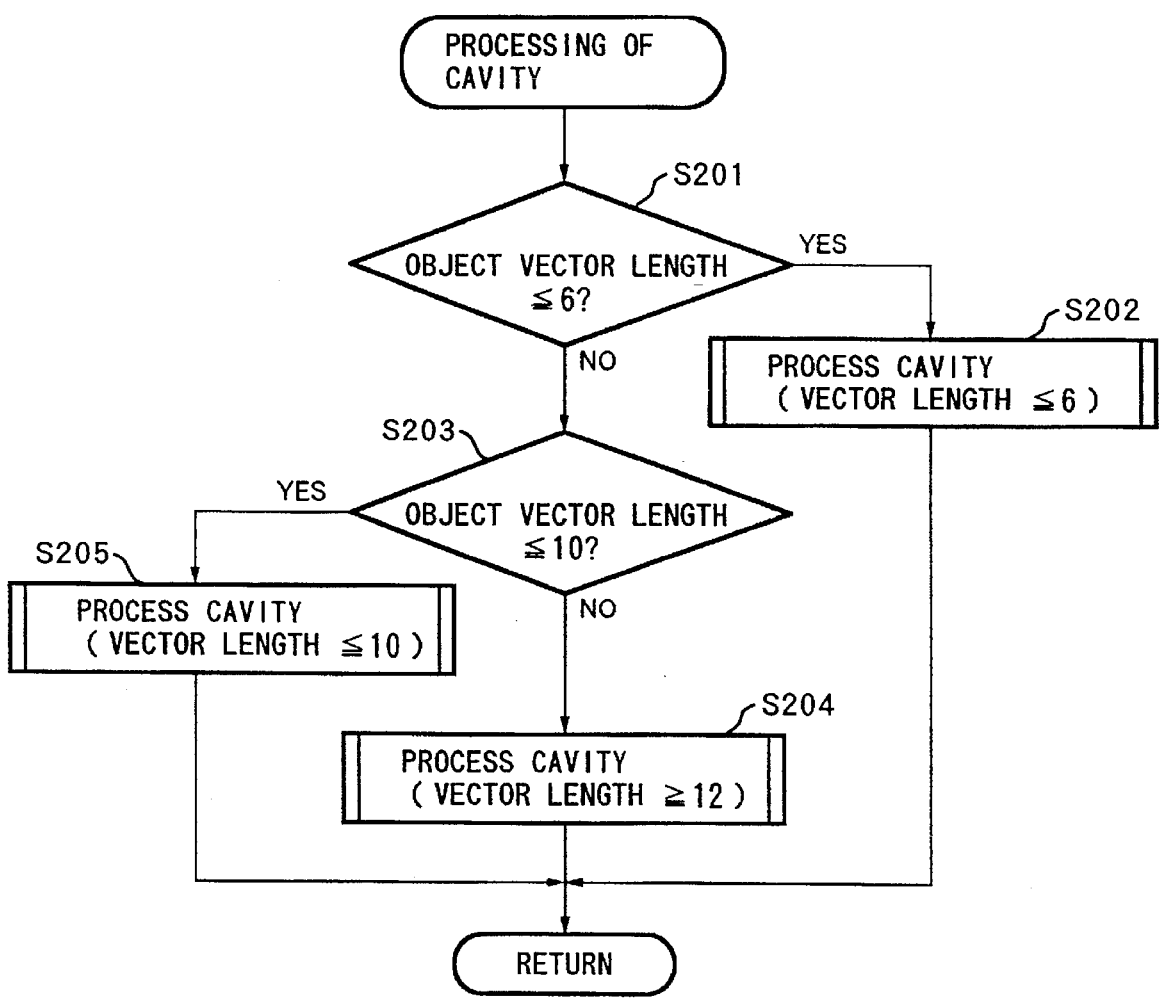
Figure 61:
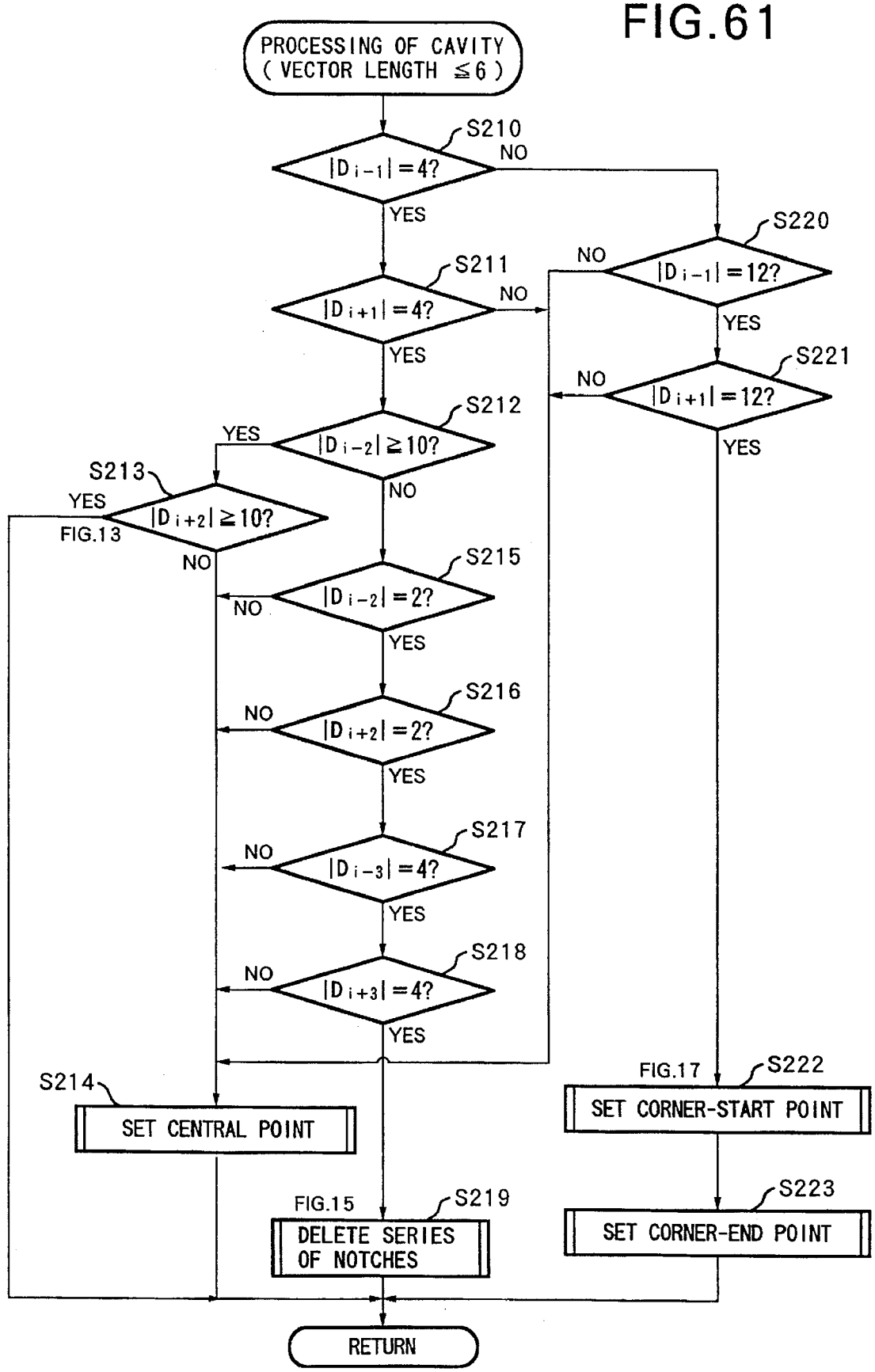

The flowchart in FIG. 61 starts when the processing of concavity is called in step S202 in FIG. 60.

In step S210, whether or not the length of the preceding vector $|D_{i-1}|$ is "4", i.e., the preceding edge data is "4" or "−4" is determined. If YES, the process proceeds to step S211, while if NO, proceeds to step S220.

In step S211, whether or not the length of the subsequent vector $|D_{i+1}|$ is "4", i.e., the subsequent edge data is "4" or "−4" is determined. If YES, the process proceeds to step S212, while if NO, proceeds to step S214.

In step S212, whether or not the length of the second preceding vector $|D_{i-2}|$ is "10" or longer, i.e., the second preceding edge data is "10" or longer or "−10" or shorter is determined. If YES, the process proceeds to step S213, while if NO, proceeds to step S215.

In step S213, whether or not the length of the second succeeding vector $|D_{i+2}|$ is "10" or longer, i.e., the second succeeding edge data is "10" or longer or "−10" or shorter is determined. If YES, the process returns to the routine in FIG. 56, while if NO, proceeds to step S214.

In step S214, setting of central point is performed. That is, an outline point after the first smoothing is defined by a coordinate value at the central point o the object vector. Thereafter, the process returns to the routine in FIG. 56.

In step S215, whether or not the length of the second preceding vector $|D_{i-2}|$ is "2", i.e., the second preceding edge data is "2" or "−10" is determined. If YES, the process proceeds to step S216, while if NO, proceeds to step S214.

In step S216, In step S212, whether or not the length of the second succeeding vector $|D_{i+2}|$ is "2", i.e., the second succeeding edge data is "2" or "−2" is determined. If YES, the process proceeds to step S217, while if NO, proceeds to step S214.

In step S218, whether or not the length of the three-vector preceding vector $|D_{i-3}|$ is "4" is determined. If YES, the process proceeds to step S218, while if NO, proceeds to step S214.

In step S217, whether or not the length of the three-vector subsequent vector $|D_{i+3}|$ is "4" is determined. If YES, the process proceeds to step S219, while if NO, proceeds to step S214.

In step S219, deletion of series of notches, corresponding to processing as shown in FIG. 15 is performed. Thereafter, the process returns to the routine in FIG. 60.

In step S220, whether or not the length of the preceding vector $|D_{i-1}|$ is "12", i.e., the preceding edge data is "12" or "−12" is determined. If YES, the process proceeds to step S221, while if NO, proceeds to step S214.

In step S221, whether or not the length of the vector subsequent $|D_{i+1}|$ is "12", i.e., the subsequent edge data is "12" or "−12" is determined. If YES, the process proceeds to step S222, while if NO, proceeds to step S214.

In step S222, setting of corner-start point is performed. That is, an outline point after the first smoothing is defined by a coordinate value at the start point of the object vector. Thereafter, the process proceeds to step S223.

In step S223, setting of a corner-end point is performed. That is, an outline point after the first smoothing is defined by a coordinate value at the end point of the object vector. Thereafter, the process returns to the routine in FIG. 60.

The processings in steps S214, S219, S222 and S223 will be described in detail later with reference to FIGS. 73, 74, 71 and 72.

Figure 62:
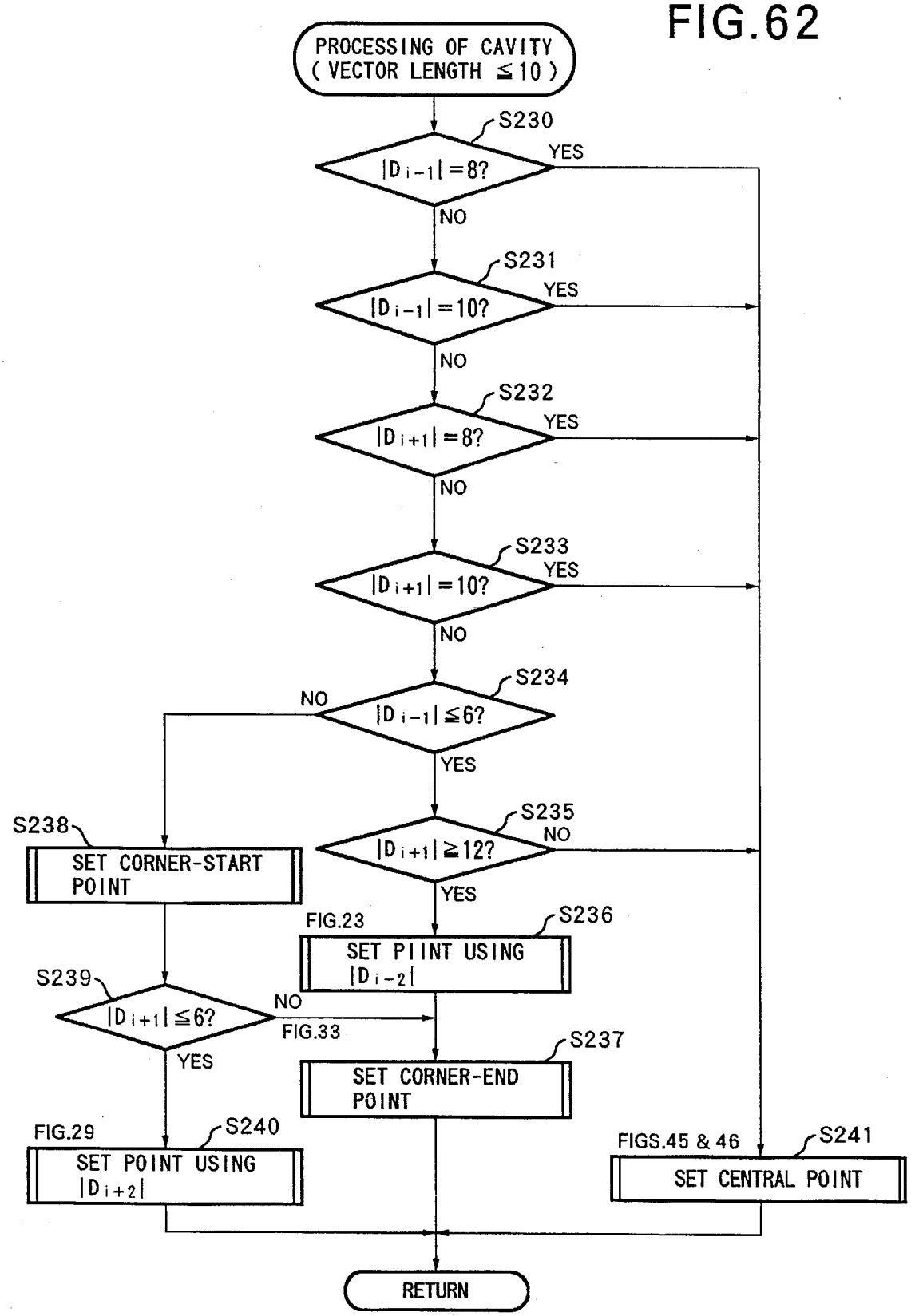

The flowchart in FIG. 62 starts when the processing of concavity is called in step S205 in FIG. 60.

In step S230, whether or not the length of the preceding vector $|D_{i-1}|$ is "8", i.e., the preceding edge data is "8" or "−8" is determined. If YES, the process proceeds to step S241, while if NO, proceeds to step S231.

In step S231, whether or not the length of the preceding vector $|D_{i-1}|$ is "10", i.e., the preceding edge data is "10" or "−10" is determined. If YES, the process proceeds to step S241, while if NO, proceeds to step S232.

In step S232, whether or not the length of the subsequent vector $|D_{i+1}|$ is "8", i.e., the preceding edge data is "8" or "−8" is determined. If YES, the process proceeds to step S241, while if NO, proceeds to step S233.

In step S233, whether or not the length of the subsequent vector $|D_{i+1}|$ is "10", i.e., the preceding edge data is "10" or "−10" is determined. If YES, the process proceeds to step S241, while if NO, proceeds to step S234.

In step S234, whether or not the length of the preceding vector $|D_{i-1}|$ is "6" or shorter, i.e., the preceding edge data is "6" or shorter and "−6" or shorter is determined. If YES, the process proceeds to step S235, while if NO, proceeds to step S238.

In step S235, whether or not the length of the subsequent vector $|D_{i+1}|$ is "12" or longer, i.e., the subsequent edge data is "12" or longer or "−12" or shorter is determined. If YES, the process proceeds to step S236, while if NO, proceeds to step S241.

In step S236, setting of outline point using second preceding vector length is performed. That is, an outline point after the first smoothing is defined by a coordinate at a point on the object vector moved from the vector start point to the vector end point by the length of the second preceding vector. Thereafter, the process proceeds to step S237.

In step S237, setting of corner-end point is performed. That is, an outline point after the first smoothing is defined by a coordinate value at the end point of the object vector. Thereafter, the process returns to the routine in FIG. 60.

In step S238, setting of corner-start point is performed. That is, an outline point after the first smoothing is defined by a coordinate value at the start point of the object vector. Thereafter, the process proceeds to step S239.

In step S239, whether or not the length of the subsequent vector $|D_{i+1}|$ is "6" or shorter, i.e., the subsequent edge data is "6" or shorter and "−6" or shorter is determined. If YES, the process proceeds to step S240, while if NO, proceeds to step S237.

In step S240, setting of outline point using second succeeding vector length is performed. That is, an outline point after the first smoothing is defined by a coordinate value at a point on the object vector moved from the vector end point toward the vector start point by the length of the second succeeding vector. Thereafter, the process returns to the routine in FIG. 60.

In step S241, setting of central point is performed. That is, an outline point after the first smoothing is defined by a coordinate value at the central point of the object vector. Thereafter, the process returns to the routine in FIG. 56.

The processings in steps S236, S237, S238, S240 and S241 will be described in detail later with reference to FIGS. 75, 72, 71, 76 and 73.

Figure 63:
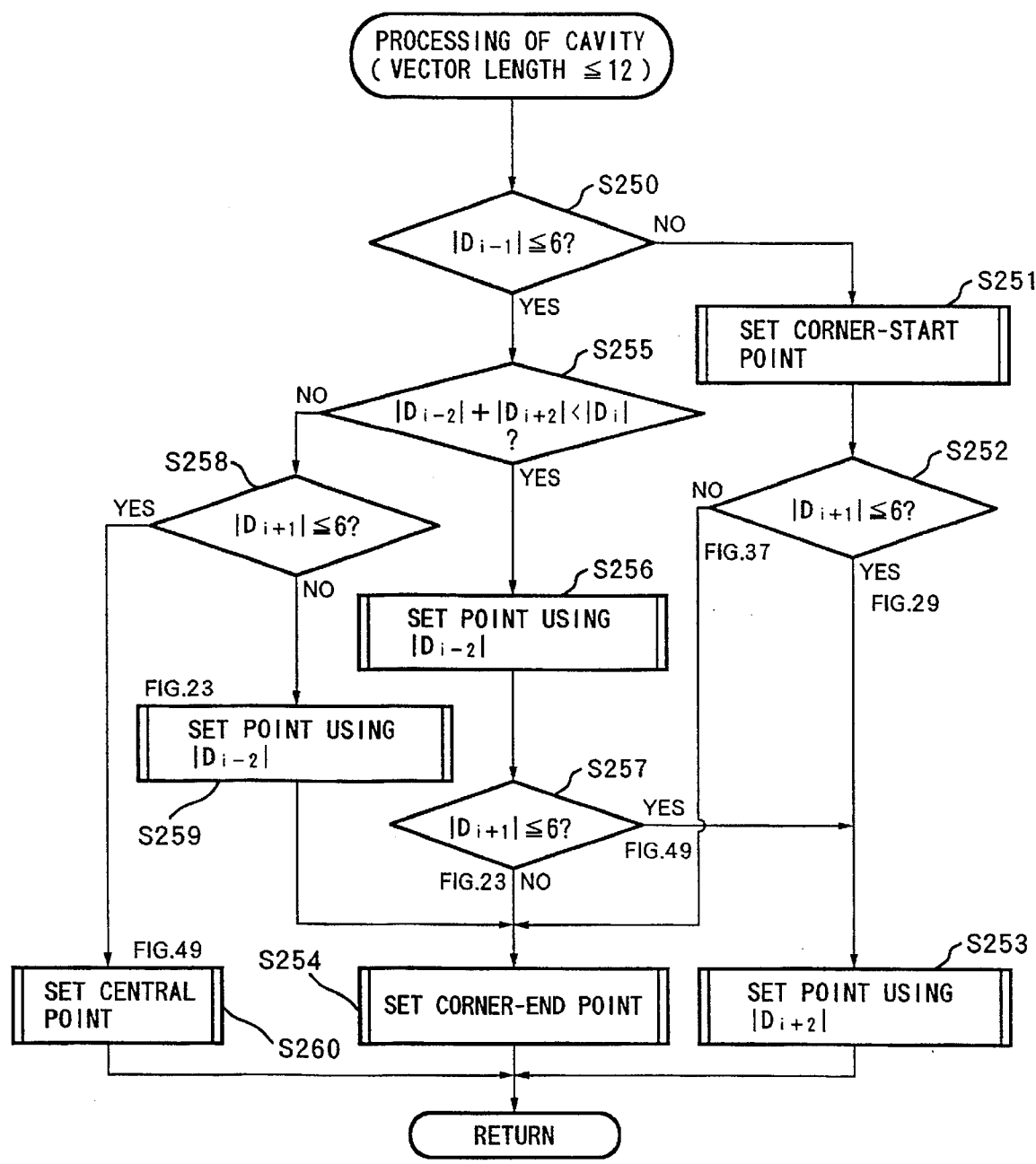

The flowchart in FIG. 63 starts when the processing of concavity is called in step S204 in FIG. 60.

In step S250, whether or not the length of the preceding vector $|D_{i-1}|$ is "6" or shorter, i.e., the preceding edge data is "6" or shorter or "−6" or shorter is determined. If YES, the process proceeds to step S255, while if NO, proceeds to step S251.

In step S251, setting of corner-start point is performed. That is, an outline point after the first smoothing is defined by a coordinate value at the start point of the object vector. Thereafter, the process proceeds to step S252.

In step S252, whether or not the length of the subsequent vector $|D_{i+1}|$ is "6" or shorter, i.e., the subsequent edge data is "6" or shorter and "−6" or shorter is determined. If YES, the process proceeds to step 253, while if NO, proceeds to step S254.

In step S253, setting of outline point using second succeeding vector length is performed. That is, an outline point after the first smoothing is defined at a point on the object vector moved from the vector end point toward the vector start point by the length of the second succeeding vector. Thereafter, the process returns to the routine in FIG. 60.

In step S254, setting of corner-end point is performed. That is, an outline point after the first smoothing is defined by a coordinate value at the end point of the object vector. Thereafter, the process returns to the routine in FIG. 60.

In step S255, whether or not the sum of the length of the second preceding vector and that of the second succeeding vector is shorter than that of the object vector is determined. If YES, the process proceeds to step S256, while if NO, proceeds to step S258.

In step S256, setting of outline point using second preceding vector length is performed. That is, an outline point is defined by a coordinate value at a point on the object vector moved from the vector start point toward the vector end point by the length of the second preceding vector. Thereafter, the process proceeds to step S257.

In step S257, whether or not the length of the subsequent vector $|D_{i+1}|$ is "6" or shorter, i.e., the subsequent edge data is "6" or shorter and "−6" or shorter is determined. If YES, the process proceeds to step S253, while if NO, proceeds to step S254.

In step S258, whether or not the length of the subsequent vector $|D_{i+1}|$ is "6" or shorter, i.e., the subsequent edge data is "6" or shorter and "−6" or shorter is determined. If YES, the process proceeds to step S260, while if NO, proceeds to step S254.

In step S259, setting of outline point using second preceding vector length is performed. That is, an outline point after the first smoothing is defined by a coordinate value at a point on the object vector moved from the vector start point toward the vector end point by the length of the second preceding vector. Thereafter, the process returns to the routine in FIG. 60.

In step S260, setting of central point is performed. That is, an outline point after the first smoothing is defined by a coordinate value at the central point of the object vector. Thereafter, the process returns to the routine in FIG. 56.

The processings in steps S251, S253, S254, S256, S259 and S260 will be described in detail later with reference to FIGS. 71, 76, 72, 75 and 73.

<Processing of Jagged Portion (FIGS. 64 to 70)>

Next, the contents of the processing in step S55 in FIG. 54 will be described with reference to FIG. 64. The flowchart in FIG. 64 starts when the processing of jagged portion is called in step S55 in FIG. 54.

In step S301, whether or not the length of the object vector is "4" or shorter, i.e., the object edge data is "4" or shorter and "−4" or shorter is determined. If YES, the process proceeds to step S302, while if NO, proceeds to step S303.

In step S302, processing in a case where the object vector is in a jagged portion and the vector length is "4" or shorter is performed. Thereafter, the process returns to the routine in FIG. 54.

In step S303, whether or not the length of the object vector is "8" or shorter, i.e., the object edge data is "8" or shorter and "−8" or shorter is determined. If YES, the process proceeds to step S305, while if NO, proceeds to step S304.

In step S304, processing in a case where the object vector is in a concavity and the vector length is "10" or longer is performed. Thereafter, the process returns to the routine in FIG. 54.

In step S305, processing in a case where the object vector is in a concavity and the vector length is "8" or shorter is performed.

The processings in step S302, S304 and S305 will be described in detail with reference to FIGS. 65A, 65B, 67 and 66.

Figure 64:
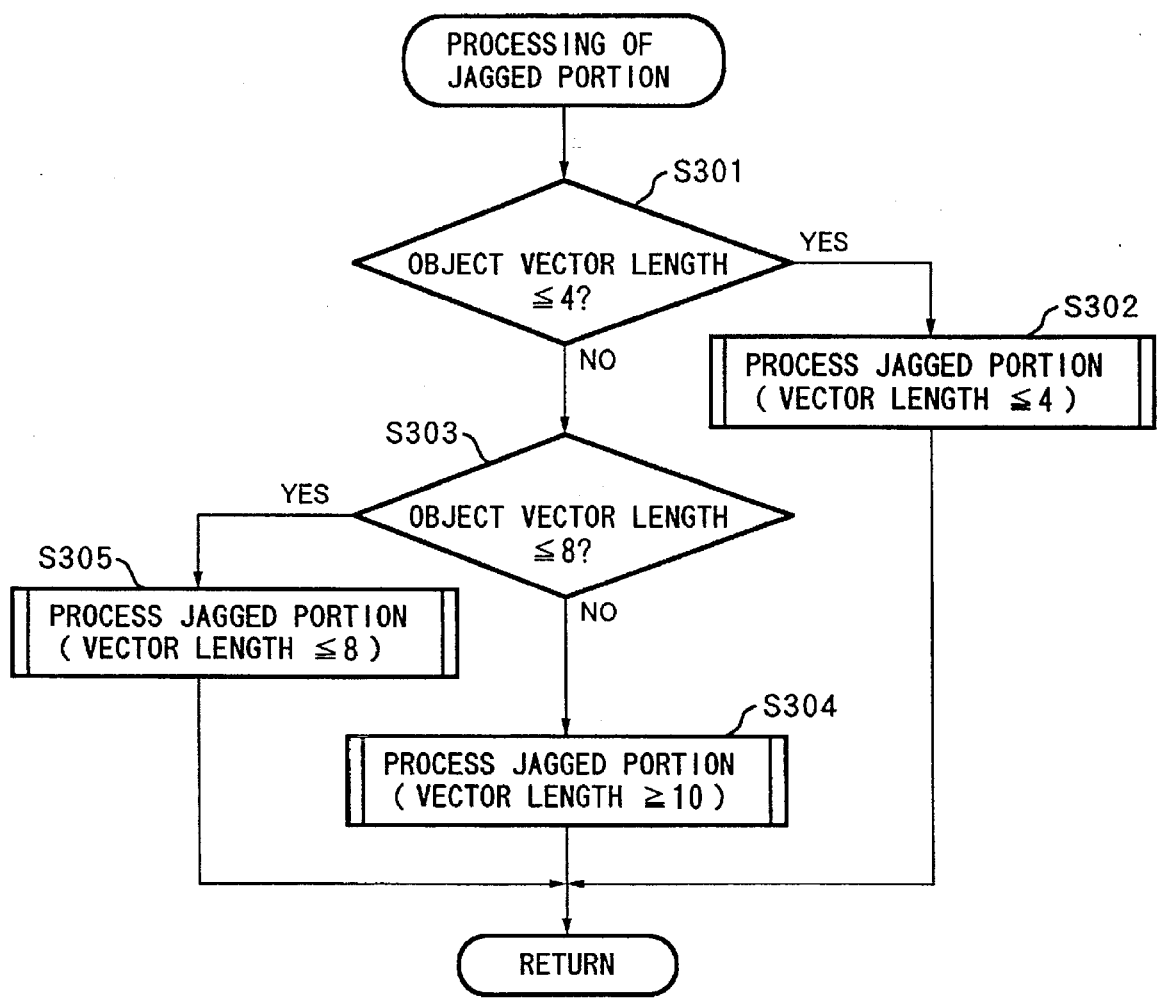
Figure 65A:
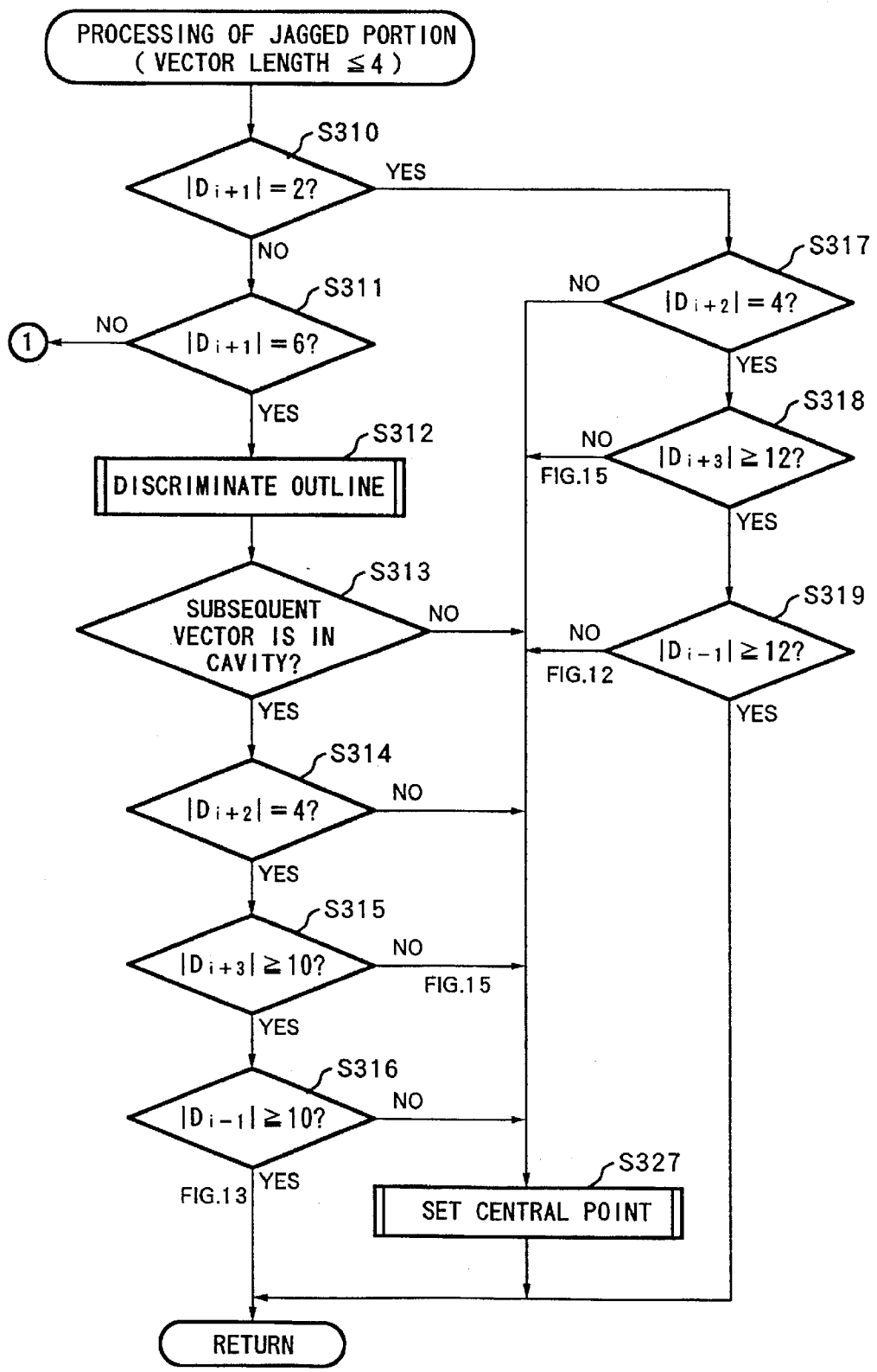
Figure 65B:
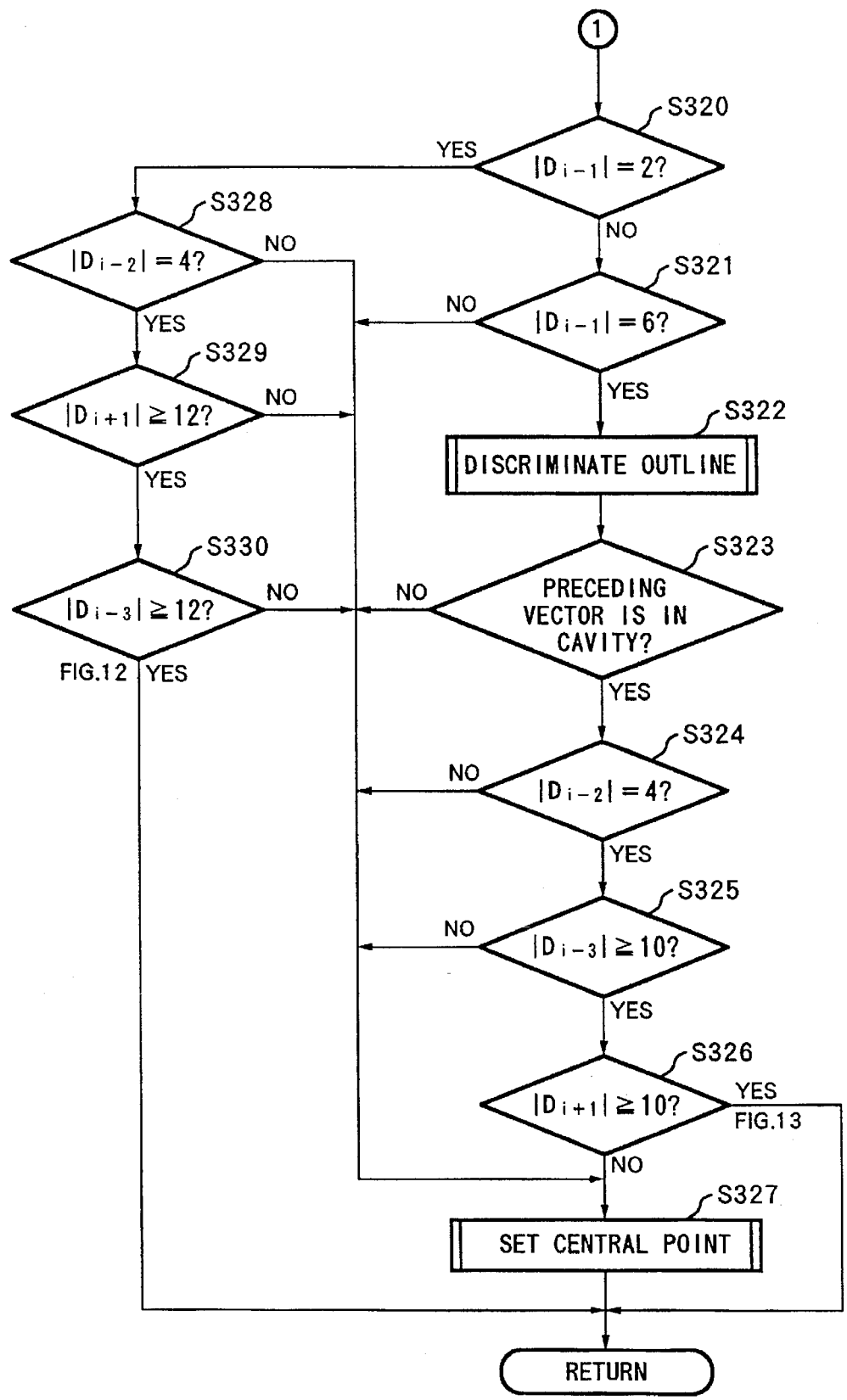

The flowchart in FIGS. 65A and 65B starts when the processing of jagged portion is called in step S302 in FIG. 64.

In step S310, whether or not the length of the subsequent vector $|D_{i+1}|$ is "2", i.e., the preceding edge data is "2" or "−2" is determined. If YES, the process proceeds to step S317, while if NO, proceeds to step S311.

In step S311, whether or not the length of the subsequent vector $|D_{i+1}|$ is "6", i.e., the subsequent edge data is "6" or "−6" is determined. If YES, the process proceeds to step S312, while if NO, proceeds to step S320.

In step S312, discrimination of outline in which the subsequent vector resides is performed. That is, whether the subsequent vector is in a convexity, a concavity or a jagged portion is determined. Thereafter, the process proceeds to step S313.

In step S313, whether or not the subsequent vector is in a concavity is determined. If YES, the process proceeds to step S314, while if NO, proceeds to step S327.

In step S314, whether or not the length of the second succeeding vector $|D_{i+2}|$ is "4", i.e., the second succeeding edge data is "4" or "−4" is determined. If YES, the process proceeds to step S315, while if NO, proceeds to step S327.

In step S315, whether or not the length of the three-vector subsequent vector $|D_{i+3}|$ is "10" or longer, i.e., the three-vector subsequent edge data is "10" or longer or "−10" or longer is determined. If YES, the process proceeds to step S316, while if NO, proceeds to step S327.

In step S316, whether or not the length of the preceding vector $|D_{i-1}|$ is "10" or longer, i.e., the preceding edge data is "10" or longer or "−10" or longer is determined. If YES, the process returns to the routine in FIG. 64, while if NO, proceeds to step S327.

In step S317, whether or not the length of the second succeeding vector $|D_{i+2}|$ is "4", i.e., the second succeeding edge data is "4" or "−4" is determined. If YES, the process proceeds to step S318, while if NO, proceeds to step S327.

In step S318, whether or not the length of the three-vector subsequent vector $|D_{i+3}|$ is "12" or shorter, i.e., the three-vector subsequent edge data is "12" or shorter and "−12" or shorter is determined. If YES, the process proceeds to step S319, while if NO, proceeds to step S327.

In step S319, whether or not the length of the preceding vector $|D_{i-1}|$ is "12" or longer, i.e., the preceding edge data is "12" or longer or "−12" or longer is determined. If YES, the process returns to the routine in FIG. 64, while if NO, proceeds to step S327.

In step S320, whether or not the length of the preceding vector $|D_{i-1}|$ is "2", i.e., the preceding edge data is "2" or "−2" is determined. If YES, the process proceeds to step S328, while if NO, proceeds to step S321.

In step S321, whether or not the length of the preceding vector $|D_{i-1}|$ is "6", i.e., the preceding vector dada is "6" or "−6" is determined. If YES, the process proceeds to step S322, while if NO, proceeds to step S327.

In step S322, discrimination of outline in which the preceding vector resides is performed. That is, whether the preceding vector is in a convexity, a concavity or a jagged portion is determined. Thereafter, the process proceeds to step S323.

In step S323, whether or not the preceding vector is in a concavity is determined. If YES, the process proceeds to step S324, while if NO, proceeds to step S327.

In step S324, whether or not the length of the second preceding vector $|D_{i-2}|$ is "4", i.e., the second preceding edge data is "4" or "−4" is determined. If YES, the process proceeds to step S325, while if NO, proceeds to step S327.

In step S325, whether or not the length of the three-vector preceding vector $|D_{i-3}|$ is "10" or longer, i.e., the three-vector preceding edge data is "10" or longer or "−10" or longer is determined. If YES, the process proceeds to step S326, while if NO, proceeds to step S327.

In step S326, whether or not the length of the subsequent vector $|D_{i+1}|$ is "10" or longer, i.e., the subsequent edge data is "10" or longer or "−10" or longer is determined. If YES, the process returns to the routine in FIG. 64, while if NO, proceeds to step S327.

In step S327, setting of central point is performed. That is, an outline point after the first smoothing is defined by a coordinate value at the central point of the object vector. Thereafter, the process returns to the routine in FIG. 64.

In step S328, whether or not the length of the second preceding vector $|D_{i-2}|$ is "4", i.e., the second preceding edge data is "4" or "−4" is determined. If YES, the process proceeds to step S329, while if NO, proceeds to step S327.

In step S329, whether or not the length of the subsequent vector $|D_{i+1}|$ is "12" or longer, i.e., the subsequent edge data is "12" or longer or "−12" or longer is determined. If YES, the process proceeds to step S330, while if NO, proceeds to step S327.

In step S330, whether or not the length of the three-vector preceding vector $|D_{i-3}|$ is "12" or longer, i.e., the three-vector preceding edge data is "12" or longer or "−12" or longer is determined. If YES, the process returns to the routine in FIG. 64, while if NO, proceeds to step S327.

Figure 73:
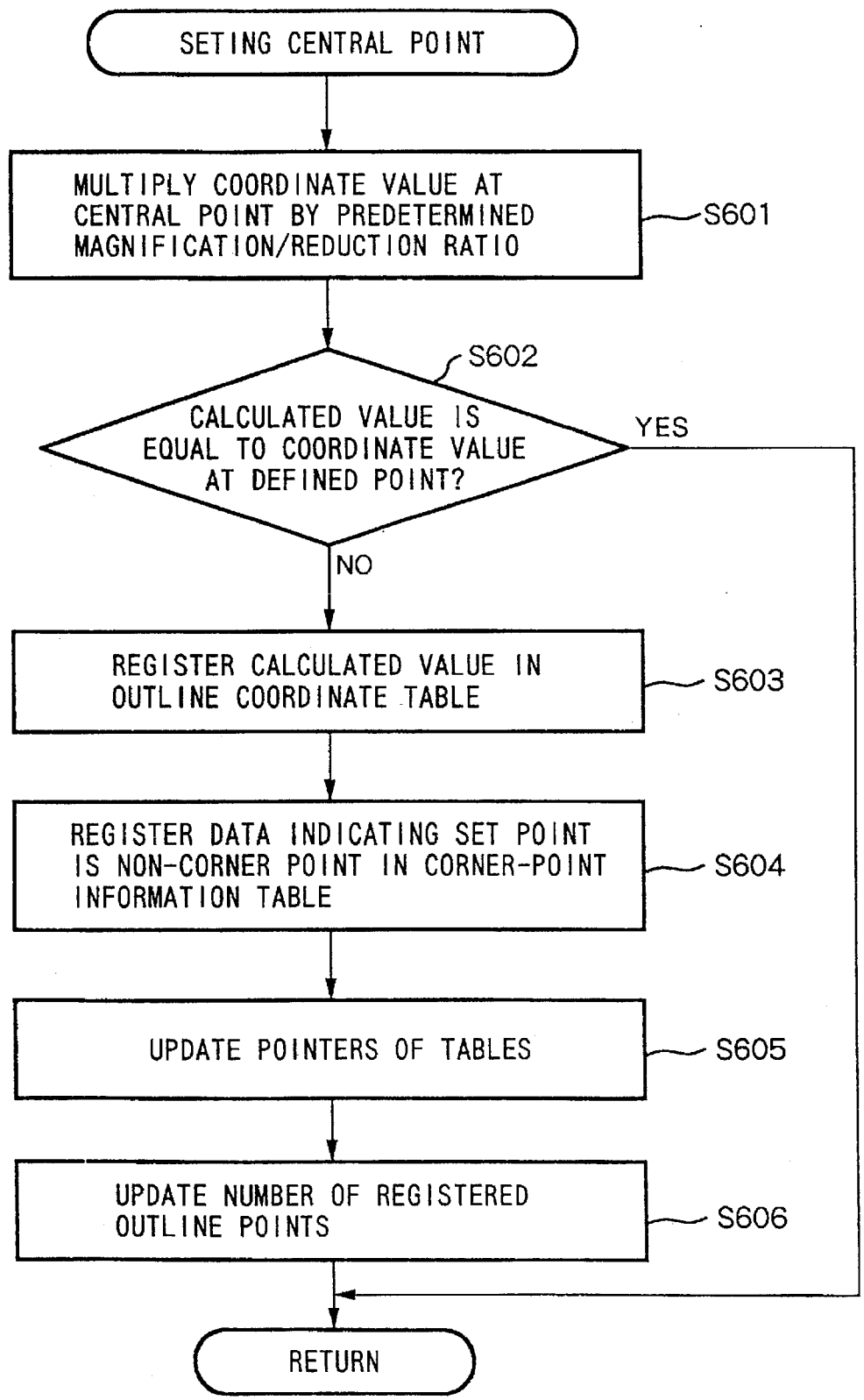

The setting of central point in step S327 will be described in detail later with reference to FIG. 73.

Figure 66:
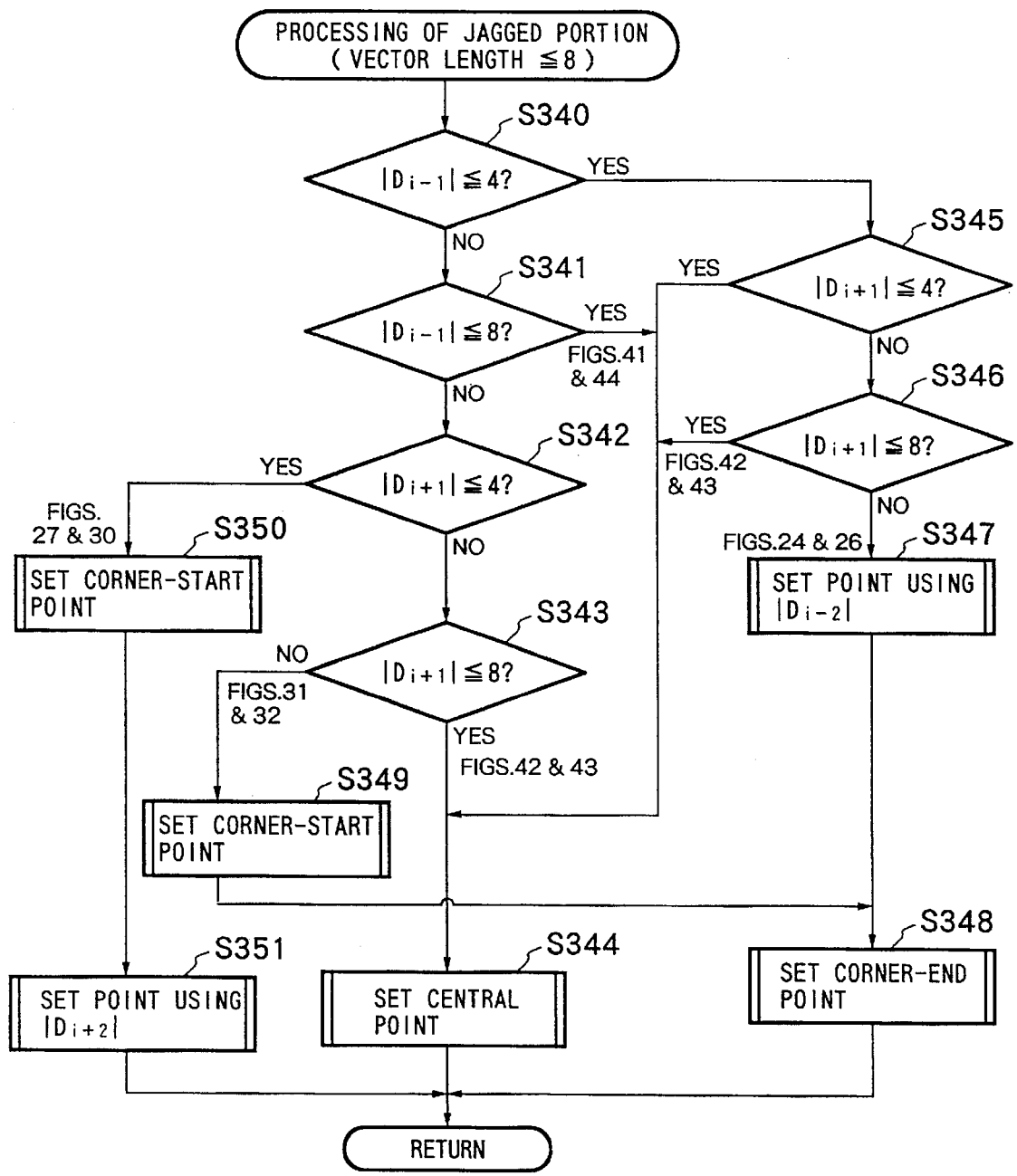

The flowchart in FIG. 66 starts when the processing of jagged portion is called in step S305 in FIG. 64.

In step S340, whether or not the length of the preceding vector $|D_{i-1}|$ is "4" or shorter, i.e., the preceding edge data is "4" or shorter and "−4" or shorter is determined. If YES, the process proceeds to step S345, while if NO, proceeds to step S341.

In step S341, whether or not the length of the preceding vector $|D_{i-1}|$ is "8" or shorter, i.e., the preceding edge data is "8" or shorter and "−8" or shorter is determined. If YES, the process proceeds to step S344, while if NO, proceeds to step S342.

In step S342, whether or not the length of the subsequent vector $|D_{i+1}|$ is "4 or shorter, i.e., the subsequent edge data is "4" or shorter and "−4" or shorter is determined. If YES, the process proceeds to step S350, while if NO, proceeds to step S343.

In step S343, whether or not the length of the subsequent vector $|D_{i+1}|$ is "8" or shorter, i.e., the subsequent edge data is "8" or shorter and "−8" or shorter is determined. If YES, the process proceeds to step S344, while if NO, proceeds to step S349.

In step S344, setting of central point is performed. That is, an outline point after the first smoothing is defined by a coordinate value at the central point of the object vector. Thereafter, the process returns to the routine in FIG. 64.

In step S345, whether or not the length of the subsequent vector $|D_{i+1}|$ is "4" or shorter, i.e., the subsequent edge data is "4" or shorter and "−4" or shorter is determined. If YES, the process proceeds to step S344, while if NO, proceeds to step S346.

In step S346, whether or not the length of the subsequent vector $|D_{i+1}|$ is "8" or shorter, i.e., the subsequent edge data is "8" or shorter and "−8" or shorter is determined. If YES, the process proceeds to step S344, while if NO, proceeds to step S347.

In step S347, setting of outline point using second preceding vector length is performed. That is, an outline point after the first smoothing is defined by a coordinate value at a point on the object vector moved from the vector start point toward the vector end point by the length of the two-preceding vector. Thereafter, the process proceeds to step S348.

In step S348, setting of corner-end point is performed. That is, an outline point after the first smoothing is defined by a coordinate value at the end point of the object vector. Thereafter, the process returns to the routine in FIG. 64.

In step S349, setting of corner-start point is performed. That is, an outline point after the first smoothing is defined by a coordinate value at the start point of the object vector. Thereafter, the process proceeds to step S348.

In step S350, setting of corner-start point is performed. That is, an outline point after the first smoothing is defined by a coordinate value at the start point of the object vector. Thereafter, the process proceeds to step S351.

In step S351, setting of outline point using second succeeding vector length is performed. That is, an outline point after the first smoothing is defined by a coordinate value at a point on the object vector moved from the vector end point toward the vector start point by the length of the second succeeding vector. Thereafter, the process returns to the routine in FIG. 64.

The processings in steps S347, S348, S349, S350, S351 and S344 will be described in detail later with reference to FIGS. 75, 72, 71, 76 and 73.

Figure 67:
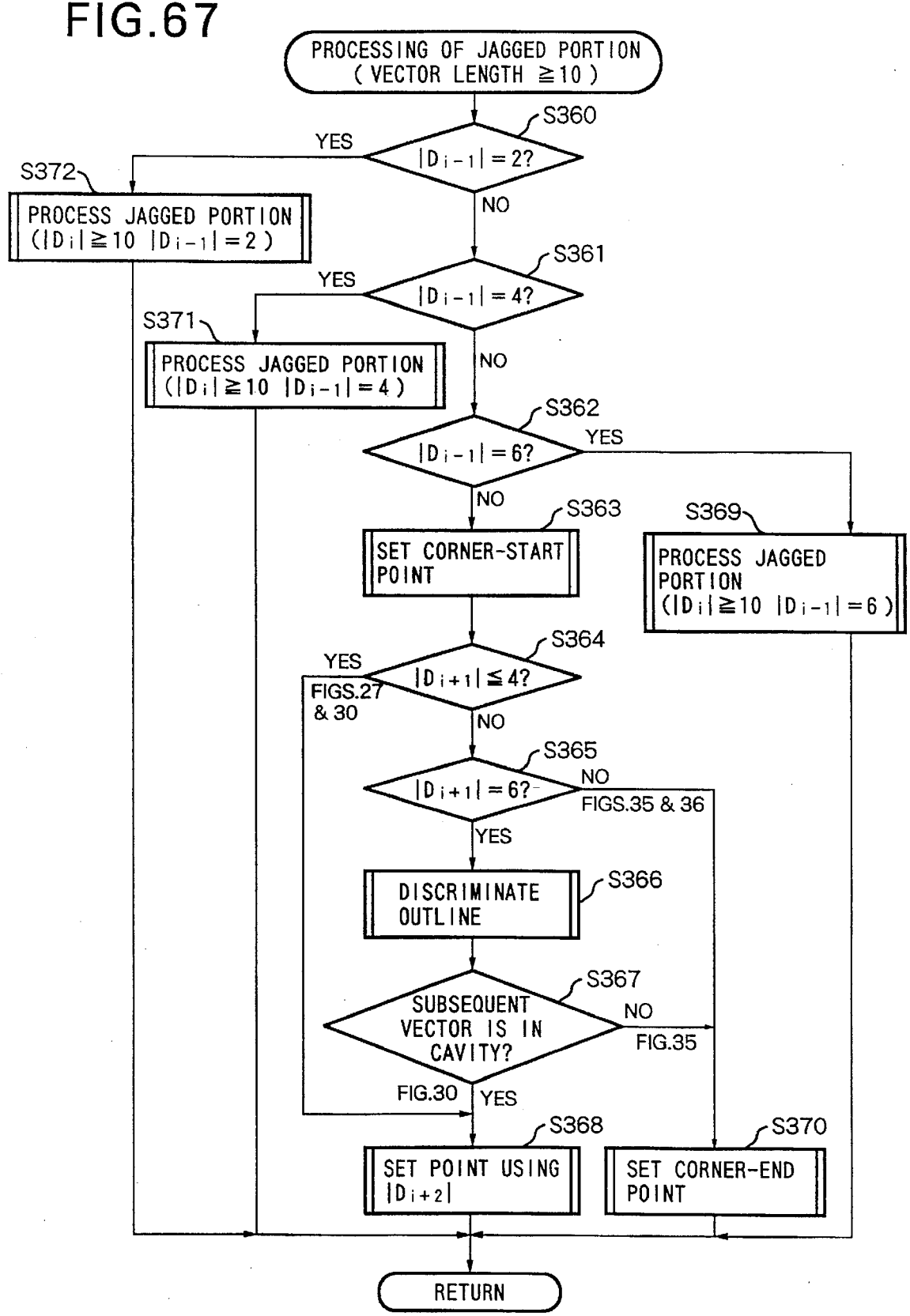

The flowchart in FIG. 67 starts when the processing of jagged portion is called in step S304 in FIG. 64.

In step S360, whether or not the length of the preceding vector $|D_{i-1}|$ is "2", i.e., the preceding edge data is "2" or "−2" is determined. If YES, the process proceeds to step S372, while if NO, proceeds to step S361.

In step S361, whether or not the length of the preceding vector $|D_{i-1}|$ is "4", i.e., the preceding edge data is "4" or "−4" is determined. If YES, the process proceeds to step S371, while if NO, proceeds to step S362.

In step S362, whether or not the length of the preceding vector $|D_{i-1}|$ is "6", i.e., the preceding edge data is "6" or "−6" is determined. If YES, the process proceeds to step S369, while if NO, proceeds to step S363.

In step S363, setting of central point is performed. That is, an outline point after the first smoothing is defined by a coordinate value at the central point of the object vector. Thereafter, the process proceeds to step S364.

In step S364, whether or not the length of the subsequent vector $|D_{i+1}|$ is "4" or shorter, i.e., the subsequent edge data is "4" or shorter and "−4" or shorter is determined. If YES, the process proceeds to step S368, while if NO, proceeds to step S365.

In step S365, whether or not the length of the subsequent vector $|D_{i+1}|$ is "6", i.e., the subsequent edge data is "6" or "−6" is determined. If YES, the process proceeds to step S366, while if NO, proceeds to step S370.

In step S366, discrimination of outline in which the subsequent vector resides is performed. That is, whether the subsequent vector is in a convexity, a concavity or a jagged portion is determined. Thereafter, the process proceeds to step S367.

In step S367, whether or not the subsequent vector is in a concavity is determined. If YES, the process proceeds to step S368, while if NO, proceeds to step S370.

In step S368, setting of outline point using second succeeding vector length is performed. That is, an outline point is defined by a coordinate value at a point on the object vector moved from the vector end point toward the vector start point by the length of the second succeeding vector. Thereafter, the process returns to the routine in FIG. 64.

In step S369, processing in a case where the object vector is in a jagged portion and the vector length is "10" or longer is performed. Thereafter, the process returns to the routine in FIG. 64.

In step S370, setting of corner-end point is performed. That is, an outline point is defined by a coordinate value at the end point of the object vector. Thereafter, the process returns to the routine in FIG. 64.

In step S371, processing in a case where the object vector is in a jagged portion, the vector length is "10" or longer and the length of the preceding vector is "4" is performed. Thereafter, the process returns to the routine in FIG. 64.

In step S372, processing in a case where the object vector is in a jagged portion, the vector length is "10" or longer and the length of the preceding vector is "2" is performed. Thereafter, the process returns to the routine in FIG. 64.

The processings in steps S363, S368, S370, S369, S371 and S372 will be described in detail later with reference to FIGS. 71, 76, 72, 70, 69 and 68.

Figure 68:
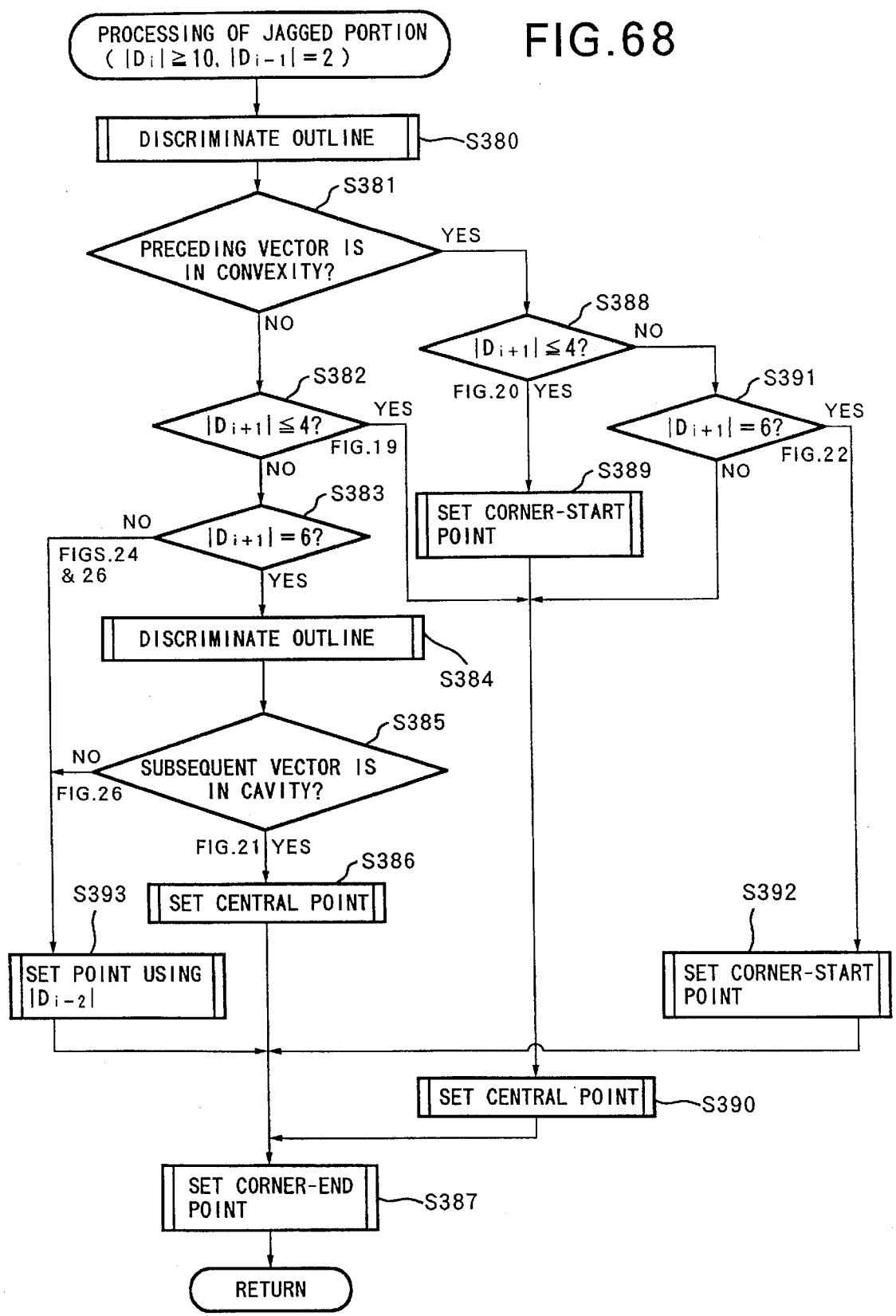

The flowchart in FIG. 68 starts when the processing of jagged portion is called in step S372 in FIG. 67.

In step S380, discrimination of outline in which the preceding vector resides is performed. That is, whether the preceding vector is in a convexity, a concavity or a jagged portion is determined. Then the process proceeds to step S381.

In step S381, whether or not the preceding vector is in a convexity. If YES, the process proceeds to step S388, while if NO, proceeds to S382.

In step S382, whether or not the length of the subsequent vector $|D_{i+1}|$ is "4" or shorter, i.e., the subsequent vector length is "4" or shorter and "−4" or shorter is determined. If YES, the process proceeds to step S390, while if NO, proceeds to step S383.

In step S383, whether or not the length of the subsequent vector is "6", i.e., the subsequent edge data is "6" or "−6" is determined. If YES, the process proceeds to step S384, while if NO, proceeds to step S393.

In step S384, discrimination of outline in which the subsequent vector resides is performed. That is, whether or not the subsequent vector is in a convexity, a concavity or a jagged portion is determined. Then the process proceeds to step S385.

In step S385, whether or not the subsequent vector is in a concavity is determined. If YES, the process proceeds to step S386, while if NO, proceeds to step S393.

In step S386, setting of central point is performed. That is, an outline point after the first smoothing is defined by a coordinate value at the central point of the object vector. Thereafter, the process proceeds to step S387.

In step S387, setting of corner-end point is performed. That is, an outline point after the first smoothing is defined by a coordinate value at the end point of the object vector. Thereafter, the process returns to the routine in FIG. 67.

In step S388, whether or not the length of the subsequent vector $|D_{i+1}|$ is "4" or shorter, i.e., the subsequent edge data is "4" or shorter and "−4" or shorter is determined. If YES, the process proceeds to step S389, while if NO, proceeds to step S391.

In step S389, setting of corner-start point is performed. That is, an outline point after the first smoothing is defined by a coordinate value at the start point of the object vector. Thereafter, the process proceeds to step S390.

In step S390, setting of central point is performed. That is, an outline point after the first smoothing is defined by a coordinate value at the central point of the object vector. thereafter, the process returns to the routine in FIG. 67.

In step S391, whether or not the length of the subsequent vector $|D_{i+1}|$ is "6", i.e., the subsequent edge data is "6" or "−6" is determined. If YES, the process proceeds to step S392, while if NO, proceeds to step S390.

In step S392, setting of corner-start point is performed. That is, an outline point after the first smoothing is defined by a coordinate value at the start point of the object vector. Thereafter, the process proceeds to step S387.

In step S393, setting of point using second preceding vector length is performed. That is, an outline point after the first smoothing is defined by a coordinate value at a point on the object vector moved from the vector start point toward the vector end point by the length of the second preceding vector. Thereafter, the process proceeds to step S387.

The processings in steps S387 and 390 will be described in detail later with reference to FIG. 73. The processings in steps S389 and 392 will be described in detail later with reference to FIG. 71. The processing in step S387 will be described in detail later with reference to FIG. 72.

Figure 69:
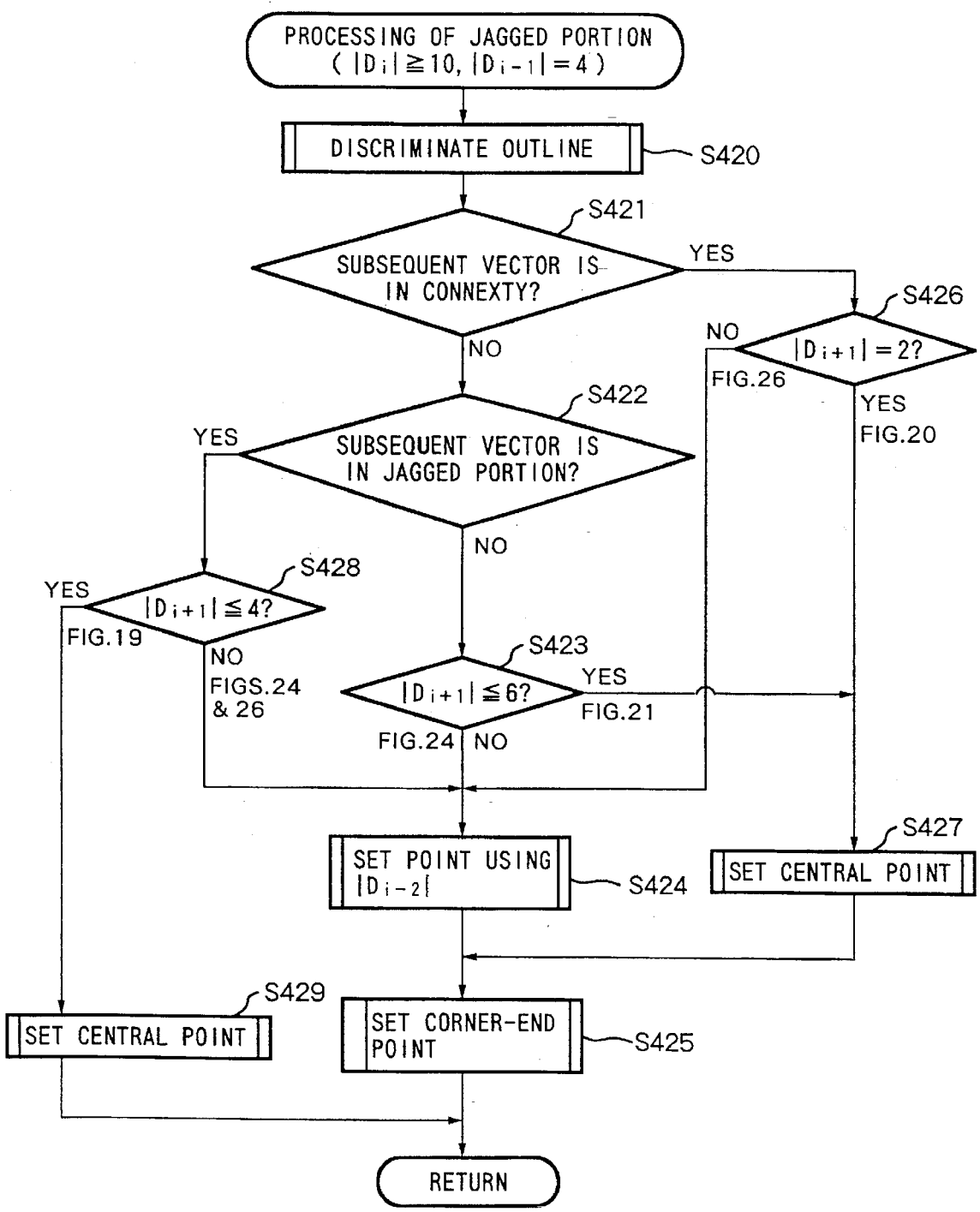

The flowchart in FIG. 69 starts when the processing of jagged portion is called in step S371 in FIG. 67.

In step S420, discrimination of outline in which the subsequent vector resides is performed. That is, whether the subsequent vector is in a convexity, a concavity or a jagged portion is determined. Then the process proceeds to step S421.

In step S421, whether or not the subsequent vector is in a convexity is determined. If YES, the process proceeds to step S426, while if NO, proceeds to step S422.

In step S422, whether or not the subsequent vector is in a jagged portion is determined. If YES, the process proceeds to step S428, while if NO, proceeds to step S423.

In step S423, whether or not the length of the subsequent vector is "6" or shorter, i.e., the subsequent edge data is "6" or shorter and "−6" or shorter is determined. If YES, the process proceeds to step S427, while if NO, proceeds to step S424.

In step S424, setting of point using second preceding vector is performed. That is, an outline point after the first smoothing is defined by a coordinate value at a point on the object vector moved from the vector start point toward the vector end point by the length of the second preceding vector. Thereafter, the process proceeds to step S425.

In step S425, setting of corner-end point is performed. That is, an outline point is defined by a coordinate value at the end point of the object vector. thereafter, the process returns to the routine in FIG. 67.

In step S426, whether or not the length of the subsequent vector is "2", i.e., the subsequent edge data is "2" or "−2" is determined. If YES, the process proceeds to step S427, while if NO, proceeds to step S424.

In step S427, setting of central point is performed. That is, an outline point after the first smoothing is defined by a coordinate value at the central point of the object vector. Thereafter, the process proceeds to step S425.

In step S428, whether or not the length of the subsequent vector is "4" or shorter, i.e., the subsequent edge data is "4" or shorter and "−4" or shorter is determined. If YES, the process proceeds to step S429, while if NO, proceeds to step S424.

In step S429, setting of central point is performed. That is, an outline point after the first smoothing is defined by a coordinate value at the central point of the object vector. Thereafter, the process returns to the routine in FIG. 67.

The processings in steps S427 and 429 will be described in detail later with reference to FIG. 73. The processing in step S425 will be described in detail later with reference to FIG. 72. The processing in step S424 will be described in detail later with reference to FIG. 75.

Figure 70:
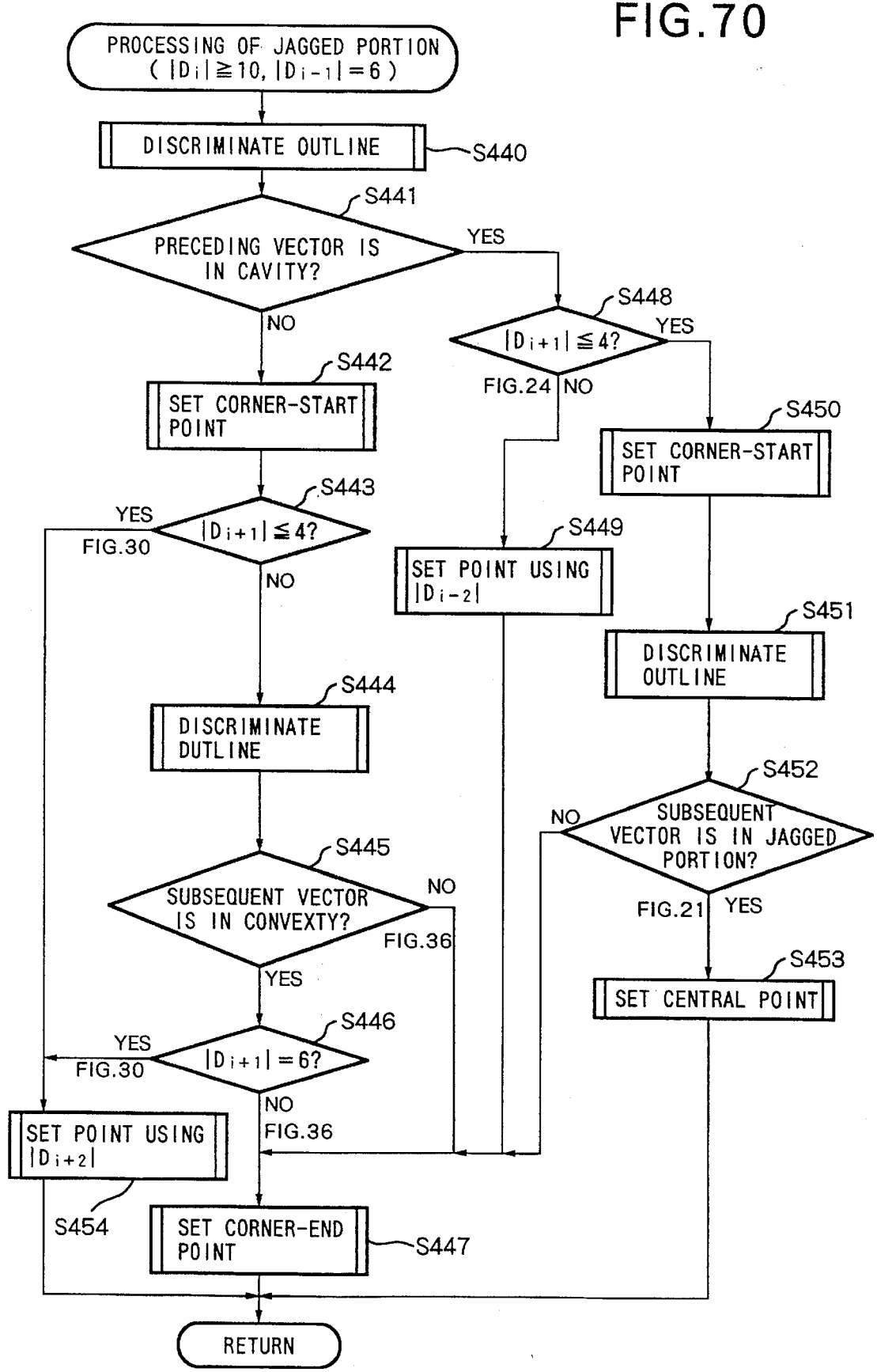

The flowchart in FIG. 70 starts when the processing of jagged portion is called in step S369 in FIG. 67.

In step S440, discrimination of outline in which the preceding vector resides is performed. That is, whether the preceding vector is in a convexity, a concavity or a jagged portion is determined. Then the process proceeds to step S441.

In step S441, whether or not the preceding vector is in a convexity is determined. If YES, the process proceeds to step S448, while if NO, proceeds to step S442.

In step S442, setting of corner-start point is performed. That is, an outline point after the first smoothing is defined by a coordinate value at the start point of the object vector. Thereafter, the process proceeds to step S443.

In step S443, whether or not the length of the subsequent vector $|D_{i+1}|$ is "4" or shorter, i.e., the subsequent edge data is "4" or shorter and "−4" or shorter is determined. If YES, the process proceeds to step S454, while if NO, proceeds to step S444.

In step S444, discrimination of outline in which the subsequent vector resides is performed. That is, whether the subsequent vector is in a convexity, a concavity or a jagged portion is determined. Then the process proceeds to step S445.

In step S445, whether or not the subsequent vector is in a concavity is determined. If YES, the process proceeds to step S446, while if NO, proceeds to step S447.

In step S446, whether or not the length of the subsequent vector $|D_{i+1}|$ is "6", i.e., the subsequent edge data is "6" or "−6" is determined. If YES, the process proceeds to step S454, while if NO, proceeds to step S447.

In step S447, setting of corner-end point is performed. That is, an outline point after the first smoothing is defined by a coordinate value at the end point of the object vector. Thereafter, the process returns to the routine in FIG. 67.

In step S448, whether or not the length of the subsequent vector $|D_{i+1}|$ is "4" or shorter, i.e., the subsequent edge data is "4" or shorter and "−4" or shorter is determined. If YES, the process proceeds to step S450, while if NO, proceeds to step S449.

In step S449, setting of outline point using second preceding vector length is performed. That is, an outline point after the first smoothing is defined by a coordinate value at a point on the object vector moved from the vector start point toward the vector end point by the length of the second succeeding vector. Thereafter, the process proceeds to step S447.

In step S450, setting of corner-start point is performed. That is, an outline point after the first smoothing is defined by a coordinate value at the start point of the object vector. Thereafter, the process proceeds to step S451.

In step S451, discrimination of outline in which the subsequent vector resides is performed. That is, whether the subsequent vector is in a convexity, a concavity or a jagged portion is determined. Then the process proceeds to step S452.

In step S452, whether or not the subsequent vector is in a jagged portion is determined. If YES, the process proceeds to step S453, while if NO, proceeds to step S447.

In step S453, setting of central point is performed. That is, an outline point after the first smoothing is defined by a coordinate value at the central point of the object vector. Thereafter, the process returns to the routine in FIG. 67.

In step S454, setting of point using second succeeding vector is performed. That is, an outline point after the first smoothing is defined by a coordinate value at a point on the object vector moved from the vector end point toward the vector start point by the length of the second succeeding vector. Thereafter, the process returns to the routine in FIG. 67.

The processing in step S453 will be described in detail later with reference to FIG. 73. The processings in steps S442 and 450 will be described in detail later with reference to FIG. 71. The processing in step S447 will be described in detail later with reference to FIG. 72. The processing in step S454 will be described in detail later with reference to FIG. 76.

Figure 55:
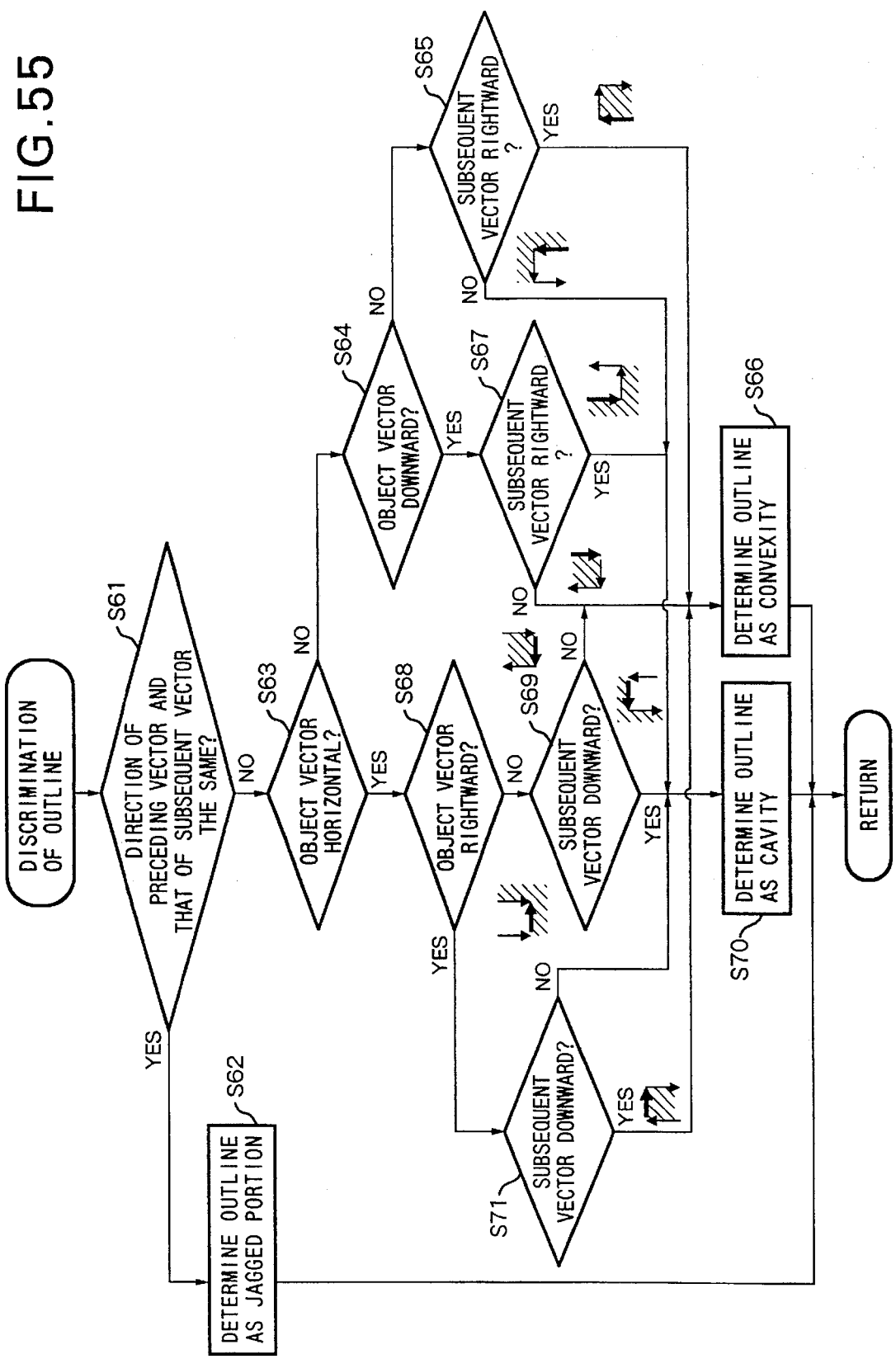

It should be noted that the discrimination of outline in this flowchart can be executed in accordance with the outline discrimination in the flowchart in FIG. 55, by replacing the subsequent vector with the second succeeding vector; the object vector, with the subsequent vector; and the preceding vector, with the object vector.

<Setting of Corner Point (FIGS. 71 and 72)>

Figure 71:
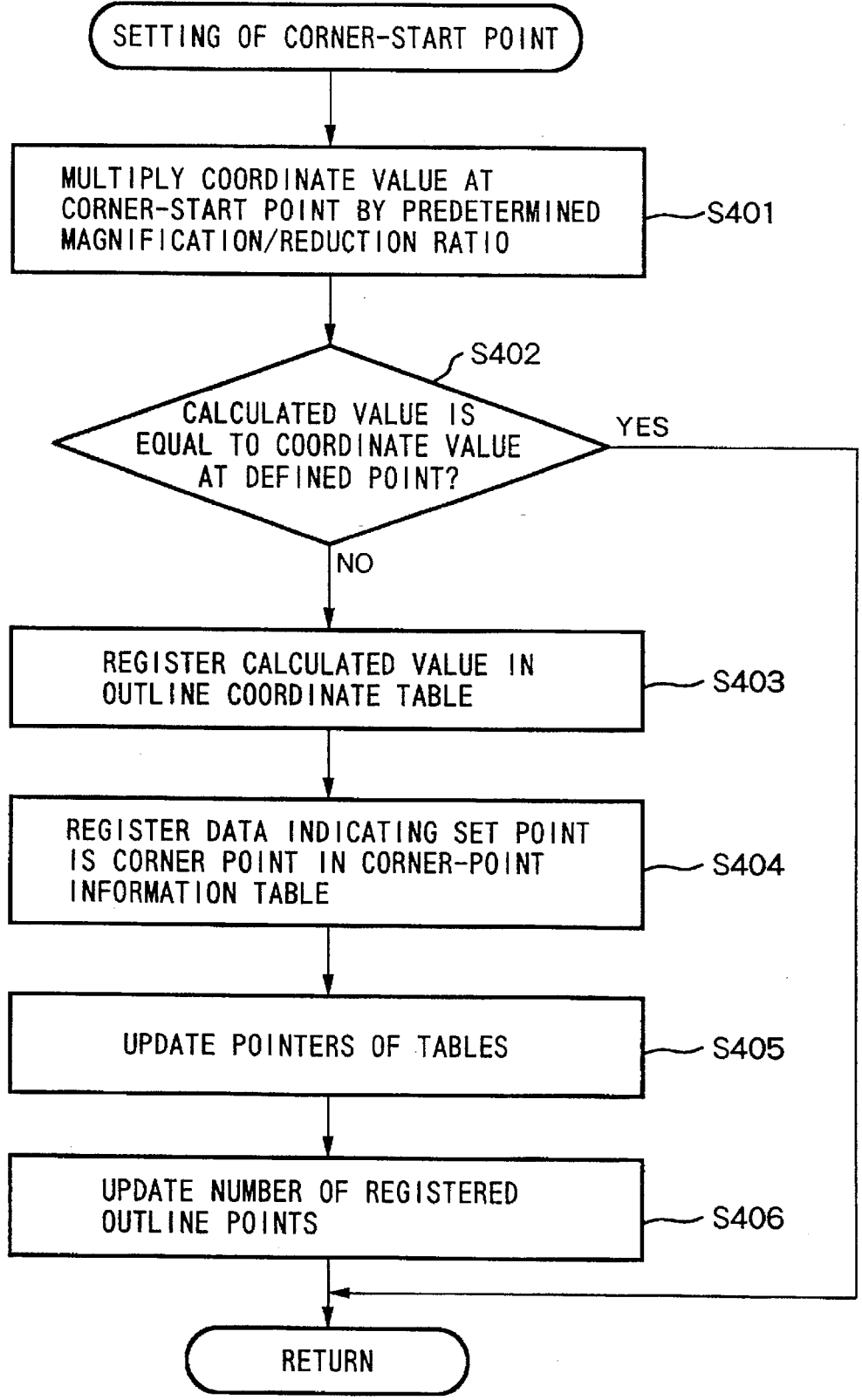

Next, the setting of corner-start point will be described with reference to FIG. 71.

In step S401, a coordinate value (x-coordinate and y-coordinate) at the start point of the object vector, multiplied by a predetermined magnification/reduction ratio (in the respective main-scanning and sub-scanning directions) attained from the magnification/reduction ratio setting unit 31, is calculated.

In step S402, whether or not the calculated coordinate value corresponds to the coordinate value defined before the multiplication is determined. If YES, the process returns to the routine in FIG. 70, since the point is already defined as an outline point. If NO, the process proceeds to step S403.

In step S403, the calculated coordinate value is registered in an area for an outline coordinate data after the first smoothing assigned in the working memory 76.

In step S404, data indicating that the outline point is a corner point is registered in an additional data area. These data areas are assigned as continuous areas having sufficient data space and are managed by pointers.

In step S405, to set the pointers for the outline point coordinate data area and the additional data area to positions for the next data, the address values are incremented by one. The data areas assigned to the coarse-outline loops, having the number of outline points after the first smoothing, registered during processing have been initialized in step S21 in FIG. 51. These data areas include an area for storing current processed-outline point data with respect to a currently processed outline loop.

In step S406, this data indicative of the number of processed-outline points of the current loop is incremented by one. Thereafter, the process returns to the routine in FIG. 70.

Figure 72:
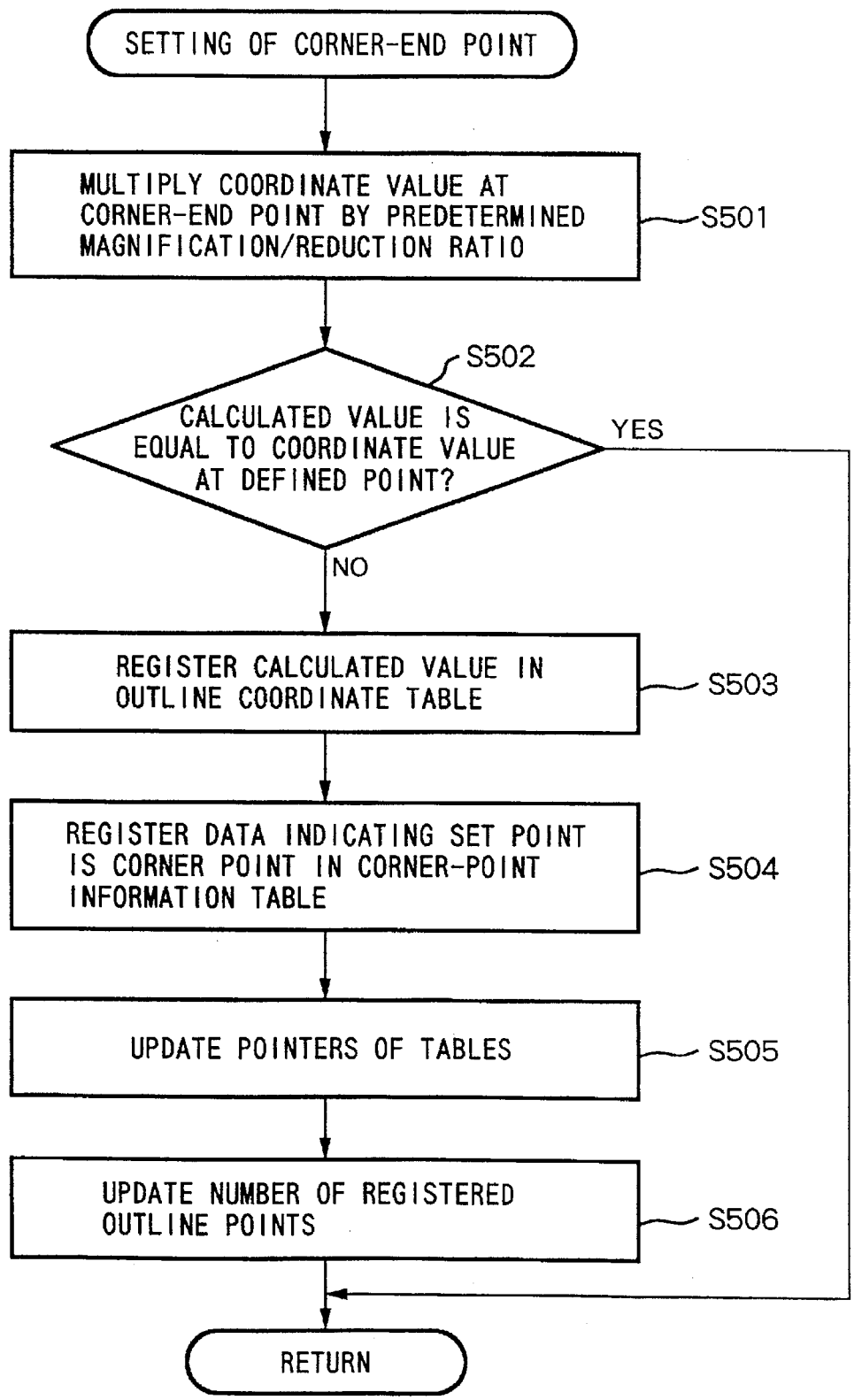

Next, the setting of corner-end point will be described with reference to FIG. 72. The flowchart in FIG. 72 is identical to FIG. 71, and steps having numerals in five hundreds in FIG. 72 correspond to those having numerals in four hundreds in FIG. 71. Difference is that step S501 performs magnification/reduction on a coordinate value at the end point of the object vector. Therefore, the explanation of this processing will be omitted.

<Setting of Central Point (FIG. 73)>

The setting of central point will be described with reference to FIG. 73. Also, the flowchart in FIG. 73 is identical to FIG. 71, and steps having numerals in six hundreds in FIG. 72 correspond to those having numerals in four hundreds in FIG. 71. Note that steps S601 and S604 are different from steps S401 and S404. Therefore, the explanation of steps other than steps S601 and 604 will be omitted.

In step S601, a coordinate value at the central point of the object vector is multiplied by the predetermined magnification/reduction ratio from the ratio setting unit 31. In step S604, data indicating that the outline point is a non-corner point is registered in a corner-point information table.

<Deletion of Series of Notches (FIG. 74)>

Figure 74:
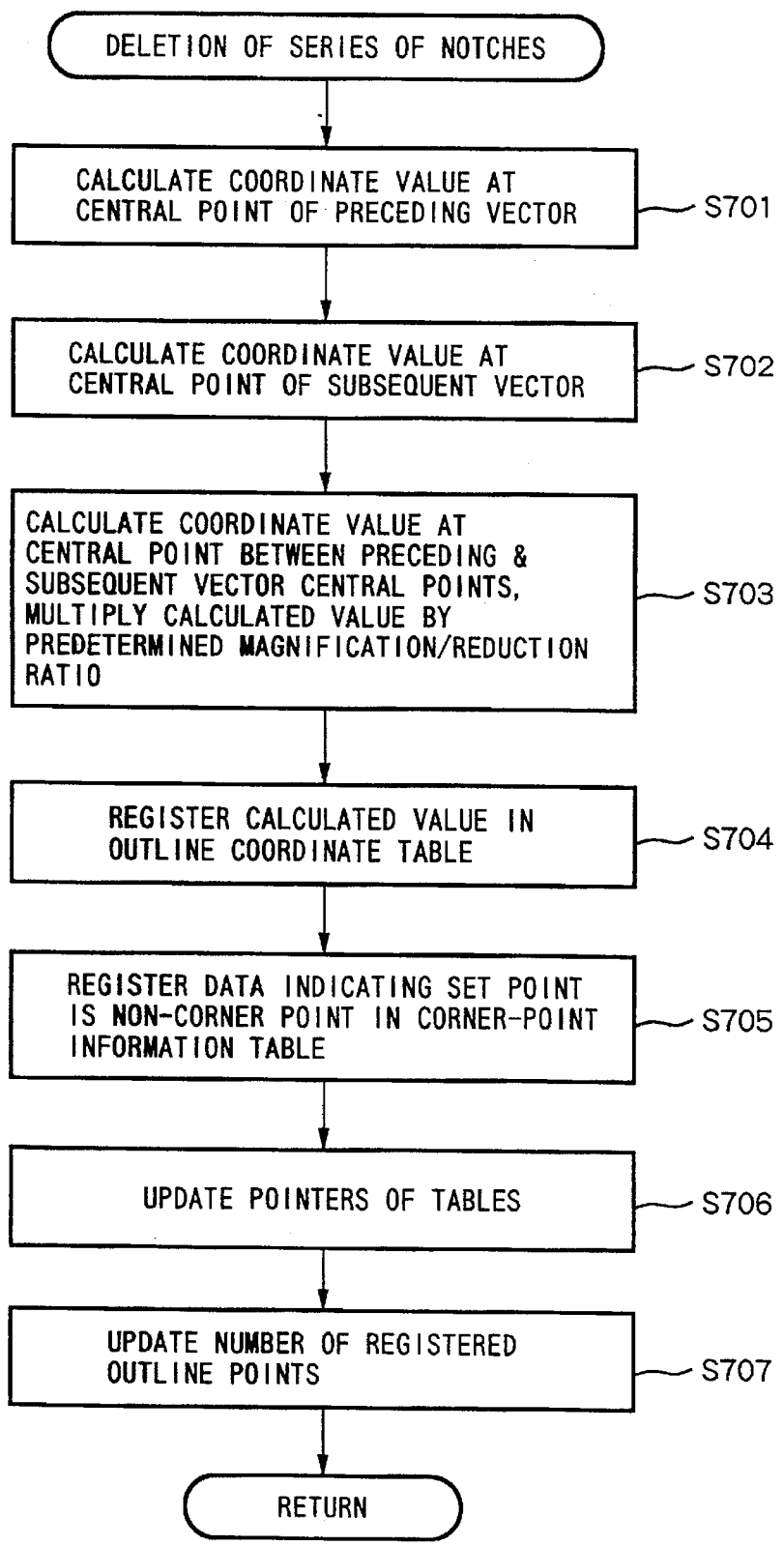

Next, the deletion of series of notches will be described with reference to FIG. 74.

In step S701, a coordinate value at the central point on the preceding vector between is calculated. In step S702, a coordinate value at the central point of the subsequent vector is calculated. In step S703, a coordinate value at the central point between the central point on the preceding vector and that on the subsequent vector is calculated. Steps S704 to 707 correspond to steps S603 to 606.

<Setting of Point Using $|D_{i-2}|/|D_{i+2}|$ (FIGS. 75 and 76)>

Figure 75:
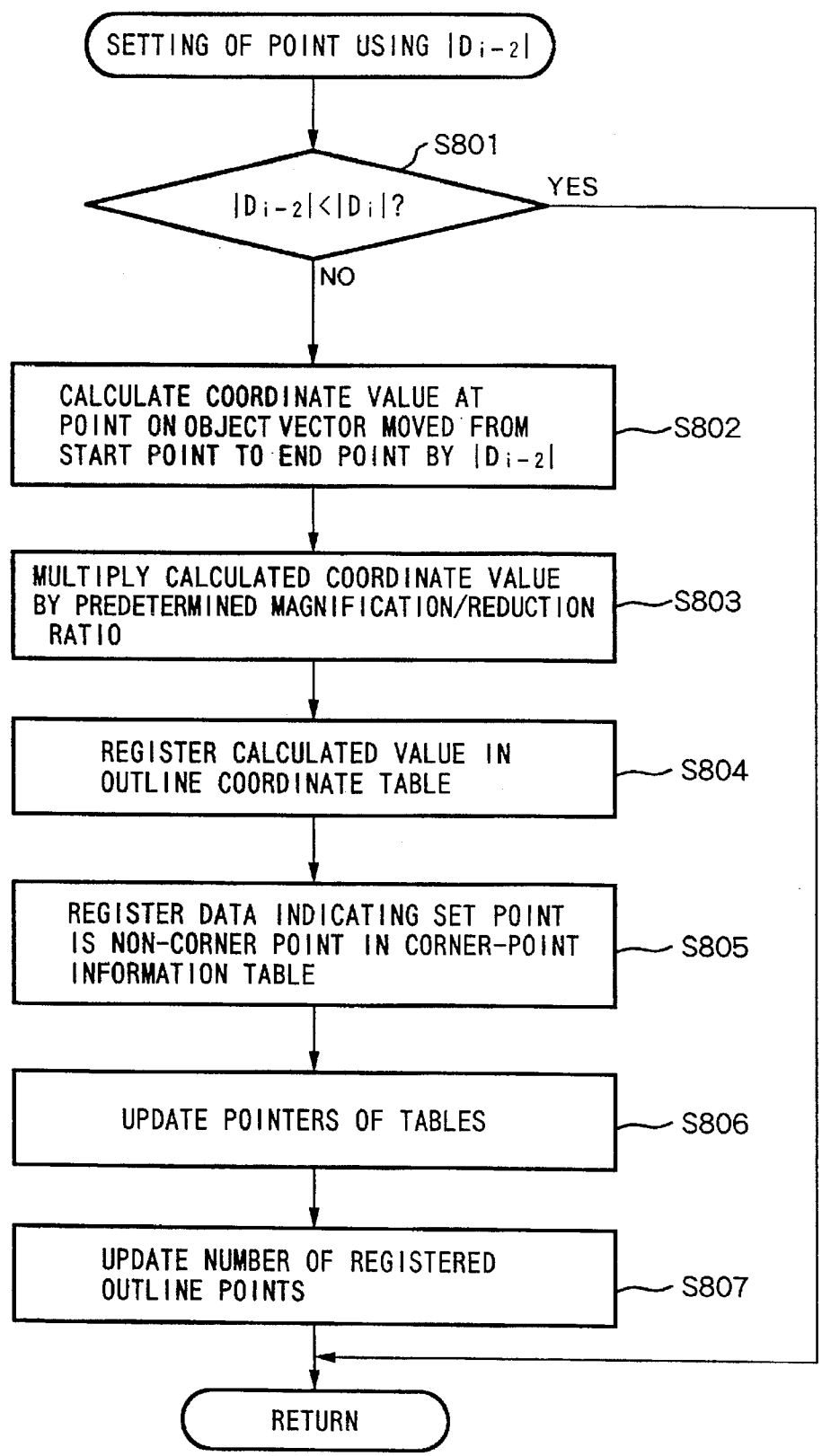

Next, the setting of outline point using second preceding vector length will be described with reference to FIG. 75.

In step S801, whether or not the length of the object vector is longer than that of the second preceding vector is determined. If YES, the process proceeds to step S802, while if NO, returns to the routine in FIG. 70.

In step S802, a coordinate value at a point on the object vector moved from the vector start point toward the vector end point by the length of the second preceding vector is calculated.

In step S803, the calculated value is multiplied by the predetermined magnification/reduction ratio.

Steps S804 to S807 correspond to steps S603 to S606.

Figure 76:
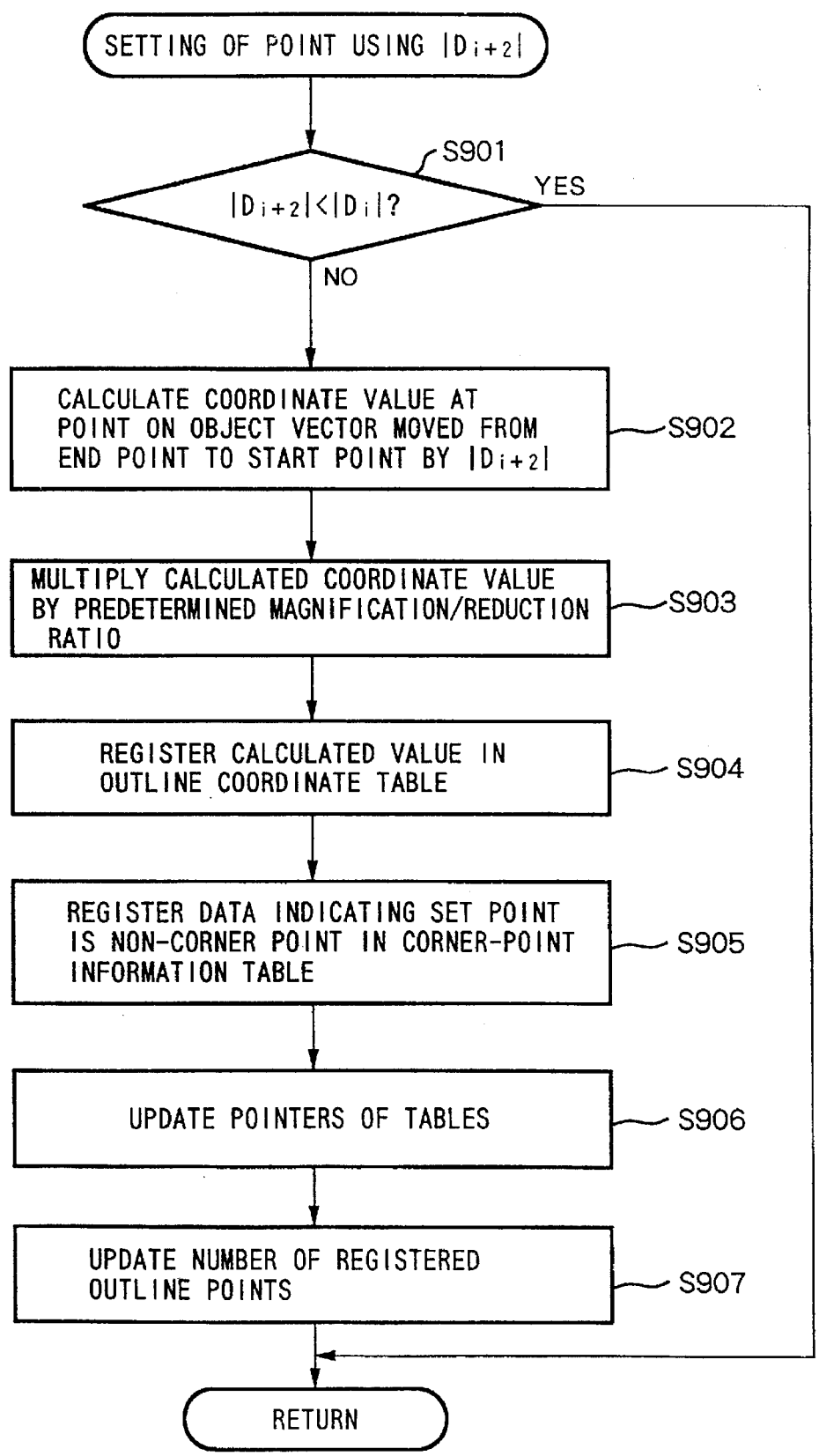

The setting of outline point using second succeeding vector length will be described with reference to FIG. 76.

In step S901, whether or not the length of the object vector is longer than that of the second succeeding vector is determined. If YES, the process proceeds to step S902, while if NO, returns to the routine in FIG. 70.

In step S902, a coordinate value at a point on the object vector moved from the vector end point toward the vector start point by the length of the second succeeding vector is calculated.

Steps S903 to S907 correspond to steps S803 to S807.

Data of the first smoothing as described above is stored in the RAM 76. Thus, the CPU 72 finishes the processing in step S2 in FIG. 8 and then performs the second smoothing in step S3.

[Second Smoothing]

The CPU 71 employs the data after the first smoothing as input data for the second smoothing. That is, the CPU inputs data array of the number of outline loops, the number of outline points in each outline loop and a coordinate values at smoothed outline points in each outline loop, and data array of additional information at the smoothed outline points in each outline loop, and outputs outline point data after the second smoothing. The data after the second smoothing comprises data array of the number of outline loops, a table for the number of outline points in each loop, coordinate value at smoothed outline points in each loop. FIG. 77 shows a example of the data.

The second smoothing will be described with reference to FIG. 78. Similar to the first smoothing, the second smoothing is performed in outline-loop units and in outline-point units in each outline loop.

If an object outline point is a corner point, an input outline-point coordinate value itself becomes outline-point coordinate data after the second smoothing. If the object outline point is a non-corner point, the weighted mean value from a preceding outline-point coordinate value, a subsequent outline-point coordinate value and the coordinate value of the object outline point becomes the outline point coordinate data after the second smoothing. That is, assuming the object input outline point is not a corner point, $P_{i-1}(x_{i-1}, y_{i-1})$ is the preceding outline point of Pi, $P_{i+1}(x_{i+1}, y_{i+1})$ is the subsequent outline point of Pi, and Qi(xi', yi') is the outline point after the second smoothing, the outline point Qi is obtained as follows:

$$xi'=k_{i-1} \cdot x_{i-1}+ki \cdot xi+k_{i+1} \cdot x_{i+1} \quad (1)\text{-a}$$

$$yi'=k_{i-1} \cdot y_{i-1}+ki \cdot yi+k_{i+1} \cdot y_{i+1} \quad (1)\text{-b}$$

$$K_{i-1}=k_{i+1}=¼, \ ki=½$$

Figure 78:
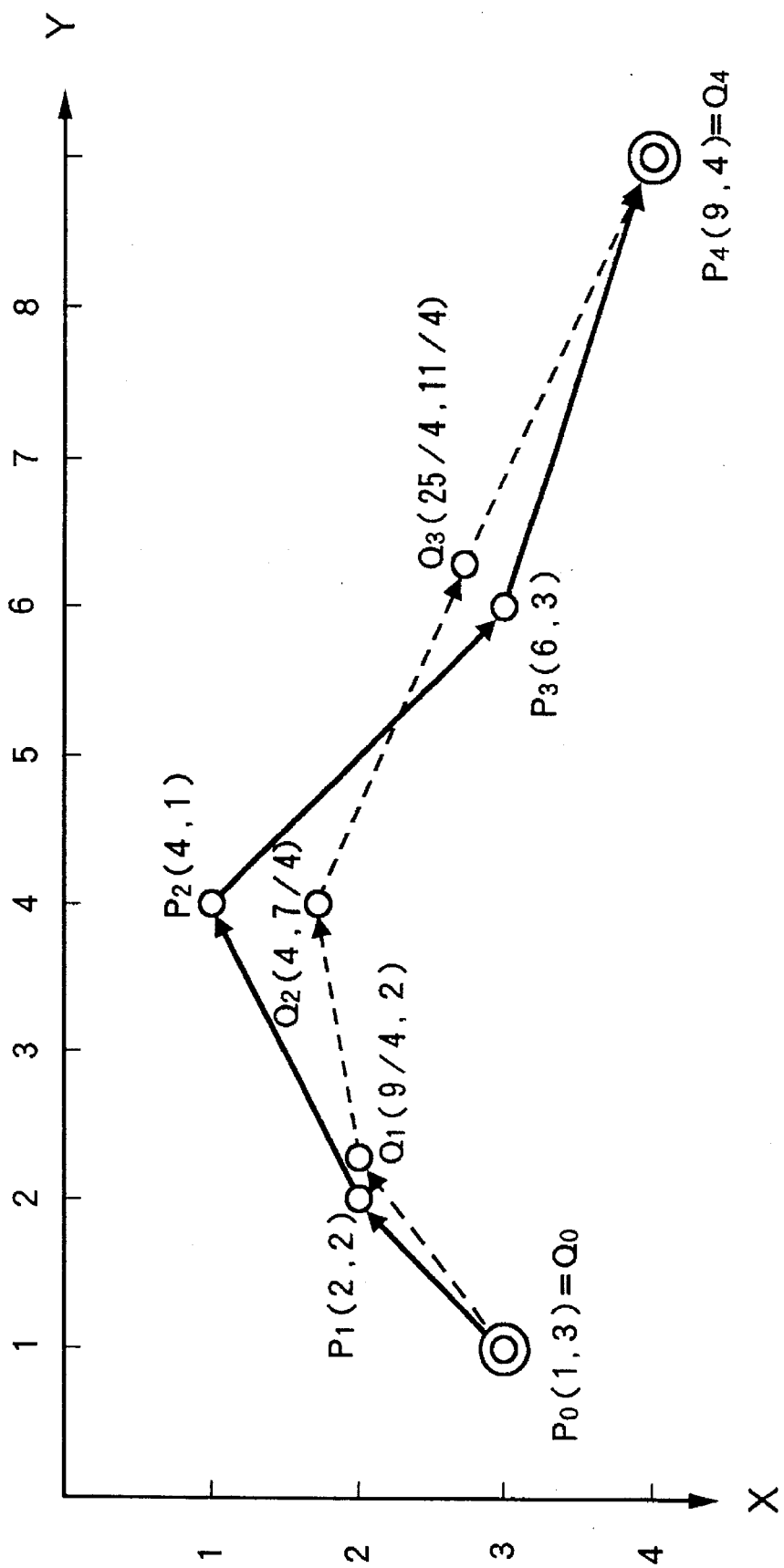
FIG. 78 is a graph showing the second smoothing.

In FIG. 78, numerals P0 to P4 represent points included in a series of input outline points after the first smoothing. The points P0 and P4 are corner points, and P1 to P3, non-corner points. Numerals Q0 to Q4 represent the results from the second smoothing. As the point p0 and P4 are corner points, the coordinate values of these points become the coordinate values of the points Q0 and Q4. The point Q1 has, as its coordinate value, the result from the weighted mean calculation of the points P0 to P2 in accordance with the equation (1). Similarly, the points Q2 and Q3 have, as their coordinate values, the results respectively from the weighted mean calculation of the P1 to P2 and from that of the P2 to P4 in accordance with the equation (1).

Thus, the CPU 71 performs this processing on the outline data after the first smoothing stored in the RAM 76, sequentially from the first loop, the second loop, . . . , and sequentially from the first outline point, the second outline point, . . . in each loop. When one loop has L-number of outline points, the preceding point of the first point is the L-th point, and the subsequent point of the L-th point is the first point.

The second smoothing generates outline point data having the same number of loops and the same number of outline points as those of the data processed by the first smoothing. The CPU 72 outputs the results from the second smoothing in the format as shown in FIG. 77 onto the RAM 76 or the memory disk unit 72, thus finishes the processing in step S3 in FIG. 8.

Next, the CPU 71 performs the processing in step S4, i.e., transfers the data obtained from the second smoothing to the binary image regenerator 4 via the I/O 75. In this manner, the outline smoothing and enlarging/reducing processing as shown in FIG. 8 ends.

<Binary Image Regeneration>

The binary image regenerator 4 outputs a binary image by filling an area surrounded by a vector figure represented by an outline data from the second smoothing. Further, the binary image regenerator 4 renders the binary image a visible image using a binary image output device such as a video printer.

As described above, outline patterns are defined in consideration of the length of an object vector, and relative combination of the direction and the length of preceding and subsequent vectors, further, the direction of the object vector. The outline vector after smoothing of an outline is determined based on a pattern that coincides with the outline. This attains enlarging/reducing processed images in higher image quality.

In the embodiment, the enlarging/reducing is performed simultaneously with the first smoothing, however, this processing may be performed simultaneously with the second smoothing. Further, the enlarging/reducing may be performed after the first smoothing and the second smoothing may be started after the enlarging/reducing of all the outline data is finished. The enlarging/reducing processing is easily attained by multiplying outline data with a magnification/reduction ratio obtained from the magnification/reduction ratio setting unit. Furthermore, the enlarging/reducing may be performed after the second smoothing.

In the embodiment, the weighting coefficients $k_{i-1}$, $k_i$ and $k_{i+1}$ are represented as:

$$k_{i-1}=K_{i+1}=\tfrac{1}{4},\text{ and } ki=\tfrac{1}{2}$$

However, the coefficients may be:

$$k_{i-1}=ki+1=\tfrac{1}{8},\ ki=\tfrac{3}{4}$$

In the deletion of series of notches, if the pattern of an object vector and its preceding and subsequent vectors correspond to the conditions as shown in FIG. 15, no outline point may be defined on the object vector. That is, the processing as described in the flowchart in FIG. 74 may be omitted. This further improves processing speed.

In the embodiment, the binary image regenerator regenerates an image as follows:

(1) In each vector forming an outline loop, when it is determined that the object vector is horizontal, the binary image regenerator does not draw the object vector into a page memory. In this case, the binary image regenerator forms an edge table of the object vector based on the connection relation between the object vector and its preceding and subsequent vectors and the direction of the area to be filled. Upon outputting, the regenerator writes the outline dots of the object line into a line memory. A filling circuit outputs each dot based on a rule that for an outline on an odd-numbered scanning line in the main-scanning direction in the line memory, the position of one pixel is indicative of an actual output position, and for an outline on an even-numbered scanning line, the position of the pixel subsequent to the pixel in the forward-scanning direction is indicative of an reversed output position.

(2) In each vector forming an outline loop, when it is determined that the object vector is horizontal, the binary image regenerator does not draw the object vector into the page memory. When it is determined that the object vector is not horizontal, the binary image regenerator forms an edge table of the object vector based on the connection relation between the object vector and its preceding and subsequent vectors and the direction of the area to be filled, except in a case where the outline position on an odd-numbered scanning line and the outline position on an even-numbered scanning line are the same. Upon outputting, the binary image regenerator writes outline dots of the object line into the line memory. The filling circuit outputs each dot based on the rule that for an outline on an odd-numbered scanning line in the main-scanning direction in the line memory, the position of one pixel is indicative of an actual output position, and for an outline on an even-numbered scanning line, the position of the pixel subsequent to the pixel in the forward-scanning direction is indicative of an reversed output position.

In the above description, the binary image output unit is a video printer, however, the output unit may be a display device or a transmitting device for an external communication path.

The binary image input unit may be a receiving device for receiving data from an external communication path.

The present invention can be applied to a system constituted by a plurality of devices, or to an apparatus comprising a single device. Furthermore, the invention is applicable also to a case where the object of the invention is attained by supplying a program to a system or apparatus.

As described above, the image processing method and apparatus using binary-image outline information avoids fattening of processed image enlarged/reduced at a low magnification/reduction ratio, thus attains higher image quality.

The image processing apparatus as described above may be applied to a facsimile apparatus and copying machine to obtain high-quality enlarged/reduced image outputs. Further, the outline data extraction based on an input binary image and the binary image regeneration from smoothed and enlarged/reduced outline data may be performed by independent apparatuses. In this case, these apparatuses are connected via communication and/or a storage medium.

The present invention is not limited to the above embodiments and various changes and modifications can be made within the spirit and scope of the present invention. Therefore, to apprise the public of the scope of the present invention, the following claims are made.

What is claimed is:

1. An image processing method for extracting outline vectors of a binary image including white pixels and black pixels and smoothing the extracted outline vectors, comprising:

an extraction step of extracting outline vectors at positions, along a border between a white pixel area and a black pixel area, and closer to the black pixel area from a central point between the areas;

a discrimination step of discriminating a form of black pixels, based on a direction and a length of a plurality of continuous outline vectors among the outline vectors extracted in said extraction step; and an output step of outputting an outline point based on a discrimination result from said discrimination step, wherein the outline vectors extracted in said extraction step are at positions between a white pixel area and a black pixel area, and closer to the black pixel area at a point ¼ the distance between both areas from the black area.

2. An image processing apparatus for extracting outline vectors of a binary image including white pixels and black pixels and smoothing the extracted outline vectors, comprising:

extraction means for extracting outline vectors at positions, along a border between a white pixel area and a black pixel area, and closer to the black pixel area from a central point between the areas;

discrimination means for discriminating a form of black pixels, based on a direction and a length of a plurality of continuous outline vectors among the outline vectors extracted in said extraction means; and output means of outputting an outline point based on a discrimination result from said discrimination means, wherein the outline vectors extracted by said extraction means are at positions between a white pixel area and a black pixel area, and closer to the black pixel area at a point ¼ the distance between both areas from the black area.

3. An image processing method for processing outlines of a binary image formed by pixels in grid-arrangement, comprising:

a generation step of generating outline vectors in a predetermined direction with respect to a black pixel area and a white pixel area, at positions on a border between the black and white pixel areas and closer to the black pixel area from the central point between the areas;

a storage step of storing the outline vectors of a whole binary image, generated in said generation step, into a storage;

a discrimination step of discriminating respective lengths of an object vector and its preceding and subsequent vectors and relative directions of the vectors;

a modification step of modifying both or one of a vector start point and a vector end point of the object vector, based on a discrimination result from said discrimination step; and a smoothing step of smoothing the image by moving the vector start point and the vector end point modified in said modification step.

4. The method according to claim 3, wherein, in said modification step, the vector start point and the vector end point are modified as a movable point or an immovable point, and the movable point is moved in said smoothing step.

5. An image processing apparatus for processing outlines of a binary image formed by pixels in grid-arrangement, comprising:

generation means for generating outline vectors in a predetermined direction with respect to a black pixel area and a white pixel area, at positions on a border between the black and white pixel areas and closer to the black pixel area from the central point between the areas;

storage means for storing the outline vectors of a whole binary image, generated by said generation means, into a storage;

discrimination means for discriminating respective lengths of an object vector and its preceding and subsequent vectors and relative directions of the vectors;

modification means for modifying both or one of a vector start point and a vector end point of the object vector, based on a discrimination result from said discrimination means; and smoothing means for smoothing the image by moving the vector start point and the vector end point modified by said modification means.

6. The apparatus according to claim 5, wherein said modification means modifies the vector start point and the vector end point as a movable point or an immovable point, and said smoothing means moves the movable point.

7. An image processing apparatus comprising:

input means for inputting binary image data;

extraction means for extracting outline vectors at positions, from the binary image input by said input means, along a border between a white pixel area and a black pixel area, and closer to the black pixel area for a predetermined distance than a central point between the white pixel area and the black pixel area;

first determination means for determining whether an outline of the black pixels formed by the vectors is a convexity;

second determination means for determining whether an outline of the black pixels formed by the vectors is a concavity;

smoothing means for smoothing the object outline vectors in accordance with the result of determining obtained by said first and second determination means; and generation means for generating binary image data based on the outline vectors smoothed by said smoothing means.

8. An apparatus according to claim 7, wherein said input means includes an image reader.

9. An apparatus according to claim 7, further comprising output means for outputting an image based on the binary image data generated by said generation means.

10. An apparatus according to claim 9, wherein said output means includes a printer.

11. An apparatus according to claim 7, wherein the outline vectors extracted by said extraction means are at positions between a white pixel area and a black pixel area, and closer to the black pixel area for a point ¼ the distance between both areas than the black area.

12. An apparatus according to claim 7, wherein, when said determining means determine that the outline of the black pixels formed by the vectors is neither a convexity nor a concavity, the outline is determined as being a jag.

13. An apparatus according to claim 7, wherein, if said first determination means determines that the outline is a convexity, said smoothing means smoothes the convexity and, if said second determination means determines that the outline is a concavity, said smoothing means removes the concavity.

14. An apparatus according to claim 7, wherein said smoothing means smoothes the outline vectors in accordance with lengths of the outline vectors and the result of the determining obtained by said first and second determination means.

15. An image processing method comprising the steps of:

inputting binary image data;

extracting outline vectors from the binary image at positions, input in said inputting step, along a border between a white pixel area and a black pixel area, and closer to the black pixel area for a predetermined distance than a central point between the white pixel area and the black pixel area;

discriminating a combination of vectors of an object outline, extracted in said extracting step;

determining whether an outline of the black pixels formed by the vectors is a convexity, based on a result obtained in said discriminating step;

determining whether an outline of the black pixels formed by the vectors is a concavity, based on a result obtained in said discriminating step;

smoothing the object outline vectors in accordance with a result obtained in said determining steps; and generating binary image data based on the outline vectors smoothed in said smoothing step.

16. A method according to claim 15, wherein the binary image data is input using an image reader in said inputting step.

17. A method according to claim 15, further comprising the step of outputting an image based on the binary image data generated in said generating step.

18. A method according to claim 17, wherein the image is output using a printer.

19. A method according to claim 15, wherein the outline vectors extracted in said extracting step are at positions between a white pixel area and a black pixel area, and closer to the black pixel area for a point ¼ the distance between both areas than the black area.

20. A method according to claim 15, wherein, in said determining steps, a determination is made as to whether the outline of the black pixels formed by the object outline vectors is a convexity, a concavity or a jag.

21. A method according to claim 15, wherein, if it is determined in said determining step that the outline is a convexity, the convexity is smoothed in said smoothing step, and, if it is determined in said determining step that the outline is a concavity, the concavity is removed in said smoothing step.

22. A method according to claim 15, wherein the outline vectors are smoothed in said smoothing step, in accordance with lengths of the outline vectors and the result of the determining obtained in said determining steps.

* * * * *

UNITED STATES PATENT AND TRADEMARK OFFICE
CERTIFICATE OF CORRECTION

PATENT NO. : 5,666,439

DATED : September 9, 1997

INVENTOR(S): YOSHIHIRO ISHIDA ET AL.

Page 1 of 5

It is certified that error appears in the above-identified patent and that said Letters Patent is hereby corrected as shown below:

<u>ON TITLE PAGE AT [56] REFERENCES CITED, FOREIGN PATENTS DOCUMENTS</u>
"4157578" should read --4-157578-- and
"5174140" should read --5-174140--.

<u>ON TITLE PAGE AT [57], ABSTRACT</u>
Line 9, "point" should read --points--.

<u>SHEET 51</u>
Figure 53, "POIN" should read --POINT--.

<u>COLUMN 1</u>
Line 48, "operation" should read --operate--.

<u>COLUMN 2</u>
Line 47, "three pixel" should read --three-pixel--;
Line 58, "obtaining" should read --obtain--.

<u>COLUMN 4</u>
Line 1, "a" should read --an--;
Line 23, "a" should read --an--.

<u>COLUMN 5</u>
Line 22, "states" should read --state--;
Line 46, "are" should read --is--.

UNITED STATES PATENT AND TRADEMARK OFFICE
CERTIFICATE OF CORRECTION

PATENT NO. : 5,666,439

DATED : September 9, 1997

INVENTOR(S): YOSHIHIRO ISHIDA ET AL.

Page 2 of 5

It is certified that error appears in the above-identified patent and that said Letters Patent is hereby corrected as shown below:

COLUMN 6
Line 10, "construction" should read --construction of--.

COLUMN 7
Line 50, "of the" (second occurrence) should be deleted.

COLUMN 8
Line 58, "respect" (second occurrence) should read --respective--.

COLUMN 10
Line 2, "respect" (second occurrence) should read --respective--;
Line 25, "vector 16" should read --vector 116--.

COLUMN 12
Line 36, "occur" should read --occurrence--;
Line 46, "correspond" should read --corresponds--.

COLUMN 13
Line 66, "an" should read --a--.

COLUMN 14
Line 2, "upon" should read --upon whether-- and "an" should read --a--;
Line 8, "vector Di" should read --vector $D_i$--;
Line 16, "vector Di" should read --vector $D_i$--;
Line 64, "maintains" should read --maintain--.

UNITED STATES PATENT AND TRADEMARK OFFICE
CERTIFICATE OF CORRECTION

PATENT NO. : 5,666,439

DATED : September 9, 1997

INVENTOR(S): YOSHIHIRO ISHIDA ET AL.

It is certified that error appears in the above-identified patent and that said Letters Patent is hereby corrected as shown below:

```
COLUMN 15
  Line 13, "upon" should read --upon whether-- and "an"
    should read --a--;
  Line 16, "an" should read --a--;
  Line 30, "convexity.  That" should read --convexity, that--.

COLUMN 19
  Line 2,  "clockwise" should read --clockwise loop--;
  Line 26, "the all" should read --all--;
  Line 35, "a" should read --an--;
  Line 42, "a" should read --an--.

COLUMN 21
  Line 21, "59>)" should read --59)>--.

COLUMN 22
  Line 20, "Yes," should read --YES,--;
  Line 21, "No," should read --NO,--.

COLUMN 24
  Line 40, "retunrs" should read --returns--.

COLUMN 25
  Line 40, "In step S212," should be deleted;
  Line 48, "step S218," should read --step S217,--;
  Line 50, "S217" should read --S218--;
  Line 61, "vector" should be deleted.
```

UNITED STATES PATENT AND TRADEMARK OFFICE
CERTIFICATE OF CORRECTION

PATENT NO. : 5,666,439

DATED : September 9, 1997

INVENTOR(S): YOSHIHIRO ISHIDA ET AL.

Page 4 of 5

It is certified that error appears in the above-identified patent and that said Letters Patent is hereby corrected as shown below:

<u>COLUMN 27</u>
Line, 20 "step 253," should read --step S253,--.

<u>COLUMN 28</u>
Line 26, "step S302," should read --steps S302,--.

<u>COLUMN 29</u>
Line 16, "dada" should read --data--.

<u>COLUMN 32</u>
Line 37, "thereafter," should read --Thereafter,--.

<u>COLUMN 33</u>
Line 16, "thereafter," should read --Thereafter,--.

<u>COLUMN 35</u>
Line 30, "Difference" should read --The difference--.

<u>COLUMN 36</u>
Line 39, "coordinate" should read --and coordinate--;
Line 40, "a" should read --an--.

<u>COLUMN 37</u>
Line 1, "point P0" should read --points P0--.

<u>COLUMN 38</u>
Line 21, "an" should read --a--;
Line 42, "an" should read --a--.

UNITED STATES PATENT AND TRADEMARK OFFICE
CERTIFICATE OF CORRECTION

PATENT NO. : 5,666,439

DATED : September 9, 1997

INVENTOR(S): YOSHIHIRO ISHIDA ET AL.

It is certified that error appears in the above-identified patent and that said Letters Patent is hereby corrected as shown below:

<u>COLUMN 40</u>
Line 67, "determining" should read --first and second determination--

Signed and Sealed this

Nineteenth Day of May, 1998

Attest:

Attesting Officer

BRUCE LEHMAN

Commissioner of Patents and Trademarks